US012780999B2

(12) United States Patent
Aratani et al.

(10) Patent No.: US 12,780,999 B2
(45) Date of Patent: Nov. 3, 2026

(54) CONTINUOUS FIBER REINFORCED RESIN COMPOSITE MATERIAL AND METHOD OF PRODUCING THE SAME

(71) Applicant: ASAHI KASEI KABUSHIKI KAISHA, Tokyo (JP)

(72) Inventors: Yusuke Aratani, Tokyo (JP); Tsutomu Akiyama, Tokyo (JP); Yuko Yamanaka, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 623 days.

(21) Appl. No.: 18/252,187

(22) PCT Filed: Nov. 10, 2021

(86) PCT No.: PCT/JP2021/041408

§ 371 (c)(1),
(2) Date: May 9, 2023

(87) PCT Pub. No.: WO2022/102676

PCT Pub. Date: May 19, 2022

(65) Prior Publication Data

US 2023/0407020 A1 Dec. 21, 2023

(30) Foreign Application Priority Data

Nov. 10, 2020 (JP) ................................ 2020-187487
Feb. 8, 2021 (JP) ................................ 2021-018477
(Continued)

(51) Int. Cl.
*B29C 70/30* (2006.01)
*B29C 70/34* (2006.01)
(Continued)

(52) U.S. Cl.
CPC ............. *C08J 5/043* (2013.01); *B29C 70/528* (2013.01); *C08J 5/08* (2013.01); *D06M 13/02* (2013.01);
(Continued)

(58) Field of Classification Search
CPC ......... B29C 70/30; B29C 70/34; B29C 70/36; B29C 70/40; B29C 70/42; B29C 70/50;
(Continued)

(56) References Cited

U.S. PATENT DOCUMENTS

2009/0291278 A1 11/2009 Kawabe et al.
2016/0346958 A1 12/2016 Steele et al.
(Continued)

FOREIGN PATENT DOCUMENTS

CN 102993744 A 3/2013
CN 107666996 A 2/2018
(Continued)

OTHER PUBLICATIONS

Jan. 25, 2022, International Search Report issued in the International Patent Application No. PCT/JP2021/041408.
(Continued)

*Primary Examiner* — Leo B Tentoni
(74) *Attorney, Agent, or Firm* — KENJA IP LAW PC

(57) ABSTRACT

It is an object of the present disclosure to provide a continuous fiber reinforced resin composite material having good acoustic emission signals, high strength, elastic modulus, and water absorption characteristics, and a method of producing the same. The continuous fiber reinforced resin composite material contains continuous reinforcing fibers and thermoplastic resin, wherein an acoustic emission (AE) count A determined by the following formula is 0.30 or less:
(Continued)

(AE count A)=(number of AE signals having amplitude of 40 dB or more and duration of 3500 μseconds or shorter)/(total number of AE signals).

8 Claims, 1 Drawing Sheet

(30) Foreign Application Priority Data

| | | | |
|---|---|---|---|
| Apr. 1, 2021 | (JP) | ................................. | 2021-063076 |
| Apr. 22, 2021 | (JP) | ................................. | 2021-072887 |
| Apr. 23, 2021 | (JP) | ................................. | 2021-073283 |

(51) Int. Cl.

| | |
|---|---|
| ***B29C 70/36*** | (2006.01) |
| ***B29C 70/40*** | (2006.01) |
| ***B29C 70/42*** | (2006.01) |
| ***B29C 70/50*** | (2006.01) |
| ***B29C 70/52*** | (2006.01) |
| ***C08J 5/04*** | (2006.01) |
| ***C08J 5/08*** | (2006.01) |
| ***D06M 13/02*** | (2006.01) |
| ***D06M 13/513*** | (2006.01) |
| ***D06M 15/263*** | (2006.01) |

(52) U.S. Cl.
CPC ........ *D06M 13/513* (2013.01); *D06M 15/263* (2013.01)

(58) Field of Classification Search
CPC ..... B29C 70/52; B29C 70/521; B29C 70/522; B29C 70/523; B29C 70/524; B29C 70/528
USPC ... 264/136, 171.1, 211.14, 211.15, 237, 257, 264/258
See application file for complete search history.

(56) References Cited

U.S. PATENT DOCUMENTS

| | | | | |
|---|---|---|---|---|
| 2017/0362401 | A1 | 12/2017 | Seidel et al. | |
| 2019/0126521 | A1* | 5/2019 | Yasuda | B29C 70/34 |
| 2020/0384704 | A1 | 12/2020 | Aratani et al. | |
| 2023/0117001 | A1* | 4/2023 | Aratani | C08J 5/043<br>523/222 |

FOREIGN PATENT DOCUMENTS

| | | | | |
|---|---|---|---|---|
| CN | 109384917 | A | 2/2019 | |
| CN | 111727110 | A | 9/2020 | |
| CN | 112937037 | A | 6/2021 | |
| CN | 116507468 | A | 7/2023 | |
| EP | 0353493 | A1 * | 2/1990 | C08J 5/08 |
| EP | 2052831 | A1 | 4/2009 | |
| EP | 3763860 | A1 | 1/2021 | |
| EP | 3816212 | A1 | 5/2021 | |
| JP | H0936443 | A | 2/1997 | |
| JP | 2003238213 | A | 8/2003 | |
| JP | 2009019202 | A | 1/2009 | |
| JP | 2015157740 | A | 9/2015 | |
| JP | 5987335 | B2 | 9/2016 | |
| JP | 2017531575 | A | 10/2017 | |
| JP | 2017222859 | A | 12/2017 | |
| JP | 2018516186 | A | 6/2018 | |
| JP | 2019043108 | A | 3/2019 | |
| JP | 2020019897 | A | 2/2020 | |
| JP | 2020073737 | A | 5/2020 | |
| JP | 2021014558 | A | 2/2021 | |
| JP | 2021045914 | A | 3/2021 | |
| JP | 2022076861 | A | 5/2022 | |
| WO | 2016053465 | A1 | 4/2016 | |
| WO | 2019172208 | A1 | 9/2019 | |
| WO | 2019208586 | A2 | 10/2019 | |
| WO | 2020004638 | A1 | 1/2020 | |
| WO | 2021193248 | A1 | 9/2021 | |

OTHER PUBLICATIONS

May 16, 2023, International Preliminary Report on Patentability issued in the International Patent Application No. PCT/JP2021/041408.

Takenobu Sakai et al., Effect of Crystallization of Carbon Fiber Reinforced Polyamide on Mechanical Properties, Journal of the Japan Society for Composite Materials, 2019, pp. 223-229, vol. 45, No. 6.

J. Wolters et al., Properties and acoustic emission of extruded short glass fiber-reinforced thermoplastics, Kunststoffe, Feb. 1989, pp. 157-161, vol. 79.

Jul. 15, 2024, the Supplementary European Search Report issued by the European Patent Office in the corresponding European Patent Application No. 21891922.3.

* cited by examiner

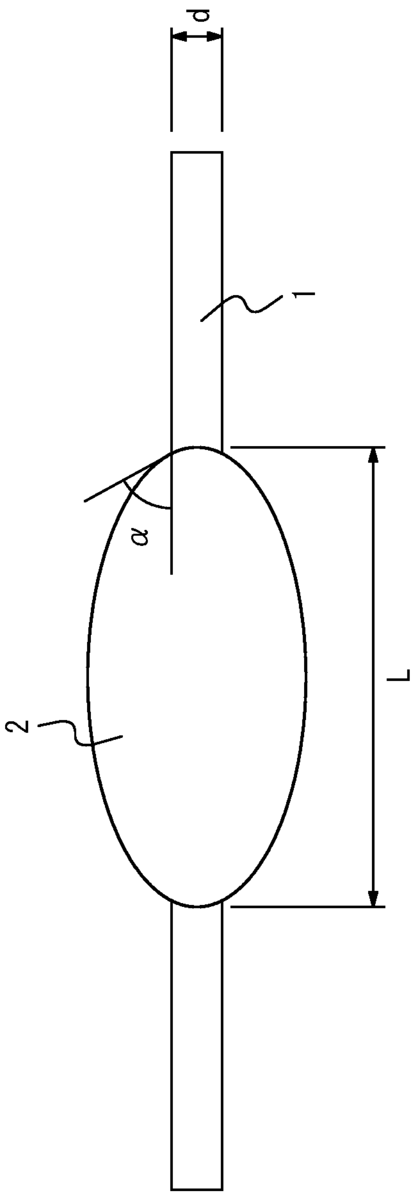
d
1
α
L
2

CONTINUOUS FIBER REINFORCED RESIN COMPOSITE MATERIAL AND METHOD OF PRODUCING THE SAME

TECHNICAL FIELD

The present disclosure relates to a continuous fiber reinforced resin composite material and a method of producing the same.

BACKGROUND

Here, structural components, such as a wide variety of machines and automobiles, pressure vessels, and tubular structures, employ composite shaped articles which include matrix resin materials and reinforcing materials such as glass fibers added thereto. In particular, from the viewpoint of the strength, continuous fiber reinforced resin composite materials including continuous fibers as reinforcing fibers are desirable. Such continuous fiber reinforced resin composite materials that have been proposed include those in which a bundling agent added to the reinforcing fibers is adjusted (see, for example, PTL 1 below); in which the difference between the melting point and the crystallization temperature is adjusted (see, for example, PTL 2 below); in which an organic salt is added to a resin material (see, for example, PTL 3 below), in which a fabric of a mold precursor is laminated with a thermoplastic resin (see, for example, PTL 4 below); and in which the adhesive strength, affinity, etc. at the interface between continuous reinforcing fibers and a resin are good (see, for example, PTL 5 below).

CITATION LIST

Patent Literature

PTL 1: JP 2003-238213 A
PTL 2: JP 5987335 B
PTL 3: JP 2017-222859 A
PTL 4: JP 2009-19202 A
PTL 5: WO 2019/208586 A1

SUMMARY

Technical Problem

However, there is room for improvement in that none of the conventional continuous fiber reinforced resin composite materials have good acoustic emission (AE) signals emitted during physical property tests, and physical properties such as strength and elastic modulus and water absorption characteristics are not sufficient.

In view of the level of such conventional art, the problem to be solved by the present disclosure is to provide a continuous fiber reinforced resin composite material with good acoustic emission signals, and having high strength, elastic modulus, and water absorption characteristics, and a method of producing the same.

Solution to Problem

As a result of diligent study and experimentation to solve a such problem, the present inventors unexpectedly discovered that the above problem can be solved by adjusting the interfacial amount, the heating rate, and the cooling rate of a continuous fiber reinforced resin composite material, and the compatibility of continuous fibers and thermoplastic resin, and by adjusting the acoustic emission signal possessed by the continuous fiber reinforced resin composite material, thereby completing the present disclosure.

Specifically, the present disclosure is as follows:

[1]

A continuous fiber reinforced resin composite material comprising:

continuous reinforcing fibers and a thermoplastic resin, wherein an acoustic emission (AE) count A determined by the following formula is 0.30 or less:

$$(\text{the } AE \text{ count } A) = (\text{a number of } AE \text{ signals having an amplitude of 40 dB or more and a duration of 3500 } \mu \text{ seconds or shorter}) / (\text{a total number of the } AE \text{ signals}).$$

The continuous fiber reinforced resin composite material according to [1], wherein the number of AE signals having an amplitude of 40 dB or more and a duration of 3500 μseconds or shorter is 600 or less.

[3]

The continuous fiber reinforced resin composite material according to [1] or [2], wherein a number of AE signals having an amplitude of 25 to 30 dB and a duration of 1000 μseconds or shorter is 200 or more.

[4]

The continuous fiber reinforced resin composite material of any one of [1] to [3], wherein an AE count B determined by the following formula is 0.12 or more:

$$(\text{the } AE \text{ count } B) = (a \text{ number of } AE \text{ signals having an amplitude of 25 to 30 dB and a duration of 1000 } \mu \text{ seconds or shorter}) / (\text{the total number of the AE signals}).$$

[5]

The continuous fiber reinforced resin composite material according to any one of [1] to [4], wherein the total number of the AE signals is 2000 or more.

[6]

A method of producing the continuous fiber reinforced resin composite material according to any one of [1] to [5], wherein an interfacial amount of the continuous fiber reinforced resin composite material is 100,000 $m^{-1}$ or more, a heating rate is 200 to 330° C./min, and a cooling rate is 10 to 120° C./min.

Here, structural components, such as a wide variety of machines and automobiles, pressure vessels, and tubular structures, employ continuous fiber reinforced composite material which include matrix resin materials and reinforcing materials such as glass fibers added thereto. Such fiber reinforced resin composite materials include those in which the interface layer between the reinforcing fiber surface and the resin is adjusted (see, for example, JP 2007-269914 A); in which the void ratio at the interface is adjusted (see, for example, WO 2019/208586 A1); and in which the interface GF coverage ratio rate is increased (see, for example, Polymer, 2002, No. 43, p. 4055-4062 and Studies in Science and Technology, 2016, Vol. 5, No. 2, p. 163-168).

However, there is room for improvement in that none of fiber reinforced resin composite materials of the conventional art has sufficient bending fatigue characteristics because the reinforcing fibers are coated with a large amount of the resin and the interfacial resin is thick.

In view of the level of such conventional art, by further providing the characteristics described in [7] below, it is possible to provide a fiber reinforced resin composite material in which the thickness of the interfacial resin is small and the bending fatigue characteristics and the physical property recoverability are high, and a method of producing the same.

[7]

The continuous fiber reinforced resin composite material of any one of [1] to [5], the continuous fiber reinforced resin composite material comprising continuous reinforcing fibers and a thermoplastic resin, wherein a coverage ratio of an interfacial resin in the continuous reinforcing fibers after dissolution of the resin is 44% or less.

[8]

The continuous fiber reinforced resin composite material according to [7], wherein an exposure degree of the continuous reinforcing fibers after dissolution of the resin is 55% or more.

[9]

The continuous fiber reinforced resin composite material according to [7] or [8], wherein a relative elemental concentration of interfacial nitrogen in the continuous reinforcing fibers after dissolution of the resin is 6.70 or less.

[10]

The continuous fiber reinforced resin composite material of any one of [7] to [9], wherein a relative elemental concentration of interfacial carbon in the continuous reinforcing fibers after dissolution of the resin is 46.7 or less.

[11]

The continuous fiber reinforced resin composite material of any one of [7] to [10], wherein a relative elemental concentration of interfacial aluminum in the continuous reinforcing fibers after dissolution of the resin is 1.80 or more.

[12]

The continuous fiber reinforced resin composite material of any one of [7] to [11], wherein a relative elemental concentration of interfacial silicon in the continuous reinforcing fibers after dissolution of the resin is 8.30 or more.

[13]

The continuous fiber reinforced resin composite material of any one of [7] to [12], wherein a relative elemental concentration of interfacial calcium in the continuous reinforcing fibers after dissolution of the resin is 2.60 or more.

[14]

The continuous fiber reinforced resin composite material of any one of [7] to [13], wherein a relative elemental concentration of interfacial oxygen in the continuous reinforcing fibers after dissolution of the resin is 33.1 or more.

[15]

A method of producing the continuous fiber reinforced resin composite material according to any one of [7] to [14], wherein a contact angle between the continuous reinforcing fiber and the thermoplastic resin after dissolution of the resin according to a static wettability test is 70 to 130% of a contact angle between continuous reinforcing fibers which is a material treated only with a coupling agent and the thermoplastic resin according to a static wettability test, and an impregnation speed of the continuous reinforcing fibers with the thermoplastic resin is 32%/min or more.

Here, structural components, such as a wide variety of machines and automobiles, pressure vessels, and tubular structures, employ composite shaped articles which include matrix resin materials and reinforcing materials such as glass fibers added thereto. In particular, from the viewpoint of the strength, continuous fiber reinforced resin composite materials including continuous fibers as reinforcing fibers are desirable. Such continuous fiber reinforced resin composite materials that have been proposed include those in which a bundling agent added to the reinforcing fibers is adjusted (see, for example, JP 2003-238213 A); in which the difference between the melting point and the crystallization temperature is adjusted (see, for example, JP 5987335 B); in which an organic salt is added to a resin material (see, for example, JP 2017-222859 A); in which a fabric of a molding precursor is laminated with a thermoplastic resin (see, for example, JP 2009-19202 A); and in which the adhesive strength, the affinity, etc. at the interface between the continuous reinforcing fibers and the resin are good (see, for example, WO 2019/208586 A1).

However, there is room for improvement in that none of the conventional continuous fiber reinforced resin composite materials exhibit sufficient warping characteristic or shape conformability because the crystalline behavior is not optimal.

In view of the level of such conventional art, by further providing the characteristics described in [16] below, it is possible to provide a continuous fiber reinforced resin composite material having good crystalline behavior, and good warping characteristic and shape conformability, and a method of producing the same.

[16]

The continuous fiber reinforced resin composite material according to any one of [1] to [5] comprising:

continuous reinforcing fibers and a thermoplastic resin, wherein a full width at half maximum of a (010) plane of a crystalline phase in an inner layer is 1.00 or more and an intensity of the (010) plane is 40000 or less.

[17]

The continuous fiber reinforced resin composite material according to [16], wherein the full width at half maximum of the (010) plane of the crystalline phase in the inner layer is 1.15 or less.

[18]

The continuous fiber reinforced resin composite material according to [16] or [17], wherein a full width at half maximum of the (010) plane of the crystalline phase in a surface layer is 1.25 or less.

[19]

The continuous fiber reinforced resin composite material of any one of [16] to [18], wherein a full width at half maximum of a (100) plane of the crystalline phase in the inner layer is 0.85 or more.

[20]

The continuous fiber reinforced resin composite material of any one of [16] to [19], wherein a lattice spacing of the (010) plane of the crystalline phase in the inner layer is 0.30 to 1.2.

[21]

The continuous fiber reinforced resin composite material of any one of [16] to [20], wherein a full width at half maximum of the (100) plane of the crystalline phase in the surface layer is 0.85 or more.

[22]

The continuous fiber reinforced resin composite material of any one of [16] to [21], wherein 2θ of a peak of the (100) plane of the crystalline phase in the surface layer is 20.34° or more.

[23]

A method of producing the continuous fiber reinforced resin composite material according to any one of [16] to [22], comprising:

molding a raw material laminate comprising the continuous reinforcing fibers and the thermoplastic resin under heating, wherein the full width at half maximum of the (010) plane of the crystalline phase in the inner layer of the continuous fiber reinforced resin composite material satisfies the following relational formula:

(the full width at half maximum of the (010) plane of the crystalline phase in the inner layer of the continuous fiber reinforced resin composite material)<0.0037×(a maximum temperature during molding)+0.15.

[24]

The method of producing the continuous fiber reinforced resin composite material according to [23], wherein a ratio of the full width at half maximum of the (010) plane of the crystalline phase in the inner layer and the full width at half maximum of the (010) plane of the crystalline phase in the surface layer of the continuous fiber reinforced resin composite material satisfies the relationship of the following formula:

(the full width at half maximum of the (010) plane of the crystalline phase in the surface layer of the continuous fiber reinforced resin compsite material)/(the full width at half maximum of the (010) plane of the crystalline phase in the inner layer of the continuous fiber reinforced resin composite material) ≥ −0.0034 × (the maximum temperature during molding) + 2.02.

The method of producing the continuous fiber reinforced resin composite material according to [23] or [24], further comprising:

cooling after molding under heating, wherein a ratio of the full width at half maximum of the (100) plane of the crystalline phase in the inner layer and the full width at half maximum of the (100) plane of the crystalline phase in the surface layer of the continuous fiber reinforced resin composite material satisfies the relationship of the following formula:

(the full width at half maximum of the (100) plane of the crystalline phase in the surface layer of the continuous fiber reinforced resin composite material)/(the full width at half maximum of the (100) plane of the crystalline phase in the inner layer of the continuous fiber reinforced resin composite material)≥0.0125×(the cooling rate during molding)+0.318.

Here, structural components, such as a wide variety of machines and automobiles, pressure vessels, and tubular structures, employ composite shaped articles which include matrix resin materials and reinforcing materials such as glass fibers added thereto. In particular, from the viewpoint of the strength, continuous fiber reinforced resin composite materials including continuous fibers as reinforcing fibers are desirable. Such continuous fiber reinforced resin composite materials that have been proposed include those in which a bundling agent added to the reinforcing fibers is adjusted (see, for example, JP 2003-238213 A); in which the difference between the melting point and the crystallization temperature is adjusted (see, for example, JP 5987335 B); in which an organic salt is added to a resin material (see, for example, JP 2017-222859 A); in which a fabric of a molding precursor is laminated with a thermoplastic resin (see, for example, JP 2009-19202 A); and in which the adhesive strength, the affinity, etc. at the interface between the continuous reinforcing fiber and the resin are good (see, for example, WO 2019/208586 A1).

However, in none of the continuous fiber reinforced resin composite materials of the conventional art, the interfacial polishing value (the value (P/Vf) obtained by dividing the maximum polishing pressure P (g/cm$^2$) at which no voids are observed between the continuous reinforcing fibers and the thermoplastic resin when a cross section orthogonal to the length direction of the continuous reinforcing fibers of the continuous fiber reinforced resin composite material is polished and the polished cross section is observed under a field emission scanning electron microscope (FESEM) by the volume ratio Vf (%) of the continuous reinforcing fibers in the continuous fiber reinforced resin composite material is good. Thus, there is room for improvement in that the physical properties such as strength, elastic modulus, impact, etc., water absorption characteristics, and interfacial recoverability are not sufficient.

In view of the level of such conventional art, by further providing the characteristics described in [26] below, it is possible to provide a continuous fiber reinforced resin composite material having a good interfacial polishing value, high strength, elastic modulus, impact characteristics, high-temperature characteristics, water absorption characteristics, and interfacial recoverability, and a methods of producing the same.

[26]

The continuous fiber reinforced resin composite material according to any one of [1] to [5], the continuous fiber reinforced resin composite material comprising continuous reinforcing fibers and a thermoplastic resin, wherein an interfacial polishing value P/Vf which is a value determined by dividing a maximum polishing pressure P (g/cm$^2$) at which no voids are observed between the continuous reinforcing fibers and the thermoplastic resin when a cross section orthogonal to a length direction of the continuous fibers of the continuous fiber reinforced resin composite material is polished and the polished cross section is observed under a field emission scanning electron microscope (FE-SEM), by a volume ratio Vf (%) of the continuous reinforcing fibers in the continuous fiber reinforced resin composite material is 10 g/cm$^2$·% or more.

[27]

A method of producing the continuous fiber reinforced resin composite material according to [26] comprising:

treating continuous reinforcing fibers with a surface treatment agent to obtain surface treatment agent-containing continuous reinforcing fibers, wherein an interfacial shear strength between the surface treatment agent-containing continuous reinforcing fibers and the thermoplastic resin, as determined by the μ droplet method using the following formula (1), is 0.8 to 1.2 times an interfacial shear strength between coupling agent-treated continuous reinforcing fibers which are treated only with a coupling agent instead of the surface treatment agent and the thermoplastic resin, and a μ droplet contact angle between the surface treatment agent-containing continuous reinforcing fibers and the thermoplastic resin, as measured by the μ droplet method, is 0.4 to 0.7 times a p droplet contact angle between surface treatment-free continuous fibers free of the surface treatment agent and the thermoplastic resin:

$$\tau = F/\pi dL \tag{1}$$

(in the formula, τ is the interfacial shear strength (MPa), d is a diameter of the continuous reinforcing fibers (μm), L is a length (μm) of a resin ball (μ drop) of the thermoplastic resin made to be attached to a single yarn of the continuous reinforcing fibers in an axial direction of the continuous reinforcing fibers, and F is a shear load (N) when the resin ball is pulled off from the continuous reinforcing fiber).

[28]

The method of producing the continuous fiber reinforced resin composite material according to [27], wherein the interfacial shear strength between the surface treatment agent-containing continuous reinforcing fibers and the thermoplastic resin is 1.8 to 10 times the interfacial shear strength between the surface treatment agent-free continuous reinforcing fibers and the thermoplastic resin.

[29]

The method of producing the continuous fiber reinforced resin composite material according to [27] or [28], wherein the μ droplet contact angle between the surface treatment agent-containing continuous reinforcing fibers and the thermoplastic resin is 0.8 to 1.6 times the μ droplet contact angle between the coupling agent-treated continuous reinforcing fibers and the thermoplastic resin.

Here, structural components, such as a wide variety of machines and automobiles, pressure vessels, and tubular structures, employ composite shaped articles which include matrix resin materials and reinforcing materials such as glass fibers added thereto. In particular, from the viewpoint of the strength, continuous fiber reinforced resin composite materials including continuous fibers as reinforcing fibers are desirable. Such continuous fiber reinforced resin composite materials that have been proposed include those in which a bundling agent added to the reinforcing fibers is adjusted (see, for example, JP 2003-238213 A); in which the difference between the melting point and the crystallization temperature is adjusted (see, for example, JP 5987335 B); in which an organic salt is added to a resin material (see, for example, JP 2017-222859 A); in which a fabric of a molding precursor is laminated with a thermoplastic resin (see, for example, JP 2009-19202 A); and in which the adhesive strength, the affinity, etc. at the interface between the continuous reinforcing fiber and the resin are good (see, for example, WO 2019/208586 A1).

However, there is room for improvement in that all of the conventional continuous fiber reinforced resin composite materials lack sufficient interface recoverability and strength stability because the interfacial thickness changes before and after a fracture test.

In view of the level of such conventional art, by further providing the characteristics described in [30] below, it is possible to provide a fiber reinforced resin composite material having high vibration fatigue recoverability and strength stability, and a method of producing the same.

[30]

A continuous fiber reinforced resin composite material of any one of [1] to [5], the continuous fiber reinforced resin composite material comprising continuous reinforcing fibers and a thermoplastic resin, wherein an interfacial coverage ratio change index of the continuous fiber reinforced resin composite material expressed by the following formula is 0.8 to 1.2:

(the interfacial coverage ratio change index) = (an interfacial coverage ratio of the continuous fiber reinforced resin composite material before a fracture test) /(the interfacial coverage ratio of the continuous fiber reinforced resin composite material after the fracture test).

The continuous fiber reinforced resin composite material according to [30], wherein a reinforcing fiber exposure change index expressed by the following formula is 0.8 to 1.2:

(the reinforcing fiber exposure change index) = (a reinforcing fiber exposure ratio of the continuous fiber reinforced resin compsite material before a fracture test) /(a reinforcing fiber exposure ratio of the continuous fiber reinforced resin composite material after the fracture test).

The continuous fiber reinforced resin composite material of [30] or [31], wherein a relative elemental change index of interfacial nitrogen is 0.8 to 1.2.

[33]

The continuous fiber reinforced resin composite material of any one of [30] to [32], wherein the relative elemental change index of interfacial carbon is 0.8 to 1.2.

[34]

The continuous fiber reinforced resin composite material of any one of [30] to [33], wherein a relative elemental change index of interfacial aluminum is 0.8 to 1.2.

[35]

The continuous fiber reinforced resin composite material of any one of [30] to [34], wherein a relative elemental change index of interfacial silicon is 0.8 to 1.2.

[36]

The continuous fiber reinforced resin composite material of any one of [30] to [35], wherein a relative elemental change index of interfacial calcium is 0.8 to 1.2.

[37]

The continuous fiber reinforced resin composite material of any one of [30] to [36], wherein a relative elemental change index of interfacial oxygen is 0.8 to 1.2.

[38]

A method of producing the continuous fiber reinforced resin composite material according to any one of [30] to [37], wherein a speed at which the continuous reinforcing fibers are impregnated with the thermoplastic resin is 0.8 to 1.2 times a speed at which coupling continuous reinforcing fibers treated only with the coupling agent are impregnated with the thermoplastic resin, and a bending strength of a coupling continuous fiber reinforced resin composite material comprising the coupling continuous reinforcing fibers and the thermoplastic resin is 0.6 times or more of a bending strength of the continuous fiber reinforced resin composite material.

Advantageous Effect

The continuous fiber reinforced resin composite material of the present disclosure has good acoustic emission signals and can exhibit high strength, elastic modulus, and water absorption characteristics. In addition, it preferably has fatigue characteristics, physical property stability, warping characteristic, and shape conformability.

In addition, because the continuous fiber reinforced resin composite material according to the present disclosure has the characteristic (II) to be described below, the continuous fiber reinforced resin composite material can further exhibit high bending fatigue characteristics because the interfacial resin is sufficiently thin.

In addition, because the continuous fiber reinforced resin composite material according to the present disclosure has the characteristic (III) to be described below, the continuous fiber reinforced resin composite material has excellent crystalline behavior in the surface layer and the inner layer, which further results in good warping characteristic and shape conformability.

In addition, because the continuous fiber reinforced resin composite material according to the present disclosure has the characteristic (IV) to be described below, the continuous fiber reinforced resin composite material has a good interfacial polishing value, and high strength, elastic modulus, impact characteristic and high-temperature characteristics, water absorption characteristics, and interfacial recoverability can be further exhibited.

In addition, because the continuous fiber reinforced resin composite material according to the present disclosure has the characteristic (V) to be described below, the continuous fiber reinforced resin composite material further has high vibration fatigue recoverability and excellent strength stability.

BRIEF DESCRIPTION OF THE DRAWINGS

In the accompanying drawings:

FIG. 1 is a schematic diagram illustrating a single yarn of continuous reinforcing fiber and a resin ball (μ drop) of a thermoplastic resin made to be attached to the single yarn of the continuous reinforcing fiber.

DETAILED DESCRIPTION

The following provides a detailed description of an embodiment of the present disclosure (hereinafter, referred to as the "present embodiment"). However, the present disclosure is not limited to the following embodiments and may be implemented with various alterations that are within the essential scope thereof.

[Continuous Fiber Reinforced Resin Composite Material]

A continuous fiber reinforced resin composite material of the present embodiment (hereinafter simply referred to as "composite material") contains continuous reinforcing fibers and a resin, and the AE count A determined by the following formula is 0.30 or less, in acoustic emission signals during a bending test. The above continuous reinforcing fiber preferably contains a surface treatment agent.

$$(AE\ \text{count}\ A) = (\text{the number of } AE\ \text{signals having an amplitude of 40 dB or more and duration of 3,500}\ \mu\ \text{seconds or shorter})/(\text{the total number of the } AE\ \text{signals})$$

The above AE count A is preferably 0.25 or less, and more preferably 0.21 or less. When the AE count A is within this range, the binding agent among the surface treatment agents for the continuous reinforcing fibers contained in the continuous fiber reinforced resin composite material diffuses into the thermoplastic resin and promotes bonding between the thermoplastic resin and amino silane, and the concentration of active sites of the surface treatment agent increases, resulting in good adhesion between the continuous reinforcing fibers and thermoplastic resin. As a result, they are less likely to fracture, resulting in excellent strength, elastic modulus, water absorption characteristics, high-temperature characteristics, fatigue characteristics, impact characteristics, warping characteristic, physical property stability, and shape conformability.

The method of adjusting the number of signals to the above range includes, for example, a method of producing a continuous fiber reinforced resin composite material in which the interfacial amount of the continuous fiber reinforced resin composite material is set to 100,000 $m^{-1}$ or more, the heating rate is set to 200 to 330° C./min, the cooling rate is set to 10 to 120° C./min, and the difference in SP values between the binding agent contained in the continuous reinforcing fibers and the thermoplastic resin is set to 0.01 to 5. Note that the difference in SP values may be defined as the absolute value of the difference between the SP value of the binding agent for the continuous reinforcing fibers and the SP value of the thermoplastic resin. The SP value can be measured by using the method described in the Examples section below.

In the present disclosure, acoustic emission signals of the continuous fiber reinforced resin composite material can be obtained by attaching an acoustic emission sensor to a bending test jig and sensing sound emitted from the continuous fiber reinforced resin composite material during a bending test with the above sensor. The above AE count A is obtained by measuring the number of acoustic emission signals and the total number of AE signals generated in the range of an amplitude of 40 dB or more and a duration of 3,500 μseconds or shorter, and specifically can be determined by the method described in Examples to be described below.

In the continuous fiber reinforced resin composite material of the present embodiment, the number of acoustic emission signals having an amplitude of 40 dB or more and a duration of 3,500 μseconds or shorter in acoustic emission signals during a bending test is preferably 600 or less, more preferably 550 or less, and even more preferably 500 or less.

When the number of signals mentioned above is in this range, a good adhesion is achieved between the continuous reinforcing fibers and the resin contained in the continuous fiber reinforced resin composite material and the two are less likely to fracture, and excellent strength, elastic modulus, water absorption characteristics, high-temperature characteristics, fatigue characteristics, impact characteristics, and warping characteristic can be exhibited.

The method of adjusting the number of signals to the above range includes, for example, a method in which the interfacial amount of the continuous fiber reinforced resin composite material is set to 100,000 $m^{-1}$ or more, the basis weight of the base material of continuous reinforcing fibers is set to 637 $g/m^2$ or more, the ratio of the charged volume of the thermoplastic resin is set to 45% or more, the heating rate is set to 200 to 330° C./min, the cooling rate is set to 10 to 120° C./min, the end group concentration of the thermoplastic resin is set to 70 μmol/g or more, and the interfacial shear strength between surface treatment agent-containing continuous reinforcing fibers and the thermoplastic resin is set to 0.5 to 0.5 times that between coupling agent-treated continuous reinforcing fibers treated only with a coupling agent instead of the surface treatment agent and the thermoplastic resin.

In the continuous fiber reinforced resin composite material of the present embodiment, the number of acoustic emission signals having an amplitude of 25 to 30 dB and a duration of 1,000 μseconds or shorter in acoustic emission signals during a bending test is preferably 200 or more, more preferably 300 or more, and even more preferably 350 or more.

When the number of signals mentioned above is in this range, a good adhesion is achieved between the continuous reinforcing fibers and the resin contained in the continuous fiber reinforced resin composite material and the two are less likely to fracture, and excellent strength, elastic modulus, water absorption characteristics, high-temperature characteristics, fatigue characteristics, impact characteristics, and warping characteristic can be exhibited.

The method of adjusting the number of signals to the aforementioned range includes, for example, a method in which the cooling rate is set to 10 to 120° C./min during the production of the continuous fiber reinforced resin composite material, the degree of crystallinity of the resin contained in the continuous fiber reinforced resin composite material is set to 20 to 40%, the ratio of the charged volume of the thermoplastic resin is set to 45% or more, and the cooling compression time is set to 1 to 10 minutes.

In acoustic emission signals during a bending test, the continuous fiber reinforced resin composite material of the present embodiment has total number of AE signals of preferably 2000 or more, more preferably 2500 or more, and even more preferably 3000 or more. The above total number of AE signals is preferably 25000 or less, more preferably 20000 or less, even preferably 10000 or less, and still even preferably 5000 or less.

When the number of signals mentioned above is in this range, a good adhesion is achieved between the continuous reinforcing fibers and the resin contained in the continuous fiber reinforced resin composite material and the two are less likely to fracture, and excellent strength, elastic modulus, water absorption characteristics, high-temperature characteristics, fatigue characteristics, impact characteristics, and warping characteristic can be exhibited.

The method of adjusting the number of signals to the above range includes, for example, the method in which the interfacial amount of the continuous fiber reinforced resin composite material is set to 100,000 $m^{-1}$ or more, the degree of crystallinity of the resin contained in the continuous fiber reinforced resin composite material is set to 20 to 40%, the cooling compression time is set to 1 to 10 minutes, and the μ droplet contact angle between the surface treatment agent-containing continuous reinforcing fibers and the thermoplastic resin is set to 0.4 to 0.7 times the μ droplet contact angle between surface treatment agent-free continuous reinforcing fibers free of a surface treatment agent and the thermoplastic resin, measured by the μ droplet method, and the end group concentration of the thermoplastic resin is 70 μmol/g or more.

In the continuous fiber reinforced resin composite material of the present embodiment, the AE count B determined by the following formula is preferably 0.12 or more, more preferably 0.15 or more, and even more preferably 0.20 or more, in acoustic emission signals during a bending test:

$$(AE\ \text{count}\ B) = (\text{number of } AE \text{ signals having an amplitude of 25 to 30 dB and a duration of 1000 } \mu \text{ seconds or shorter})/(\text{total number of the AE signals}).$$

When the number of signals mentioned above is in this range, a good adhesion is achieved between the continuous reinforcing fibers and the resin contained in the continuous fiber reinforced resin composite material and the two are less likely to fracture, and excellent strength, elastic modulus, water absorption characteristics, high-temperature characteristics, fatigue characteristics, impact characteristics, and warping characteristic can be exhibited.

The method of adjusting the number of signals to the aforementioned range includes, for example, a method in which the interfacial amount of the continuous fiber reinforced resin composite material is set to 100,000 $m^{-1}$ or more, the heating rate is set to 200 to 330° C./min, the cooling rate is set to 10 to 120° C./min, and the end group concentration of the thermoplastic resin is set to 70 μmol/g or more.

The atmospheric equilibrium water absorption ratio of the continuous fiber reinforced resin composite material of the present embodiment is preferably 0.75 mass % or less, and more preferably 0.70 mass % or less.

Note that the atmospheric equilibrium water absorption ratio refers to the water absorption ratio under an environment of 23° C. and 50% humidity.

When the atmospheric equilibrium water absorption ratio is in this range, excellent strength, elastic modulus, water absorption characteristics, high-temperature characteristics, fatigue characteristics, impact characteristics, and warping characteristic can be exhibited.

[Form of Continuous Fiber Reinforced Resin Composite Material]

The form of the continuous fiber reinforced resin composite material is not particularly limited, and the following various forms are possible. Examples include a form in which continuous reinforcing fibers in the form of a woven fabric, knitted fabric, non crimp fabric, braid string, or pipe are compounded with a thermoplastic resin, a form in which continuous reinforcing fibers aligned in one direction are compounded with a thermoplastic resin, a form in which yarns composed of continuous reinforcing fibers and a thermoplastic resin are aligned in one direction and molded, a form in which yarns composed of continuous reinforcing fibers and a thermoplastic resin are align in one direction and shaped, and a form in which yarns composed of continuous reinforcing fibers and a thermoplastic resin are formed into a woven fabric, a knitted fabric, a braid string, or a pipe, and are then shaped, for example.

The continuous fiber reinforced resin composite material of this embodiment may be a flat plate which may be a laminate comprising layers of continuous reinforcing fibers and layers of a thermoplastic resin. For example, the length direction of the continuous reinforcing fibers may be aligned so as to be substantially parallel to the surface of the flat plate. The term layer of continuous reinforcing fibers refers to a layer which includes continuous reinforcing fibers (e.g., base material of the continuous reinforcing fibers), and may be a layer in which a thermoplastic resin is impregnated inside the continuous reinforcing fibers.

Examples of the form of an intermediate material before being shaping into the continuous fiber reinforced resin composite material include, but are not particularly limited, combined filament yarns of continuous reinforcing fibers and resin fibers; coated yarns in which the periphery of a bundle of continuous reinforcing fibers is coated with a resin; continuous reinforcing fibers having a resin impregnated therein are formed into a tape; continuous reinforcing fibers sandwiched between resin films; continuous reinforcing fibers having resin powder adhered thereto; a braid made of a bundle of continuous reinforcing fibers as a core material and resin fibers surrounding the bundle; reinforcing fibers in which a resin has been impregnated between the reinforcing fibers; and reinforcing fibers in which in which the reinforcing fibers and the molten resin are brought into contact with each other.

[Method of Producing Continuous Fiber Reinforced Resin Composite Material]

The method of producing the continuous fiber reinforced resin composite material of the present embodiment is not particularly limited, and a wide variety of methods may be used.

In one method, base materials composing a continuous fiber reinforced resin composite material (e.g., a base material made of continuous reinforcing fibers and a base material made of a thermoplastic resin) are cut or shaped according to a desired composite material. The sheets of the base materials are laminated or stacked in number that is determined based on the thickness of an intended product, and are set in a mold so as to conform to the shape of the mold.

In present specification, a laminate in which the base materials constituting the continuous fiber reinforced resin composite material are laminated, to be set in a mold (the laminate placed in the mold just before heat molding) is sometimes referred to as the raw material laminate.

The base materials may be cut one by one, or may be cut after a desired number of sheets are overlapped one another. From the viewpoint of the productivity, it is preferable to cut the base materials after they are overlapped one another. The cutting may be achieved by any means, such as a water jet, a saw blade press machine, a hot saw blade press machine, a laser, and a plotter, for example. Of these, a hot saw blade press machine is preferably used because a good cross section is obtained and a laminate of a multiple sheets of base materials is cut while cut ends are welded together, which improves the handability. Although an appropriate cutting shape can be identified through try and error, it is preferable that the appropriate cutting shape is determined according to the shape of a mold through a simulation by computer aided engineering (CAE).

The base materials may be shaped in any manner, and may be formed into a sheet shape, for example.

After the base materials (e.g., raw material laminate) are set in a mold, the mold is closed and is compressed. The temperature of the mold is adjusted to a temperature equal to or higher than the melting point of the thermoplastic resin composing the continuous fiber reinforced resin composite material to cause the thermoplastic resin to melt and be shaped. The mold clamping pressure is, but not limited to, preferably 1 MPa or more, and more preferably 3 MPa or more. Furthermore, after the mold is clamped and compression molding is carried out, the mold clamping pressure may be released for degassing or the like. It is preferable that compression molding is carried out for as long time as possible to the extent where the thermoplastic resin which is used does not undergo thermal aging from the viewpoint of imparting a strength. Nevertheless, from the viewpoint of the productivity, the compression molding time is preferably within 2 minutes, more preferably within 1 minute.

In the production method of the continuous fiber reinforced resin composite material of the present embodiment, it is preferable that the interfacial amount of the continuous fiber reinforced composite material is 100,000 $m^{-1}$ or more, the heating rate is 200 to 330° C./min, and the cooling rate is 10 to 120° C./min. Furthermore, it is more preferable that the degree of crystallinity of the resin contained in the continuous fiber reinforced resin composite material is 20 to 40%, the basis weight of the base material of the continuous reinforcing fibers is 637 g/$m^2$ or more, the volume ratio of the thermoplastic resin is 45% or more of the total raw material, the cooling compression time is 1 to 10 minutes, the end group concentration of the thermoplastic resin is 70 μmol/g or more.

The interfacial amount of the continuous fiber reinforced composite material is the amount of interface where the continuous reinforcing fiber and the matrix resin contact with each other, and is determined by the following formula.

$$\text{(Interfacial amount } (m^{-1})) = \text{(volume of reinforcing fibers in the continuous fiber reinforced resin composite material } (m^3)) \times \text{(density of the reinforcing fibers } (g/m^3)) \times \text{(number of single yarns of the reinforccing fibers)} \times \text{(diameter of the reinforcing fibers (m))} \times \pi / \text{(fiber fineness of the reinforcing fibers } (g/m)) / \text{(volume of the continuous fiber reinforced resin composite material } (m^3))$$

The interfacial amount is preferably 100,000 $m^{-1}$ or more, more preferably 120,000 $m^{-1}$ or more, and even more preferably 130,000 $m^{-1}$ or more. The upper limit is not particularly set, but it is preferably 1,000,000 $m^{-1}$ or less and more preferably 500,000 $m^{-1}$ or less.

As the interfacial amount of the continuous fiber reinforced composite material increases, the number of AE signals having an amplitude of 40 dB or more and a duration of 3500 μseconds or shorter of the continuous fiber reinforced composite material tends to decrease, the number of AE signals having an amplitude of 25 to 30 dB and a duration of 1000 μseconds or shorter tends to increase, and the total AE count number tends to increase.

The heating rate of the continuous fiber reinforced composite material refers to the rate at which the base materials constituting the continuous fiber reinforced composite material are heated after being set in a molding machine.

The heating rate is preferably 200 to 330° C./min, more preferably 230 to 300° C./min, and even more preferably 250 to 280° C./min.

As the heating rate decreases, the AE count A tends to decrease, the number of acoustic emission signals having an amplitude of 40 dB or more and a duration of 3500 μseconds or shorter tends to decrease, and the AE count B tends to increase.

The cooling rate of the continuous fiber reinforced composite material refers to the rate at which the base materials constituting the continuous fiber reinforced composite material are cooled by water cooling or other means after being set in a molding machine, melted and compressed.

The cooling rate is preferably 10 to 120° C./min, more preferably 20 to 100° C./min, and even more preferably 30 to 90° C./min.

As the cooling rate decreases, the AE count A tends to decrease, the number of acoustic emission signals having an amplitude of 40 dB or more and a duration of 3,500 μseconds or shorter tends to decrease, the number of acoustic emission signals having an amplitude of 25 to 30 dB and a duration of 1000 μseconds or shorter tends to increase, and the AE count B tends to increase.

The degree of crystallinity of the resin contained in the continuous fiber reinforced resin composite material is the degree of crystallinity of the resin when it is in the state of the continuous fiber reinforced composite material, and is the percentage of crystalline regions in the total resin.

The degree of crystallinity is preferably 20 to 40%, more preferably 25 to 35%, and even more preferably 28 to 33%.

As the degree of crystallinity increases, the number of acoustic emission signals having an amplitude of 25 to 30 dB and a duration of 1,000 μseconds or shorter increases, and the total number of AE signals tends to increase.

The degree of crystallinity of the resin contained in the continuous fiber reinforced resin composite material can be measured using a differential scanning calorimeter, and specifically can be measured by the method described in Examples to be described below.

The basis weight of base material of the continuous reinforcing fibers refers to the mass per 1 $m^2$ of the base material of the continuous reinforcing fibers (fiber cloth, etc.) used for production of the continuous fiber reinforced resin composite material.

The basis weight of the continuous fiber base material is preferably 637 $g/m^2$ or more, more preferably 640 to 700 $g/m^2$, and even more preferably 650 to 690 $g/m^2$.

As the basis weight of the continuous fiber base material increase, the number of AE signals having an amplitude of 40 dB or more and a duration of 3500 μseconds or shorter of the continuous fiber reinforced composite material tends to decrease, and the number of AE signals having an amplitude of 25 to 30 dB and a duration of 1000 μseconds or shorter tends to increase, and the total AE count number tends to increase.

The ratio of the charged volume of the thermoplastic resin is the ratio of the volume of the raw thermoplastic resin to the total volume of the raw materials charged in production of the continuous fiber reinforced resin composite material.

It is preferable that the ratio of the charged volume of the thermoplastic resin in the preparation is preferably 45% or more, and more preferably 50% or more. The upper limit is not set, but it is preferably 75% or less, and more preferably 65% or less.

As the ratio of the charged volume of the thermoplastic resin increases, the number of AE signals having an amplitude of 40 dB or more and a duration of 3500 μseconds or shorter of the continuous fiber reinforced composite material tends to decrease, the number of AE signals having an amplitude of 25 to 30 dB and a duration of 1000 μseconds or shorter tends to increase, and the total AE count number tends to increase.

The cooling compaction time refers to the time duration during which the base materials constituting the continuous fiber reinforced composite material are cooled by water cooling or other means and compressed after being set in the molding machine, molten and compressed.

The cooling compression time is preferably from 1 to 10 minutes, more preferably 2 to 9 minutes, and even more preferably 3 to 8 minutes.

As the cooling compression time shortens, the number of AE signals having an amplitude of 40 dB or more and a duration of 3500 μseconds or shorter of the continuous fiber reinforced composite material tends to decrease, and the number of AE signals having an amplitude of 25 to 30 dB and a duration of 1000 μseconds or shorter tends to increase, and the total AE count number tends to increase.

The end group concentration of a thermoplastic resin refers to the amount of the end group present in 1 g of the resin.

The end group concentration of the thermoplastic resin is preferably 70 μmol/g or more, preferably 100 to 300 μmol/g, and more preferably 120 to 270 μmol/g.

As the end group concentration of the thermoplastic resin increases, the number of AE signals having an amplitude of 25 to 30 dB and a duration of 1000 μseconds or shorter tends to increase, and the total AE count number tends to increase.

The end group concentration of the thermoplastic resin can be measured using $^1$H-NMR, and specifically can be measured by the method described in Examples to be described below.

The SP values of the binding agent of the continuous reinforcing fibers and the thermoplastic resins mentioned above are values related to the solubility of the respective substances. The difference in SP values between the binding agent for the continuous reinforcing fibers and the thermoplastic resin is preferably 0.01 to 5, more preferably 0.01 to 4, even more preferably 0.01 to 3, and still even more preferably 0.01 to 2.

As the difference in SP value between the binding agent for the continuous reinforcing fibers and the thermoplastic resin described above decreases, the AE count A tends to decrease.

Additionally, a hybridizing thermoplastic resin composition may be injected to the continuous fiber reinforced resin composite material to produce a hybrid composite material through injection filling. The production step of a hybrid composite material may include setting the base materials into a mold and closing the mold, pressing the mold, waiting for a predetermined period of time, and then injecting a certain hybridizing thermoplastic resin composition into the mold to cause the thermoplastic resin of the base material and the hybridizing thermoplastic resin composition to be joined together to produce a hybrid composite material.

The timing of injection filling of the certain hybridizing thermoplastic resin composition greatly affects the interfacial strength between the base materials of the thermoplastic resins. The timing of injection filling of the certain hybridizing thermoplastic resin composition is preferably within 30 seconds after the temperature of the mold reaches the melting point or higher or the glass transition temperature or higher of the thermoplastic resin composing the base material, after the base materials are set in the mold and the mold is closed.

The mold temperature at which the certain hybridizing thermoplastic resin composition is injection filled is preferably equal to or higher than the melting point or equal to or higher than the glass transition temperature of the thermoplastic resin which composes the base material, and which is to be bonded to the hybridizing thermoplastic resin composition. The mold temperature is more preferably a temperature of the melting point plus 10° C. or higher or the glass transition temperature plus 10° C. or higher of the thermoplastic resin which composes the base material, and which is to be joined with the hybridizing thermoplastic resin composition, and is more preferably a temperature of the melting point plus 20° C. or higher or the glass transition temperature plus 20° C. or higher, even more preferably a temperature of the melting point plus 30° C. or higher or the glass transition temperature plus 30° C. or higher.

In the hybrid composite material, it is preferable that the joined portion formed by injection molding between the thermoplastic resin composing the base material and the hybridizing thermoplastic resin composition has irregularities where the both resins are mixed together.

Setting the mold temperature to be equal to or higher than the melting point of the hybridizing thermoplastic resin composition to be injected, and setting the resin holding pressure during injection molding to a high value, for example, so as to be equal or higher than 1 MPa are effective in improving the interfacial strength. For enhancing the interfacial strength, the above holding pressure is preferably set to 5 MPa or more, and more preferably 10 MPa or more.

Further, from the viewpoint of enhancing the interfacial strength, it is preferable to keep the mold pressure for long time, for example, for 5 seconds or longer, preferably 10 seconds or longer, and more preferably a time period until the mold temperature becomes equal to or lower than the melting point of the thermoplastic resin composition.

(Hybridizing Thermoplastic Resin Composition)

The hybridizing thermoplastic resin composition which is used for injection molding to produce a hybrid composite material is not particularly limited as long as it is a thermoplastic resin composition generally used for injection molding.

Examples of the thermoplastic resin contained in the hybridizing thermoplastic resin composition include, but are not limited to, resin compositions obtained by mixing one or two or more thermoplastic resins, such as polyethylene, polypropylene, polyvinyl chloride, acrylic resins, styrene-based resins, polyethylene terephthalate, polybutylene terephthalate, polyarylate, polyphenylene ether, modified polyphenylene ether resins, fully aromatic polyester, polyacetal, polycarbonate, polyetherimide, polyether sulfone, polyamide-based resins, polysulfone, polyether ether ketone, and polyether ketone.

The hybridizing thermoplastic resin composition may contain any of various fillers blended thereto. The hybridizing thermoplastic resin composition may be a black resin composition containing a colorant.

Examples of the filler include short- and long-fiber materials, which are non-continuous reinforcing materials of the same material as the material of the continuous reinforcing fibers.

When glass short or long fibers are used as the non-continuous reinforcing material, the same bundling agent as the bundling agent applied to the continuous reinforcing fibers composing the continuous fiber reinforced resin composite material of the present embodiment may be used. The bundling agent (sizing agent) is preferably one or more selected from the group consisting of a silane coupling agent, a lubricant, and a binding agent. As the silane coupling agent, the lubricant, and the binding agent, those used for the bundling agent for the continuous reinforcing fibers can be used.

The thermoplastic resin contained in the hybridizing thermoplastic resin composition used for injection molding is preferably a thermoplastic resin similar to, more preferably the same thermoplastic resin composition as, the thermoplastic resin composing the continuous fiber reinforced resin composite material, from the viewpoint of the interfacial strength with the thermoplastic resin to be joined together. Specifically, when polyamide 66 is used as the thermoplastic resin for the surface to be joined, the resin material in the thermoplastic resin composition used for injection molding is preferably polyamide 66.

Other examples include a molding method in which base materials are set in a mold and the mold is compressed by a double belt press machine; a method in which a mold frame is disposed so as to surround the four sides of arranged base materials and is pressurized by a double belt press machine for achieving molding; a method in which a compression molding machine set to one or more temperatures is used together with a compression molding machine for cooling set to one or more temperatures, and a mold having base materials set therein is loaded to the compression molding machines in sequence for achieving molding or to a continuous compression molding machine for achieving pressing and molding.

In the method of pressurizing and molding by a double belt press machine or a continuous compression molding machine, the material of the belt or the mold is different from the continuous fiber reinforced resin composite material to be molded, and is preferably made of a metal or ceramic for durability. The continuous reinforcing fiber base material and the thermoplastic resin to be fed may be laminated.

(Continuous Reinforcing Fibers)

The continuous reinforcing fibers may be continuous reinforcing fibers generally used for continuous fiber reinforced resin composite materials.

Examples of the continuous reinforcing fibers include, but are not limited to, glass fibers, carbon fibers, plant fibers, aramid fibers, ultra-high strength polyethylene fibers, polybenzazole-based fibers, liquid crystal polyester fibers, polyketone fibers, metal fibers, and ceramic fibers.

Glass fibers, carbon fibers, plant fibers, and aramid fibers are preferable from the viewpoint of mechanical properties, thermal properties, and versatility, whereas glass fibers are preferable from the viewpoint of the productivity.

One type of continuous reinforcing fibers mentioned above may be used alone, or two or more types may be used in combination.

The above continuous reinforcing fibers may be treated with a surface treatment agent (preferably a bundling agent as described below).

—Bundling Agent—

A bundling agent is preferably made to be adhered to the continuous reinforcing fibers.

In the case where glass fibers are selected as continuous reinforcing fibers, a bundling agent may be used as a surface treatment agent.

The bundling agent (sizing agent) may include one or more selected from the group consisting of a coupling agent (e.g., a silane coupling agent), a lubricant, and a binding agent, preferably includes at least a binding agent or a silane coupling agent. In the continuous fiber reinforced resin composite material having the characteristic (V), it is more preferably composed only of one or more selected from the group consisting of a coupling agent, a lubricant, and a binding agent.

However, those made only of a silane coupling agent are excluded.

The bundling agent may also composed of a silane coupling agent and a binding agent, or may composed of a silane coupling agent, a lubricant, and a binding agent.

The continuous fiber reinforced resin composite material having a low porosity can be obtained by using a bundling agent that forms strong bonding between the continuous reinforcing fibers (e.g., glass fibers) and the resin coated around the fibers.

The bundling agent may be added externally to a material used or may be included internally in a material used. For example, a lubricant may be included in a commercial thermoplastic resin product used.

Coupling agents are compounds that combine materials with different properties, primarily inorganic and organic materials. Examples of the coupling agent include, but are not limited to, a silane coupling agent, a polymer coupling agent, and a polymerizable coupling agent. In view of compatibility between thermoplastic resin and the continuous reinforcing fibers, a silane coupling agent is preferred.

—Silane Coupling Agent—

The silane coupling agent is generally used as a surface treatment agent for the continuous reinforcing fibers (e.g., glass fibers or carbon fibers), and contributes to enhance the interfacial adhesive strength.

Examples of the silane coupling agent include, but are not limited to, aminosilanes such as γ-aminopropyl trimethoxysilane, γ-aminopropyl triethoxysilane, and N-β-(aminoethyl)-γ-aminopropylmethyl dimethoxysilane; mercaptosilanes such as γ-mercaptopropyl trimethoxysilane and γ-mercaptopropyl triethoxysilane; epoxysilanes; vinylsilanes, and maleic acid. In the case where a polyamide is used as the thermoplastic resin, it is preferable to select a polyamide that easily bonds to carboxyl or amino groups which are the end groups of the polyamide-based resin, and amino silanes are preferred.

Examples of the polymer coupling agents include, but are not limited to, diamines, polycarboxylic acids, and epoxies. In view of compatibility with the thermoplastic resin, diamines and polycarboxylic acids are preferred.

Examples of polymerizable coupling agents include, but are not limited to, epoxies, phenols, ethers, and lactones, for example. From the viewpoint of compatibility with the thermoplastic resin, phenols and lactones are preferred.

—Lubricant—

The lubricant contributes to improving the spreadability of the continuous reinforcing fibers (e.g., glass fibers).

As the lubricant, any conventional liquid or solid lubricating materials can be used according to the intended purpose as long as it doe not inhibit a silane coupling agent and a binding agent, and examples thereof include, but are not limited to, animal or plant waxes or mineral waxes such as carnauba wax and lanolin wax; and surfactants such as fatty acid amides, fatty acid esters, fatty acid ether, aromatic esters, and aromatic ether.

—Binding Agent—

The binding agent contributes to improving the bundlability and the interfacial adhesive strength of the continuous reinforcing fibers (e.g., glass fibers).

As the binding agent, a polymer or a thermoplastic resin other than the thermoplastic resin serving as the primary material of the continuous fiber reinforced resin composite material can be used according to the intended purpose.

Examples of the polymer as the binding agent include, but are not limited to, a homopolymer of acrylic acid, a copolymer of acrylic acid and another copolymerizable monomer, a copolymer of an acrylic acid ester and/or methacrylic acid ester with a copolymerizable monomer, and salts of primary, secondary, and tertiary amines with these, for example. In addition, polyurethane-based resins synthesized from an isocyanate such as m-xylylene diisocyanate, 4,4'-methylenebis(cyclohexylisocyanate), and isophorone diisocyanate, and a polyester- or polyether-based diol are also suitably used, for example.

The homopolymer of acrylic acid has a weight average molecular weight of preferably from 1,000 to 90,000 and more preferably from 1,000 to 25,000.

The other polymerizable monomer composing the copolymer of acrylic acid and the other copolymerizable monomer is, but not limited to, one or more monomers selected from the group consisting of acrylic acid, maleic acid, methacrylic acid, vinyl acetic acid, crotonic acid, isocrotonic acid, fumaric acid, itaconic acid, citraconic acid, and mesaconic acid (except for cases where only acrylic acid is used), among monomers having a hydroxyl group and/or carboxyl group, for example. It is preferable that the copolymerizable monomer includes one or more ester-based monomers.

In the continuous fiber reinforced resin composite material having the characteristic (III), in the copolymer of an acrylic acid ester and/or methacrylic acid ester and a copolymerizable monomer, an example of the acrylic acid ester is methyl acrylate, and an example of the above methacrylic acid ester is methyl methacrylate. Examples of the above copolymerizable monomer include one or more monomers selected from the group consisting of acrylic acid, maleic acid, maleic anhydride, methacrylic acid, vinyl acetic acid, crotonic acid, isocrotonic acid, fumaric acid, itaconic acid, citraconic acid, and mesaconic acid (preferably, maleic anhydride). Among these, a copolymer of one acrylic acid ester, one methacrylic acid ester, and one copolymerizable monomer are particularly preferred. The above copolymer has a weight average molecular weight of preferably from 1,000 to 90,000 and more preferably from 1,000 to 25,000.

In the continuous fiber reinforced resin composite material having the characteristic (V), examples of the copolymer of an methacrylic acid ester and a copolymerizable monomer include a copolymerizable monomer of methyl methacrylate or ethyl methacrylate (preferably methyl methacrylate) and one or more copolymerizable monomers selected from the group consisting of acrylic acid, maleic acid, maleic anhydride, methacrylic acid, vinyl acetic acid, crotonic acid, isocrotonic acid, fumaric acid, itaconic acid, citraconic acid, trimellitic anhydride, pyromellitic dianhydride, and mesaconic acid (preferably maleic anhydride). For example, it may be a copolymer of one methacrylic acid ester and one copolymerizable monomer. The mass ratio of the constituent unit derived from the methacrylic acid ester with respect to 100 mass % of the copolymer of the methacrylic acid ester and the copolymerizable monomer is preferably from 30 to 98 mass %, more preferably from 60 to 95 mass %. The mass ratio of the constituent unit derived from the copolymerizable monomer with respect to 100 mass % of the copolymer of the methacrylic acid ester and the copolymerizable monomer is preferably from 2 to 70%, more preferably from 5 to 40 mass %. The copolymer of methacrylic acid ester and the copolymerizable monomer has a weight average molecular weight of preferably from 1,000 to 90,000 and more preferably from 1,000 to 25,000.

Examples of primary, secondary, and tertiary amines of a homopolymer or copolymer of acrylic acid include, but are not limited to, triethylamine salts, triethanolamine salts, and glycine salts, for example. The degree of neutralization is preferably 20 to 90%, and more preferably 40 to 60%, from the viewpoint of improving the stability of a mixed solution with other agents (such as a silane coupling agent) which are used together, and reducing the amine odor.

The weight average molecular weight of the polymer of acrylic acid composing the salt is not particularly limited, but is preferably in the range of 3,000 to 50,000. It is preferably 3,000 or more from the viewpoint of improving the bundlability of the continuous reinforcing fibers (e.g., glass fibers), and is preferably 50,000 or less from the viewpoint of improving the properties when being formed into a composite shaped article.

In the case where polyamide is used as the thermoplastic resin, it is preferable to use a resin that has good wettability to the polyamide resin or has a surface tension close to that of the polyamide resin as the binding agent. Specifically, for example, an emulsion of a polyurethane resin or an emulsion of a polyamide resin or a modified product thereof can be selected.

Examples of the thermoplastic resin used as the binding agent include, but are not limited to, polyolefin-based resins, polyamide-based resins, polyurethane-based resins, polyacetal-based resins, polycarbonate-based resins, polyester-based resins, polyether ketone, polyether ether ketone, polyether sulfone, polyphenylene sulfide, thermoplastic polyetherimide, thermoplastic fluorine-based resins, and modified thermoplastic resins produced by modifying these resins, for example. It is preferable that the thermoplastic resin used as the binding agent is a thermoplastic resin and/or a modified thermoplastic resin which is the same as the resin covering the peripheries of continuous reinforcing fibers, because the adhesion between the glass fibers and the thermoplastic resin is improved after they are processed into a composite material.

Further, the thermoplastic resin used as the binding agent is more preferably a modified thermoplastic resin from the viewpoint of further improving the adhesion between the continuous reinforcing fibers and the thermoplastic resin covering the continuous reinforcing fibers, and reducing the ratio of an emulsifier component or eliminating the need for an emulsifier in a case in which the bundling agent in an aqueous dispersion is made to adhere to the continuous reinforcing fibers (e.g., glass fibers).

Here, the term “modified thermoplastic resin” refers to a material obtained through copolymerization of a monomer component which can form the main chain of the thermoplastic resin with a different monomer component for the purpose of modifying the properties of the thermoplastic resin to thereby modify the hydrophilicity, the crystallinity, the thermodynamic properties, and the like.

Example of the modified thermoplastic resin used as the binding agent include, but are not limited to, modified polyolefin-based resins, modified polyamide-based resins, and modified polyester-based resins.

A modified polyolefin resin as the binding agents refers to a copolymer of an olefinic monomer such as ethylene and propylene and a monomer that is copolymerizable with the olefinic monomer such as an unsaturated carboxylic acid and/or an ester thereof, or a homopolymer of a monomer that is copolymerizable with an olefinic monomer such as an unsaturated carboxylic acid and/or an ester thereof, and is produced by known methods. It may be a random copolymer produced through copolymerization of an olefinic monomer and an unsaturated carboxylic acid and/or an ester thereof, or may be a graft copolymer in which an unsaturated carboxylic acid is grafted to an olefin.

Examples of the olefinic monomer include, but are not limited to, ethylene, propylene, and 1-butene. These monomers may be used alone or in a combination of two or more.

Examples of the monomer copolymerizable with the olefinic monomer include unsaturated carboxylic acids such as acrylic acid, maleic acid, maleic anhydride, methacrylic acid, vinyl acetic acid, crotonic acid, isocrotonic acid, fumaric acid, itaconic acid, citraconic acid, and mesaconic acid, and esterified forms of these unsaturated carboxylic acids (e.g., methyl esters, ethyl esters), for example. These monomers may be used alone or in a combination of two or more.

In the case where the modified polyolefin resin is a copolymerization of an olefinic monomer and a monomer that is copolymerizable with the olefinic monomer, the monomer ratios of the olefinic monomer to the monomer copolymerizable with that olefinic monomer are preferably 60 to 95 mass % of the olefinic monomer to 5 to 40 mass % of the monomer copolymerizable with the olefinic monomer, and more preferably 70 to 85 mass % of the olefinic monomer to 15 to 30 mass % of the monomer copolymerizable with the olefinic monomer, with respect to the total mass of the copolymer taken as 100 mass %. When the mass % of the olefinic monomer is 60 mass % or more, a favorable affinity with the matrix is achieved. On the other hand, when the mass % of the olefinic monomer is 95 mass % or less, a good water dispersibility of the modified polyolefin-based resin is achieved, facilitating uniform application of the modified polyolefin-based resin to the continuous reinforcing fibers.

In the modified polyolefin-based resin used as the binding agent, a modified group such as a carboxyl group introduced through copolymerization may be neutralized with a basic compound. Examples of the basic compound include, but are not limited to, alkalis such as sodium hydroxide and potassium hydroxide; and amines such as ammonia, monoethanolamine, and diethanolamine, for example. The weight average molecular weight of the modified polyolefin-based resin used as a binding agent is not particularly limited, but is preferably 5,000 to 200,000, and more preferably 50,000 to 150,000. It is preferably 5,000 or more from the viewpoint of improving the bundlability of the continuous reinforcing fibers (e.g., glass fibers), and is preferably 200,000 or less from the viewpoint of the emulsification stability when used in a water dispersion.

The modified polyamide-based resin used as the binding agent refers to a modified polyamide compound in which a hydrophilic group such as a polyalkylene oxide chain or a tertiary amine component is introduced to the molecular chain. Such a modified polyamide-based resin can be produced by any of known methods.

A modified polyamide-based resin having a polyalkylene oxide chain introduced to the molecular chain thereof is produced through copolymerization of a modified polyethylene glycol or polypropylene glycol which are partially or entirely modified to a diamine or dicarboxylic acid, for example. A modified polyamide-based resin having a tertiary amine component introduced thereto is produced through copolymerization of aminoethylpiperazine, bisaminopropylpiperazine, α-dimethylamino 8-caprolactam, or the like, for example.

The modified polyester-based resin used as the binding agent refer to a copolymer of a polycarboxylic acid or anhydride thereof and a polyol, and the copolymer has a hydrophilic group in the molecular skeleton thereof including terminals. Such a modified polyester-based resin can be produced by any of known methods.

Examples of the hydrophilic group include a polyalkylene oxide group, a sulfonic acid salt, a carboxyl group, and neutralized salts thereof, for example. Examples of the polycarboxylic acid or anhydride thereof include an aromatic dicarboxylic acid, a sulfonic acid group-containing aromatic dicarboxylic acid, an aliphatic dicarboxylic acid, an alicyclic dicarboxylic acid, and a polycarboxylic acid having three or more functionalities.

Examples of the aromatic dicarboxylic acid include, but are not limited to, phthalic acid, terephthalic acid, isophthalic acid, orthophthalic acid, 1,5-naphthalene dicarboxylic acid, 2,6-naphthalene dicarboxylic acid, and phthalic anhydride, for example.

Examples of the sulfonic acid group-containing aromatic dicarboxylic acid include, but are not limited to, sulfoterephthalic acid salts, 5-sulfoisophthalic acid salts, and 5-sulfoothophthalic acid salts.

Examples of the aliphatic dicarboxylic acid or alicyclic dicarboxylic acid include, but are not limited to, fumaric acid, maleic acid, itaconic acid, succinic acid, adipic acid, azelaic acid, sebacic acid, dimer acids, 1,4-cyclohexanedicarboxylic acid, succinic anhydride, and maleic anhydride, for example.

Examples of polycarboxylic acid having three or more functionalities include, but are not limited to, trimellitic acid, pyromellitic acid, trimellitic anhydride, and pyromellitic anhydride, for example.

Among these, from the viewpoint of improving the heat resistance of the modified polyester-based resin, it is preferable that 40 to 99 mol % of the all polycarboxylic acid components is an aromatic dicarboxylic acid. In addition, from the viewpoint of the emulsification stability when the modified polyester-based resin is used in a water dispersion, it is preferable that 1 to 10 mol % of the all polycarboxylic acid components is a sulfonic acid group-containing aromatic dicarboxylic acid.

Examples of the polyol composing the modified polyester-based resin include diols, as well as polyols with three or more functionalities.

Examples of the diols include, but are not limited to, ethylene glycol, diethylene glycol, polyethylene glycol, propylene glycol, polypropylene glycol, polybutylene glycol, 1,3-propanediol, 1,4-butanediol, 1,6-hexanediol, neopentyl glycol, polytetramethylene glycol, 1,4-cyclohexanediol, 1,4-cyclohexanedimethanol, and Bisphenol A and an alkylene oxide adduct thereof, for example. Examples of the polyols having three or more functionalities include trimethylolpropane, glycerin, and pentaerythritol.

The copolymerization ratio of the polycarboxylic acid or anhydride thereof to the polyol composing the modified polyester-based resin is preferably 40 to 60 mass % of the polycarboxylic acid or anhydride thereof to 40 to 60 mass % of the polyol, and more preferably 45 to 55 mass % of the polycarboxylic acid or anhydride thereof to 45 to 55 mass % of the polyol, with respect to the total mass of the copolymer components taken as 100 mass %.

The weight average molecular weight of the modified polyester-based resin is preferably from 3,000 to 100,000 and more preferably from 10,000 to 30,000. It is preferably 3,000 or more from the viewpoint of improving the bundlability of the continuous reinforcing fibers (e.g., glass fibers), and is preferably 100,000 or less from the viewpoint of the emulsification stability when used in a water dispersion.

One polymer or thermoplastic resin used as the binding agent may be used alone, or two or more of these may be used in combination.

One or more polymers selected from a homopolymer of acrylic acid, a copolymer of acrylic acid and another copolymerizable monomer, a copolymer of an acrylic acid ester and/or methacrylic acid ester with a copolymerizable monomer, and salts of primary, secondary, and tertiary amines of these are used in an amount of preferably 50 mass % or more, and more preferably 60 mass % or more, with respect to the total amount of the binding agent taken as 100 mass %.

In the case where the bundling agent is composed of a silane coupling agent and a binding agent, the amount of the bundling agent to be provided and adhered, as the total adhered mass of the silane coupling agent and the binding agent, is preferably 0.1 to 3 mass %, more preferably 0.2 to 2 mass %, and even more preferably 0.2 to 1 mass %, with respect to 100 mass % of the continuous reinforcing fibers (e.g., glass fibers). The amount of the bundling agent to be adhered, as the total mass of the silane coupling agent and the binding agent, is preferably 0.1 mass % or more from the viewpoint of controlling the bundlability of the continuous reinforcing fibers (e.g., glass fibers) and improving the interfacial adhesive strength, and is preferably 3 mass % or less from the viewpoint of the handleability of the yarns, with respect to 100 mass % of the continuous reinforcing fibers (e.g., glass fibers).

Alternatively, in the case where the bundling agent is composed of a silane coupling agent, a lubricant, and a binding agent, the amount of the bundling agent to be adhered, as the total mass of the silane coupling agent, the lubricant, and the binding agent, is preferably 0.1 to 3 mass %, more preferably 0.2 to 2 mass %, and even more preferably 0.2 to 1 mass %, with respect to 100 mass % of the continuous reinforcing fibers (e.g., glass fibers). The above total adhered mass ratio is preferably 0.01 to 0.3 mass %, more preferably 0.02 to 0.2 mass %, and even more preferably 0.03 to 0.15 mass %.

The amount of the bundling agent to be applied, as the total adhered mass of the silane coupling agent, the lubricant, and the binding agent, is preferably 0.01 mass % or more, more preferably 0.1 mass % or more, from the viewpoint of controlling the bundlability of the continuous reinforcing fibers (e.g., glass fibers) and improving the interfacial adhesive strength, and is preferably 3 mass % or less, more preferably 0.3 mass % or less from the viewpoint of the handleability of the yarns, with respect to 100 mass % of the continuous reinforcing fibers (e.g., glass fibers).

The mass of coupling agent adhered with respect to 100 mass % of the continuous reinforcing fibers is preferably 0.05 to 1 mass %, more preferably 0.1 to 0.9 mass %.

—Composition of Bundling Agent for Glass Fibers—

The blending amount of the silane coupling agent in the bundling agent for glass fibers is preferably from 0.1 to 2 mass %, more preferably from 0.1 to 1 mass %, and even more preferably from 0.2 to 0.5 mass % with respect to 100 mass % of the bundling agent, from the viewpoint of improving the bundlability of the glass fibers, improving the interfacial adhesive strength, and improving the mechanical strength of a composite shaped article.

The blending amount of the lubricant in the bundling agent for glass fibers is preferably 0.01 mass % or more and more preferably 0.02 mass % or more from the viewpoint of imparting a sufficient lubricity, and is preferably 1.5 mass % or less, more preferably 1 mass % or less, and even more preferably 0.5 mass % or less from the viewpoint of improving the interfacial adhesive strength and improving the mechanical strength of a composite shaped article.

The blending amount of the binding agent in the bundling agent for glass fibers is preferably from 1 to 25 mass %, more preferably from 3 to 15 mass %, and even more preferably from 3 to 10 mass %, from the viewpoint of controlling the bundlability of the glass fibers, improving the interfacial adhesive strength, and improving the mechanical strength of a composite shaped article.

In the case where glass fibers are used as the continuous reinforcing fibers and the bundling agent is composed of a silane coupling agent, a lubricant, and a binding agent, it is preferable that the bundling agent for the glass fiber contains 0.1 to 2 mass % of the silane coupling agent, 0.01 to 1.5 mass % of the lubricant, and 1 to 25 mass % of the binding agent, it is more preferable that it contains 0.1 to 2 mass % of the silane coupling agent, 0.01 to 1 mass % of the lubricant, and 1 to 25 mass % of the binding agent, and it is preferable that these components are diluted with water to adjust so that total mass is 100 mass %.

—Usage Form of Bundling Agent for Glass Fibers—

The bundling agent for glass fibers may be prepared in any forms, such as in a form of a water solution, a form of a colloidal dispersion, and a form of an emulsion with the aid of an emulsifier, depending on how bundling agent for glass fibers is used. The bundling agent is preferably used in the form of a water solution from the viewpoint of improving the dispersion stability of the bundling agent and improving the heat resistance.

The glass fibers as continuous reinforcing fibers composing the continuous fiber reinforced resin composite material of this embodiment are continuously produced in a known glass fiber production step by applying the bundling agent to glass fibers using a known method such as a roller-type applicator, and drying the produced glass fibers.

Examples of the usage form of the bundling agent for glass fibers also include a method by immersing the glass fibers in a solution containing the bundling agent, or a method by immersing the glass fiber base material in a solution containing the bundling agent.

Similarly, in the case where carbon fibers are selected as the continuous reinforcing fibers, a bundling agent may be used, and the bundling agent is preferably composed of a coupling agent (e.g., silane coupling agent), a lubricant, and a binding agent. The coupling agent may be one which is compatible with hydroxyl groups present on the surfaces of carbon fibers. The binding agent may be one which has a good wettability with or a surface tension close to the surface tension of the selected thermoplastic resin. The lubricant may be one which does not inhibit the coupling agent and the binding agent. Diamines such as 1,6-hexadiamine and polycarboxylic acids are examples of coupling agents that are suitably used for carbon fibers.

A lubricant can be selected which does not interfere with the coupling agent and the binding agent.

There are no limitation on the type of bundling agent used for carbon fibers, and any known type can be used. Specifically, for example, those described in JP 2015-101794 A can be used.

In the case in which other continuous reinforcing fibers are used, the type and amount of the bundling agent to be applied may be appropriately selected from bundling agents which can be used for glass fibers or carbon fibers, depending on the characteristics of the continuous reinforcing fibers, and it is preferable that the type and amount of the bundling agent to be applied may be those for a bundling agent used for carbon fibers.

(Shape of Continuous Reinforcing Fiber)

The continuous reinforcing fibers are a multifilament of a plurality of filaments, and have a single yarn count of preferably 30 to 15,000 from the viewpoint of the handleability.

The single yarn diameter R of the continuous reinforcing fibers is preferably 2 to 30 μm, more preferably 4 to 25 μm, even more preferably 6 to 20 μm, and most preferably 8 to 18 μm, from the viewpoint of the strength and from the viewpoint of the handleability.

The product RD of the single yarn diameter R (μm) and the density D (g/cm$^3$) of the continuous reinforcing fibers is preferably from 5 to 100 μm·g/cm$^3$, more preferably from 10 to 50 μm·g/cm$^3$, even more preferably from 15 to 45 μm·g/cm$^3$, and still more preferably from 20 to 45 μm·g/cm$^3$, from the viewpoint of the handleability of the continuous reinforcing fibers and the strength of the composite material.

The density D can be measured using a specific gravity meter.

On the other hand, the single yarn diameter R (μm) can be calculated from the density D (g/cm$^3$), the fiber fineness (dtex), and the single yarn count using the following formula:

$$\text{single yarn diameter} = 20 \times \sqrt{\frac{\text{fiber fineness}}{\pi \times \text{single yarn count} \times \text{density}}} \quad \text{[Math. 1]}$$

Further, the single yarn diameter R (μm) can be measured by an SEM observation of a single yarn of the continuous reinforcing fiber.

In order to control a product RD of the continuous reinforcing fiber to fall within a certain range, the fiber fineness (dtex) and the single yarn count may be appropriately selected according to the density of commercially available continuous reinforcing fibers. For example, in a case in which glass fibers are used as continuous reinforcing fibers, the density of glass fibers is about 2.5 g/cm$^3$. Thus, a glass fiber having a single yarn diameter of 2 to 40 μm may be selected. Specifically, when the single yarn diameter of glass fibers is 9 μm, a product RD of 23 is given if glass fibers having a fiber fineness of 660 dtex and a single yarn count of 400 are selected. Or, when the single yarn diameter of glass fibers is 17 μm, a product RD of 43 is given if glass fibers having a fiber fineness of 11,500 dtex and a single yarn count of 2,000 are selected. In a case in which carbon fibers are used as continuous reinforcing fibers, the density of carbon fibers is about 1.8 g/cm$^3$. Thus, a carbon fiber having a single yarn diameter of 2.8 to 55 μm may be selected. Specifically, when the single yarn diameter of carbon fibers is 7 μm, a product RD of 13 is given if carbon fibers having a fiber fineness of 2,000 dtex and a single yarn count of 3,000 are selected. In a case in which aramid fibers are used as continuous reinforcing fibers, the density of aramid fibers is about 1.45 g/cm$^3$. Thus, aramid fibers having a single yarn diameter of 3.4 to 68 μm may be selected. Specifically, when the single yarn diameter of aramid fibers is 12 μm, a product RD of 17 is given if aramid fibers having a fiber fineness of 1,670 dtex and a single yarn count of 1,000 are selected.

Continuous reinforcing fibers, e.g., glass fibers, are manufactured by measuring out and mixing raw material glass, obtaining molten glass by melting the raw material glass in a melting furnace, spinning the molten glass into glass filaments, applying a bundling agent, and winding the filaments by a spinning machine into the form of direct winding roving (DWRs), cakes, twisted yarns, and the like, for example.

Continuous reinforcing fibers may take any form, but continuous reinforcing fibers wound into yarns, cakes, and DWRs are preferable because the productivity and the stability of production in the resin coating step are increased. From a viewpoint of the productivity, DWRs are the most preferable.

The form of the continuous reinforcing fiber is not particularly limited, and various forms such as a woven fabric, a knitted fabric, braid string, pipe, a non-crimp fabric, and a unidirectional material can be exemplified, and preferred forms are a woven fabric, a non-crimp fabric, and a unidirectional material.

(Thermoplastic Resin)

The peak temperature of the loss tangent tan δ of the thermoplastic resin constituting the continuous fiber reinforced resin composite material of the present embodiment is preferably 80° C. or higher, more preferably 85° C. or higher, even more preferably 90° C. or higher, and still even more preferably 100° C. When the peak temperature of tan δ of the thermoplastic resin is in the above range, the number of AE signals having an amplitude of 40 dB or more and a duration of 3500 μseconds or shorter of the continuous fiber reinforced composite material tends to decrease, the number of AE signals having an amplitude of 25 to 30 dB and a duration of 1000 μseconds or shorter tends to increase, and the total AE count number tends to increase.

The peak temperature of the loss tangent tan δ of the thermoplastic resin refers to the temperature at which the value of tan δ has a maximum when the tan δ is measured at varied temperatures while the temperature is varied. The peak temperature of tan δ can be determined, for example, by performing a nanoindentation (nanoDMA) on a single yarn of the continuous reinforcing fibers contained in a film of the thermoplastic resin in a cross section perpendicular to the length direction of the continuous reinforcing fibers by vibrating at a particular frequency using a nanoindenter, and specifically can be measured by the method described in Examples to be described below.

A method of adjusting the tan δ of the thermoplastic resin to the above range is to adjust the concentration of aromatic rings in the resin. As the concentration of aromatic rings in the resin increases, the peak temperature of tan δ tends to increase.

The thermoplastic resin of the present embodiment preferably has a Raman peak (a peak in a Raman spectrum) in a range of 950 to 1050 $cm^{-1}$, more preferably in a range of 970 to 1030 $cm^{-1}$. When the Raman peak of the thermoplastic resin is in the above range, the number of AE signals having an amplitude of 40 dB or more and a duration of 3500 μseconds or shorter of the continuous fiber reinforced composite material tends to decrease, the number of AE signals having an amplitude of 25 to 30 dB and a duration of 1000 μseconds or shorter tends to increase, and the total AE count number tends to increase.

A Raman peak of the thermoplastic resin of the present embodiment can be obtained, for example, by measuring a Raman spectrum of the resin region in a cross section perpendicular to the length direction of the continuous reinforcing fibers contained in a film of the thermoplastic resin by a laser Raman microscope, and specifically can be measured by the method described in Examples to be described below.

The thermoplastic resin of the present embodiment may be two or more thermoplastic resins, and it is preferable that the difference in saturated water absorption ratio between the largest saturated water absorption ratio and the smallest saturated water absorption ratio of the two or more thermoplastic resins is 2.0 mass % or more, more preferably 2.5 mass % or more, even more preferably 2.8 mass % or more, and still even more preferably 2.0 mass % or more. When the saturated water absorption ratio is in this range, the continuous fiber reinforced resin composite material can exhibit excellent strength, elastic modulus, water absorption characteristics, high-temperature characteristics, fatigue characteristics, impact characteristics, and warping characteristic.

In the case where thermoplastic resin include two or more thermoplastic resins, the resin having the largest mass ratio is contained preferably at a mass ratio of 5 times or less, more preferably at a mass ratio of 4 times or less, and even more preferably at a mass ratio of 3 times or less of the resin having the second largest mass ratio, in view of the high-temperature characteristics and the water absorption characteristics. When the mass ratio of the thermoplastic resin is within any of the above ranges, physical properties (the strength, the rigidity, the high-temperature characteristics, the water absorption characteristics, the impact characteristics, the appearance, and the like) of the continuous fiber reinforced resin composite material tend to be improved.

Examples of the thermoplastic resin include, but are not limited to, polyolefin-based resins such as polyethylene and polypropylene; polyamide-based resin such as polyamide 6, polyamide 66, polyamide 46, polyamide 612, and, polyamide 6I; polyester-based resins such as polyethylene terephthalate, polybutylene terephthalate, and polytrimethylene terephthalate; polyacetal-based resins such as polyoxymethylene; polycarbonate-based resins; polyether-based resins such as polyether ketone, polyether ether ketone, polyether glycol, polypropylene glycol, and polytetramethylene ether glycol; polyether sulfone, polyphenylene sulfide; thermoplastic polyetherimide; thermoplastic fluorine-based resins such as a tetrafluoroethylene-ethylene copolymer; and polyurethane-based resins; acrylic resins; and modified thermoplastic resins produced by modifying these, for example.

Polyamide 6T, polyamide 6I/6T, polyamide MXD6, polyamide 11, polyamide 12, polyamide 610, and polyamide 1010 may be used as the thermoplastic resin for use in the continuous fiber reinforced resin composite material having the characteristic (II).

Polyamide 1010, polyamide 12, polyamide 610, and polyamide 410 may be used as the thermoplastic resin for use in the continuous fiber reinforced resin composite material having the characteristic (III).

Polyamide 1010 and polyamide 12 may also be used as the thermoplastic resin for use in the continuous fiber reinforced resin composite material having the characteristic (IV).

Polyamide resins such as polyamide 6T, polyamide 6I/6T, polyamide MXD6, polyamide 11, polyamide 12, polyamide 610, polyamide 1010, and polyphenylene ether may be used as the thermoplastic resin for use in the continuous fiber reinforced resin composite material having the characteristic (V). Polyphenylene ether is also another preferred example of the thermoplastic resin for use in the continuous fiber reinforced resin composite material having the characteristic (V).

One of thermoplastic resins may be used alone, or two or more of these may be used as a mixture.

Among these thermoplastic resins, polyolefin-based resins, polyamide-based resins, polyester-based resins, polyether-based resins, polyether sulfone, polyphenylene sulfide, thermoplastic polyetherimide, and thermoplastic fluorine-based resins are preferable; polyolefin-based resins, modified polyolefin-based resins, polyamide-based resins, polyester-based resins, polyurethane-based resins, and acrylic resins are more preferable, from the viewpoint of the mechanical properties and versatility; and polyamide-based resins and polyester-based resins are even more preferable when the viewpoint of the thermal properties is added.

Furthermore, polyamide-based resins are more preferable from the viewpoint of the durability against repeatedly applied loads.

—Polyester-Based Resin—

The term "polyester-based resin" refers to a polymeric compound having a —CO—O— (ester) bond in the main chain thereof.

Examples of the polyester-based resin include, but are not limited to, polyethylene terephthalate, polybutylene terephthalate, polytetramethylene terephthalate, poly-1,4-cyclohexylenedimethylene terephthalate, and polyethylene-2,6-naphthalene dicarboxylate, for example.

The polyester-based resin may be a homopolyester, or may be a copolymerized polyester.

A preferred copolymerized polyester is a copolymerized polyester obtained through copolymerization of homopolyester with a third component as appropriate. Examples of the third component include, but are not limited to, diol components such as diethylene glycol, neopentyl glycol, and polyalkylene glycol; and dicarboxylic acid components such as adipic acid, sebacic acid, phthalic acid, isophthalic acid, and sodium 5-sulfoisophthalate, for example.

In addition, a polyester-based resin made from a raw material derived from a biomass resource can be used, and examples thereof include aliphatic polyester-based resins such as polylactic acid, polybutylene succinate, and polybutylene succinate adipate, and aromatic polyester-based resins such as polybutylene adipate terephthalate, for example.

—Polyamide-Based Resin—

The term "polyamide-based resin" refers to a polymeric compound having a —CO—NH— (amide) bond in the main chain thereof. Examples thereof include aliphatic polyamide, aromatic polyamide, and wholly aromatic polyamide.

Examples of the polyamide-based resin include, but are not limited to, polyamides obtained through ring-opening polymerization of a lactam, polyamides obtained through self-condensation of an ω-aminocarboxylic acid, and polyamides obtained through condensation of a diamine and a dicarboxylic acid, and copolymers of these, for example.

One of polyamide-based resins may be used alone, or two or more of these may be used as a mixture.

Examples of the lactam include, but are not limited to, pyrrolidone, caprolactam, undecanelactam, and dodecalactam, for example.

Examples of the ω-aminocarboxylic acid include, but are not limited to, an ω-amino fatty acid which is a ring-opening compound of a lactam by water, for example. Each of a lactam or co-aminocarboxylic acid may be condensed by using two or more types of monomers in combination.

Examples of the diamine (as a monomer) include, but are not limited to, straight chain aliphatic diamines such as hexamethylenediamine and pentamethylenediamine; branched-chain aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine, for example.

Examples of the dicarboxylic acid (as a monomer) include, but are not limited to, aliphatic dicarboxylic acids such as adipic acid, pimelic acid, and sebacic acid; aromatic dicarboxylic acids such as phthalic acid and isophthalic acid; and alicyclic dicarboxylic acids such as cyclohexanedicarboxylic acid, for example. As to each of diamines or dicarboxylic acids as a monomer, one of diamines or dicarboxylic acid may be condensed alone or in combination of two or more of these.

Example of the polyamide-based resin include, but are not limited to, aliphatic polyamides such as polyamide 4 (poly α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, polyamide 612; semi-aromatic polyamides such as polyamide T (polyhexamethylene terephthalamide), polyamide 9T (polynonane methylene terephthalamide), polyamide 6I (polyhexamethylene isophthalamide); and copolymerized polyamides containing these as constituents, for example.

Examples of copolymerized polyamides include, but are not limited to, a copolymer of hexamethylene adipamide and hexamethylene terephthalamide, a copolymer of hexamethylene adipamide and hexamethylene isophthalamide, and a copolymer of hexamethylene terephthalamide and 2-methylpentanediamine terephthalamide, for example.

Aliphatic polyamides such as polyamide 1010 and semi-aromatic polyamides such as polyamide MXD6 and polyamide 6I/6T may be used as the thermoplastic resin for use in the continuous fiber reinforced resin composite material having the characteristic (II).

Aliphatic polyamides such as polyamide 1010 and semi-aromatic polyamides such as polyamide MXD6 and polyamide 6I/6T may be used as the thermoplastic resin for use in the continuous fiber reinforced resin composite material having the characteristic (V).

When a polyamide resin is used, the thermoplastic resin preferably contains 50 to 99 parts by mass of (A) an aliphatic polyamide and 1 to 50 parts by mass of (B) a semi-aromatic polyamide containing a dicarboxylic acid unit which contains at least 75 mol % of an isophthalic acid unit, and a diamine unit which contains at least 50 mol % of a diamine unit having a carbon number of 4 to 10.

When the thermoplastic resin contains the aliphatic polyamide (A) and the semi-aromatic polyamide (B) in the above range, physical properties (the strength, the rigidity, the high-temperature characteristics, the water absorption characteristics, the impact characteristics, the appearance, and the like) of the continuous fiber reinforced resin composite material tend to be improved as compared with a case where only (A) an aliphatic polyamide is included as a polyamide.

The sum of the contents of the aliphatic polyamide (A) and the semi-aromatic polyamide (B) is preferably 70 to 100 mass %, more preferably 80 to 100 mass %, and even more preferably 90 to 100 mass %, per 100 mass % of the thermoplastic resin.

The weight average molecular weight (Mw) of the thermoplastic resin containing the aliphatic polyamide (A) and the semi-aromatic polyamide (B) is preferably 15000 to 35000, more preferably 17000 to 35000, even more preferably 20000 to 35000, still more preferably 22000 to 34000, particularly preferably 24000 to 33000, and most preferably 25000 to 32000. When the weight average molecular weight (Mw) of the thermoplastic resin is within the any of above ranges, the strength and the rigidity tend to be improved.

In the thermoplastic resin, the weight average molecular weight $Mw_A$ of the aliphatic polyamide (A) is preferably 1.5 times or more, more preferably twice or more, of the weight average molecular weight $Mw_B$ of the semi-aromatic polyamide (B). When $Mw_A$ is 1.5 times or more of $Mw_B$, the strength and the rigidity tend to be improved.

Note that the weight average molecular weights (Mw) of the thermoplastic resin, the aliphatic polyamide (A), and the semi-aromatic polyamide (B) can be measured by gel permeation chromatography (GPC), and specifically can be observed by the method described in Examples to be described below.

Examples of the aliphatic polyamide (A) include, but are not limited to, polyamide 4, polyamide 6, polyamide 11, polyamide 12, polyamide 46, polyamide 66, polyamide 610, and polyamide 612.

The content of the aliphatic polyamide (A) in 100 mass % of polyamides in the thermoplastic resin is preferably 50 to 99 mass %, more preferably 60 to 90 mass %, and even more preferably 70 to 80 mass %.

Examples of the semi-aromatic polyamide (B) include, but are not limited to, polyamide 6I, polyamide 91, and polyamide 101.

The sum of the amounts of the isophthalic acid unit and the diamine unit having a carbon number of 4 to 10 is preferably from 80 to 100 mol %, more preferably from 90 to 100 mol %, and even more preferably from 95 to 100 mol %, with respect to 100 mol % of all constituent units constituting the semi-aromatic polyamide resin (B).

The proportion of the monomer units constituting the semi-aromatic polyamide (B) can be measured by, for example, 13C nuclear magnetic resonance spectroscopy (NMR).

The proportion of the isophthalic acid unit in the dicarboxylic acid unit in the semi-aromatic polyamide (B) is at least 75 mol %, preferably 85 mol % or more, and more preferably 90 mol % or more. When the proportion of the isophthalic acid unit in the dicarboxylic acid unit is within any of the above ranges, the high-temperature characteristics and the water absorption characteristics tend to be improved.

The proportion of the diamine unit having a carbon number of 4 to 10 in the diamine unit in the semi-aromatic polyamide (B) is at least 50 mol %, preferably 60 mol % or more, and more preferably 70 mol % or more. When the proportion of the diamine unit having a carbon number of 4 to 10 in the diamine unit is within any of the above ranges, the high-temperature characteristics and the water absorption characteristics tend to be improved.

The content of the semi-aromatic polyamide (B) in 100 mass % of polyamides in the thermoplastic resin is preferably 1 to 50 mass %, more preferably 10 to 40 mass %, and even more preferably 20 to 30 mass %.

The end groups of in the aliphatic polyamide (A) and the semi-aromatic polyamide (B) may be capped by a known end-capping agent, and the sum of the end capped amounts of the aliphatic polyamide (A) and the semi-aromatic polyamide (B) of which end groups are capped by a known end-capping agent, expressed as an equivalent to 1 g of polyamides of the aliphatic polyamide (A) and the semi-aromatic polyamide (B) in total, is preferably 5 to 180 μeq/g, more preferably 10 to 170 μeq/g, even more preferably 20 to 160 μeq/g, particularly preferably 30 to 140 μeq/g, and most preferably 40 to 140 μeq/g. When the end cupped amount is within any of the above ranges, physical properties (the strength, the rigidity, the high-temperature characteristics, the water absorption characteristics, the impact characteristics, the appearance, and the like) tend to be improved.

Here, the end cupped amount is the total amount of amino ends and carboxyl ends which are capped with a capping agent. The end cupped amount can be measured using $^{1}$H-NMR, and specifically can be measured by the method described in Examples to be described below.

The end group concentration of the aliphatic polyamide (A) is preferably a half or less, more preferably two-fifth or less, of the end group concentration of the semi-aromatic polyamide (B). When the end group concentration of the aliphatic polyamide (A) is a half or less of the end group concentration of the semi-aromatic polyamide (B), physical properties (the strength, the rigidity, the high-temperature characteristics, the water absorption characteristics, the impact characteristics, the appearance, and the like) tend to be improved.

The end group concentrations of the aliphatic polyamide (A) and the semi-aromatic polyamide (B) can be measured using $^{1}$H-NMR, and specifically can be measured by the method described in Examples to be described below.

The difference in the peak temperature of tan δ between the aliphatic polyamide (A) and the semi-aromatic polyamide (B) is preferably 45 to 100° C., more preferably 50 to 90° C., and even more preferably 60 to 90° C. When the difference in the peak temperature of tan δ between the aliphatic polyamide (A) and the semi-aromatic polyamide (B) is within any of the above ranges, the high-temperature characteristics and the water absorption characteristics tend to be improved.

The peak temperature of the loss tangent tan δ refers to the temperature at which the value of tan δ has a maximum when the tan δ is measured at varied temperatures while the temperature is varied. The peak temperatures of tan δ of the aliphatic polyamide (A) and the semi-aromatic polyamide (B) can be measured using, for example, a viscoelastic measurement analyzer, and specifically can be measured by the method described in Examples to be described below.

The difference in the viscosity between the aliphatic polyamide (A) and the semi-aromatic polyamide (B) is preferably 3 times or more, and more preferably 4 times or more in view of the strength, the rigidity, the moldability, and the appearance.

The viscosity of a thermoplastic resin can be determined by an MFR measurement (according to ISO 1133), and specifically can be observed by the method described in Examples to be described below.

[Additives]

The continuous fiber reinforced resin composite material of the present embodiment may contain additives as needed. The composite material of the present embodiment may contain, for example, colorants, anti-aging agents, antioxidants, weathering agents, metal deactivators, light stabilizers, heat stabilizers, UV absorbers, antimicrobial/antifungal agents, odor control agents, conductivity-imparting agents, dispersing agents, softening agents, plasticizers, cross-linking agents, co-cross-linking agents, vulcanizing agents, vulcanization aids, foaming agents, foaming aids, flame retardants, vibration damping agents, nucleating agents, neutralizing agents, lubricants, anti-blocking agents, dispersants, flow modifiers, and mold release agents. The above additives are those excluding the above-mentioned components (e.g., the above thermoplastic resin, the above continuous reinforcing fibers, the components contained in the above hybridizing thermoplastic resin composition, and the components contained in the bundling agent).

The content of the additives may be 3 mass % or less with respect to 100 mass % of the composite material.

(Colorant)

Examples of the colorant include carbon black, nigrosine, an aluminum pigment, titanium dioxide, ultramarine blue, cyanine blue, cyanine green, quinacridone, diatomite, monoazo salt, perylene, disazo pigments, condensed azo pigments, isoindoline, red iron oxide, nickel titanium yellow, diketone pyrrolopyrrole, metal salts, perylene red, metal oxides, bismuth vanadate, cobalt green, cobalt blue, anthraquinone, phthalocyanine green, and phthalocyanine blue. Among them, black colorants are preferable, and carbon black and nigrosine are more preferable.

The continuous fiber reinforced resin composite material of the present embodiment suitably contains, with respect to 100 parts by mass of thermoplastic resin, 90 to 525 parts by mass of the continuous reinforcing fibers and 0 to 2 parts by mass of components other than these with respect to 100 parts by mass of thermoplastic resin, more suitably contains 150 to 340 parts by mass of the continuous reinforcing fibers and 0 to 1 parts by mass of components other than these.

The continuous fiber reinforced resin composite material of the present embodiment having the characteristic (IV) has a volume ratio Vf (%) of the continuous reinforcing fibers in the continuous fiber reinforced resin composite material of suitably 20 to 80%, more suitably 30 to 70%, and even more suitably 40 to 60%.

In the continuous fiber reinforced resin composite material of the present embodiment having the characteristic (IV), the continuous fiber reinforced resin composite material may be a composite material consisting only of the thermoplastic resin and the continuous reinforcing fibers.

[Applications of Continuous Fiber Reinforced Resin Molded Article]

The continuous fiber reinforced resin composite material of the present embodiment can be suitably used in applications of structural materials, such as aircrafts, automobiles, construction materials, and robots.

In automotive applications, it can be used for, but not limited to, chasses and frames, wheel and suspension parts, drive train parts, interior parts, exterior parts, and functional parts, for example.

Specifically, the continuous fiber reinforced resin composite material can be suitably used as parts including: steering shafts, mounts, sunroofs, steps, roof trims, door trims, trunks, boot lids, bonnets, seat frames, seat backs, retractors, retractor mount brackets, clutches, gears, pulleys, cams, AGs, elastic beams, baffling, lamps, reflectors, glazing, front end modules, back door inners, brake pedals, steering wheels, electric members, sound absorbing materials, door exterior and interior panels, instrument panels, rear gates, ceiling beams, seats, seat frames, wiper arms, electric power steering (EPS) components, micro motors, heat sinks, boxes for engine control unit (ECU) boxes, ECU housings, housing for steering gearboxes, plastic housing, housings for electric vehicle (EV) motors, wire harnesses, in-vehicle meters, combination switches, micro motors, springs, dampers, wheels, wheel covers, frames, sub frames, side frames, frames for motorcycles, fuel tanks, oil pans, intake manifolds, propeller shafts, drive motors, monocock parts, hydrogen tanks, electrodes for fuel cells, panels, floor panels, skin panels, doors, cabins, roofs, hoods, valves, exhaust gas recirculation (EGR) valves, variable valve timing units, connecting rods, cylinder bores, members (engine mounting, front floor cloths, footwell cloths, seat cloths, inner sides, rear cloths, suspensions, pillar reinforcements, front sides, front panels, uppers, dash panel cloths, steering), tunnels, fastening inserts, crush boxes, crush rails, corrugates, roof rails, upper bodies, side rails, braiding, door surrounding assemblies, members for airbags, body pillars, dash to pillar gusset plates, suspension towers, bumpers, body pillar lowers, front body pillars, reinforcements (instrument panels, rails, roofs, front body pillars, roof rails, roof side rails, lockers, door belt lines, front floor under, front body pillar upper, front body pillar lower, center pillars, center pillar hinges, door outside panels), side outer panels, front door window frames, minimum intrusion cabin system (MICS) bulks, torque boxes, radiator supports, radiator fans, water pumps, fuel pumps, electronically controlled throttle bodies, engine control ECUs, starters, alternators, manifolds, transmissions, clutches, dash panels, dash panel insulator pads, door side impact protection beams, bumper beams, door beams, bulk heads, outer pads, inner pads, rear seat rods, door panels, door trim board sub-assembly, energy absorbers (bumpers and shock absorbers), shock absorbing bodies, shock absorbing garnishes, pillar garnishes, roof side inner garnishes, resin ribs, side rail front spacers, side rail rear spacers, seat belt pretensioners, airbag sensors, arms (suspensions, lower, hood hinges), suspension links, shock absorbing brackets, fender brackets, inverter brackets, inverter modules, hood inner panels, hood panels, cowl louvers, cowl top outer front panels, cowl top outer panels, floor silencers, damp sheets, hood insulators, fender side panel protectors, cowl insulators, cowl top ventilator louvers, cylinder head covers, tire deflectors, fender supports, strut tower bars, mission center tunnels, floor tunnels, radiator core supports, luggage panels, luggage floors, accelerator pedals, and accelerator pedal bases.

[Molding of Composite Material]

The continuous fiber reinforced resin composite material of this embodiment may be further molded. The method for the above include, for example, a method by cutting the continuous fiber reinforced resin composite material of the present embodiment into a predetermined size, which is subjected to heating with an infrared heater and heating and compression pressed in a press molding machine, or subjected to injection hybrid molding by heating with an infrared heater, and heating and compression pressing in a press molding machine, followed by injection hybrid molding of the resin.

(Characteristic (II))

The continuous fiber reinforced resin composite material of the present embodiment preferably further has the characteristic (II) described below.

[Continuous Fiber Reinforced Resin Composite Material]

It is preferable that the continuous fiber reinforced resin composite material of the present embodiment having the characteristic (II) includes continuous reinforcing fibers and a resin, wherein the above AE count A is 0.16 or less, and the coverage ratio of the interfacial resin in the continuous reinforcing fibers after dissolution of the resin is 44% or less. In this specification, the coverage ratio of the interfacial resin in the continuous reinforcing fibers after dissolution of the resin being 44% or less is sometimes referred to as "characteristic (II)".

The above coverage ratio is preferably 40% or less, more preferably 37% or less, even more preferably 35% or less.

The above coverage ratio is preferably 3% or more, more preferably 10% or more, and even more preferably 20% or more.

The coverage ratio of the interfacial resin in the continuous reinforcing fibers after dissolution of the resin can be determined, for example, from the ratio of the thermoplastic resin component to the continuous reinforcing component by causing the thermoplastic resin contained in the continuous fiber reinforced resin dissolved in a solvent, removing the solvent, washing the remaining continuous reinforcing fibers with fresh above solvent to remove the resin excluding the resin bonded to the continuous reinforcing fibers, drying, and making a measurement using X-ray photoelectron spectroscopy (XPS).

The method of causing the thermoplastic resin contained in the continuous fiber reinforced resin dissolved in a solvent, removing the solvent, washing the remaining continuous reinforcing fibers with fresh above solvent to remove the resin excluding the resin bonded to the continuous reinforcing fibers, and drying is not limited, but the following processing method is one example.

(a) The above continuous fiber reinforced resin composite material is cut into thin slices.

(b) 100 mg of the thin slices of the above continuous fiber reinforced resin composite material and 20 mL of a solvent selected according to the resin are placed in a mixing rotor and stirred for 5 hours.

(c) The solvent is removed by suction filtration, the continuous reinforcing fibers are washed by sprinkling 40 mL of fresh above solvent on the filter, and then is air dried.

(d) The continuous reinforcing fibers obtained in (c) and 20 mL of the fresh above solvent are placed in a mixing rotor and stirred for 2 hours.

(e) The solvent is removed by suction filtration, the continuous reinforcing fibers are washed by sprinkling 40 mL of fresh above solvent on the filter, and then dried with a nitrogen blow.

(f) The continuous reinforcing fiber obtained in (e) and 20 mL of the fresh above solvent are placed in a mixing rotor and stirred for 2 hours.

(g) The solvent is removed by suction filtration, the continuous reinforcing fibers are washed by sprinkling 40 mL of fresh above solvent on the filter, and then air dried.

(h) The fibers are dried overnight in a vacuum dryer set at room temperature.

In the above processing method, the solvent selected according to the resin shall be one in which the thermoplastic resin contained in the composite material dissolves with a high solubility (the solubility is suitably 0.10 g/mL or higher, more suitably 0.15 g/mL or higher).

For example, hexafluoroisopropanol (HFIP) may be selected for polyamide, hot xylene may be selected for polypropylene, and chloroform may be selected for polyphenylene ether.

Whether the continuous reinforcing fibers are glass fibers or carbon fibers, the operations of the above processing method need not be changed as long as the continuous reinforcing fibers used are substantially insoluble (has a solubility of less than 0.1 mg/mL) in the solvent selected according to the above resin.

In cases where different thermoplastic resins are contained in the composite material, the above processing method may be performed in the similar manner, except the solvent is changed according to that solvent.

Further, for example, in the case where the resin is polyamide and the continuous reinforcing fibers are glass fibers, the coverage ratio can be obtained by (coverage ratio)=[N]/([N]+[Si]), where [N] is the relative elemental concentration of nitrogen determined by an XPS measurement on the continuous reinforcing fibers after dissolution of the resin, and [Si] is the relative elemental concentration of silicon determined in the same manner.

For example, in the case where the resin is polyamide and the continuous reinforcing fibers are carbon fibers, the coverage ratio can be obtained by (coverage ratio)=[N]/([N]+[O]), where [N] is the relative elemental concentration of nitrogen determined by an XPS measurement on the continuous reinforcing fibers after dissolution of the resin, and [O] is the relative elemental concentration of oxygen determined by an XPS measurement which is in the similar manner.

For example, in the case where the resin is polypropylene and the continuous reinforcing fibers are glass fibers, the coverage ratio can be obtained by (coverage ratio)=([C]−[C0])/([C]−[C0]+[Si]), where [C] is the relative elemental concentration of carbon determined by an XPS measurement on the continuous reinforcing fibers after dissolution of the resin. [C0] is the relative elemental concentration of carbon determined by an XPS measurement on the continuous reinforcing fibers after a similar treatment is performed on continuous reinforcing fibers as a raw material free of a bundling agent (sizing agent). [Si] is the relative elemental concentration of silicon determined by an XPS measurement on the continuous reinforcing fibers after dissolution of the resin. Here, the continuous reinforcing fibers as a material refer to continuous reinforcing fibers per se as a raw material.

Specifically, the XPS measurements shall be measured as described in the Examples.

When the coverage ratio of the interfacial resin in the continuous reinforcing fibers after dissolution of the resin is within the above range, high bending vibration fatigue characteristics can be achieved.

In order to adjust the coverage ratio to the above range, for example, one method is exemplified in which the contact angle between the continuous reinforcing fibers after dissolution of the resin and the thermoplastic resin according to a static wettability test is set to 70 to 130% of the contact angle between continuous reinforcing fibers as a material treated only with the coupling agent and the thermoplastic resin according to a static wettability test, and the impregnation speed of the continuous reinforcing fibers with the thermoplastic resin is set to 32%/min or more. Here, the continuous reinforcing fibers as a material refer to continuous reinforcing fibers per se as a raw material.

The above contact angle is preferably between 80 and 120%, and even more preferably between 90 and 110%.

When the contact angle is in the above range, the compatibility between the thermoplastic resin and the coupling agent improves, and excess components in the bundling agent (sizing agent) which do not contribute to formation of the interface can be removed, making the interfacial thickness sufficiently thin.

Note that the contact angle according to a static wettability test can be measured by, for example, sandwiching a single yarn of the continuous reinforcing fibers and a film of the thermoplastic resin between glass covers, and observing the contact angle between the continuous reinforcing fiber and the thermoplastic resin under an optical microscope immediately before cooling starts after the temperature is raised to equal to or higher than the melting point of the thermoplastic resin, and specifically can be measured by the method described in Examples described later.

The impregnation speed is preferably 48%/min or more, and more preferably 64%/min or more.

The impregnation speed can be measured by the following method, and specifically measured by the method described in the Examples. In other words, the continuous reinforcing fiber base material and thermoplastic resin base material are laminated, and heating pressing and cooling pressing are performed so that the time during which the thermoplastic resin is kept to be equal to or higher than the melting point by means of heating and cooling is 60 seconds. Specifically, the mold temperature is set to an appropriate temperature so that the maximum temperature inside the mold is a temperature of the melting point of the thermoplastic resin+6 to 25° C. After heating pressing is performed at the molding pressure set to 5 MPa, cooling pressing are performed with water cooling and at a pressure of 5 MPa. The obtained continuous reinforcing fiber composite material is then cut using a band saw etc., and a cross section is polished. Then the impregnation ratio (%) (described below) obtained for the cross section is divided by the time (minutes) during which the thermoplastic resin has been maintained to equal to or higher than the melting point during the heat press molding.

Here, the impregnation ratio (%) can be determined by the percentage of voids in the continuous reinforcing fibers in a cross section of the continuous fiber reinforced resin composite material by an SEM observation. Specifically, for example, the continuous fiber reinforced resin composite material is cut at an arbitrary position, and a cross section is polished. An image of the cross section is taken by observing the cross section under an SEM, and the obtained image is analyzed using analysis software to calculate the area enclosed by the outer contour line of continuous reinforcing fibers which are a bundle of single yarns (filaments) and the area of voids in the area enclosed by the outer contour line of the continuous reinforcing fibers.

The impregnation ratio (%) is calculated from the following formula taken a predetermined area as 100%

$$\text{Impregnation ratio (\%)} = [1-\{\text{area of voids}/(\text{area of the region enclosed by the outer contour line of continuous reinforcing fibers})\}\times 100$$

In an image of the cross section obtained, the respective impregnation ratios of 10 continuous reinforcing fibers may be determined, and the average of the impregnation ratios may be used as the impregnation ratio.

The exposure degree of the above continuous reinforced resin after dissolution of the above resin (hereinafter also referred to as "interface exposed reinforcing fibers") is preferably 55% or more, more preferably 62% or more, even more preferably 66% or more, and still even more preferably 72% or more.

The exposure degree of the above interface exposed reinforcing fibers is preferably 95% or less, more preferably 90% or less, even more preferably 85% or less, and still even more preferably 80% or less.

The exposure degree of the interface exposed reinforcing fibers is determined, in the manner similar to a measurement of the coverage ratio of the interfacial resin in the continuous reinforcing fibers after dissolution of the resin, for example, by causing the thermoplastic resin contained in the continuous fiber reinforced resin dissolved in a solvent, removing the solvent, washing the remaining continuous reinforcing fibers with fresh above solvent, removing the resin except for the resin bonded to the continuous reinforcing fibers, and drying. Then, the exposure degree can be determined by dividing the obtained respective relative elemental concentration of the element derived from the continuous reinforcing fibers, by the corresponding relative elemental concentration of that element derived from continuous reinforcing fibers as a raw material that have not been treated with the sizing agent.

More specifically, in the case where the continuous reinforcing fibers are glass fibers, the exposure degree of the continuous reinforcing resin (interface exposed reinforcing fibers) after dissolution of the resin is determined, for example, by (ratio of interface exposed reinforcing fibers) =[Al]/[Al0]. [Al] is the relative elemental concentration of aluminum determined when an XPS measurement is performed on the continuous reinforcing fibers after dissolution of the resin as described above. [Al0] is the relative elemental concentration of aluminum determined when continuous reinforcing fibers free of the bundling agent (sizing agent) as a raw material treated in the similar manner and an XPS measurement is performed on the continuous reinforcing fibers.

In the case where the continuous reinforcing fibers are carbon fibers, for example, it is obtained by (ratio of interface exposed reinforcing fibers)=[O]/[O0]. [O] is the relative elemental concentration of oxygen determined when an XPS measurement is performed on the continuous reinforcing fibers after dissolution of the resin as described above. [O0] is the relative elemental concentration of oxygen determined when continuous reinforcing fibers free of the bundling agent (sizing agent) as a raw material treated in the similar manner and an XPS measurement is performed on the continuous reinforcing fibers.

When the exposure degree of the above interface exposed reinforcing fibers is within the above range, high strength can be exhibited under high temperature conditions.

To adjust the exposure degree to the above range, for example, a method is exemplified in which the contact angle between the continuous reinforcing fiber and the thermoplastic resin according to a static wettability test is set to 70 to 130% of the contact angle between the continuous reinforcing fiber treated only with the coupling agent and the thermoplastic resin according to a static wettability test, and the impregnation speed of the continuous reinforcing fibers to the thermoplastic resin is set to 32%/min or more.

With regard to the continuous reinforcing fibers free of a bundling agent (sizing agent) (also referred to as bundling agent-free continuous reinforcing fibers), "being free of the bundling agent (sizing agent)" means that the content of the bundling agent (sizing agent) described later is 0.45 mass % or less when the total amount of the bundling agent-free continuous reinforcing fibers is 100 mass %, and that the isoelectric point is less than pH=3 in a zeta potential measurement and is negative at pH 3 to 8. Note that the zeta potential can be determined, for example, by adjusting the pH with hydrochloric acid or potassium hydroxide using a zeta potential meter dedicated to solids.

Examples of the method to obtain bundling agent-free continuous reinforcing fibers include method in which treatment of the continuous reinforcing fibers with the bundling agent (sizing agent) is omitted during production, and a method by removing the bundling agent (sizing agent) from continuous reinforcing fibers containing the bundling agent (sizing agent) by an electric furnace or the like.

In the above composite material, the relative elemental concentration of interfacial nitrogen after dissolution of the resin is preferably 6.70 or less, more preferably 5.70 or less, even more preferably 5.20 or less, and still even more preferably 5.00 or less.

The relative elemental concentration of interfacial nitrogen after dissolution of the resin is preferably 2.90 or more, more preferably 3.50 or more, and even more preferably 4.00 or more.

In the above composite material, the relative elemental concentration of interfacial carbon after dissolution of the resin is preferably 46.7 or less, more preferably 45.0 or less, even more preferably 42.0 or less, and still even more preferably 40.0 or less.

The relative elemental concentration of interfacial carbon after dissolution of the resin is preferably 30.0 or more, and more preferably 35.0 or more.

In the above composite material, the relative elemental concentration of interfacial aluminum after dissolution of the resin is preferably 1.80 or more, more preferably 2.00 or more, even more preferably 2.10 or more, and even more preferably 2.30 or more.

The relative elemental concentration of interfacial aluminum after dissolution of the resin is preferably 3.00 or less, more preferably 2.90 or less, and even more preferably 2.80 or less.

In the above composite material, the relative elemental concentration of interfacial silicon after dissolution of the resin is preferably 8.30 or more, more preferably 9.00 or more, and even more preferably 9.30 or more.

The relative elemental concentration of interfacial silicon after dissolution of the resin is preferably 12.0 or less, more preferably 11.5 or less, even more preferably 11.0 or less, and still even more preferably 10.5 or less.

In the above composite material, the relative elemental concentration of interfacial calcium after dissolution of the resin is preferably 2.60 or more, more preferably 2.70 or more, even more preferably 2.90 or more, even more preferably 3.00 or more, and particularly preferably 3.20 or more.

The relative elemental concentration of interfacial calcium after dissolution of the resin is preferably 3.40 or less, and more preferably 3.35 or less.

In the above composite material, the relative elemental concentration of interfacial oxygen after dissolution of the resin is preferably 33.1 or more, more preferably 35.0 or more, even more preferably 37.0 or more, still even more preferably 38.0 or more, and particularly preferably 39.0 or more.

The relative elemental concentration of interfacial oxygen after dissolution of the resin is preferably 47.0 or less, and more preferably 45.0 or less.

In the above composite materials, when the relative elemental concentration of each element in the continuous reinforcing fiber after dissolution of the resin is in the above range, high strength and elastic modulus can be obtained.

The method to adjust the relative elemental concentration of each element in the continuous reinforcing fiber after dissolution of the resin to the above range is exemplified, for example, by a method in which the contact angle between the continuous fiber and the thermoplastic resin according to a static wettability test is adjusted to be 70 to 130% of the contact angle between the continuous fiber treated only with the coupling agent and the thermoplastic resin according to a static wettability test, and the impregnation speed of the continuous fibers and thermoplastic resin is adjusted to be 32%/min or more, a method in which a silane coupling agent is used as a coupling agent, and the like.

More specifically, as the contact angle between the continuous fiber and the thermoplastic resin according to the static wettability test is increased and the difference of the contact angle between the continuous fiber treated only with the coupling agent and the thermoplastic resin according to a static wettability test is increased, the relative elemental concentration of interfacial nitrogen tends to increase.

When the difference of the contact angle between the continuous fiber and the thermoplastic resin according to a static wettability test and the contact angle between the continuous fiber treated only with the coupling agent and the thermoplastic resin according to a static wettability test is increased and the impregnation speed of the continuous fibers and thermoplastic resin is decreased, the relative elemental concentration of interfacial carbon tends to increase.

When the difference between the contact angle between the continuous fiber and the thermoplastic resin according to a static wettability test and the contact angle between the continuous fiber treated only with the coupling agent and the thermoplastic resin according to a static wettability test is decreased, the impregnation speed of the continuous fiber and the thermoplastic resin is increased, and a silane coupling agent is used as the coupling agent, the relative elemental concentration of interfacial aluminum tends to increase.

When a silane coupling agent is used as the coupling agent, the relative elemental concentration of interfacial silicon tends to increase.

When the difference between the contact angle of the continuous fiber and the thermoplastic resin according to a static wettability test and the contact angle of the continuous fiber treated only with the coupling agent and the thermoplastic resin according to a static wettability test is decreased, the impregnation speed of the continuous fiber and the thermoplastic resin is increased, and a silane coupling agent is used as the coupling agent, the relative elemental concentration of interfacial calcium tends to increase.

When the difference between the contact angle of the continuous fiber and the thermoplastic resin according to a static wettability test and the contact angle of the continuous fiber treated only with the coupling agent and the thermoplastic resin according to a static wettability test is decreased, the impregnation speed of the continuous fiber and the thermoplastic resin is increased, and a silane coupling agent is used as the coupling agent, the relative elemental concentration of interfacial oxygen tends to increase.

[Method of Producing Continuous Fiber Reinforced Resin Composite Material]

The method of producing continuous fiber reinforced resin composite material having the characteristic (II) is not particularly limited and examples include the method described above and the following methods.

In the production of a continuous fiber reinforced resin composite material having the above characteristic (II), it is preferable to obtain the desired composite material so that the contact angle between the continuous reinforcing fiber and the thermoplastic resin according to a static wettability test after dissolution of the resin is 70 to 13% of the contact angle between the continuous reinforcing fiber as a material treated only with a coupling agent and the thermoplastic resin according to a static wettability test, and the impregnation speed of the continuous reinforcing fibers with the thermoplastic resin is 32%/min or more, as mentioned above. Here, the material continuous reinforcing fiber as a material refer to continuous reinforcing fibers per se as a raw material.

(Characteristic (III))

The continuous fiber reinforced resin composite material of the present embodiment preferably further has the characteristic (III) described below.

[Continuous Fiber Reinforced Resin Composite Material]

It is preferable that the continuous fiber reinforced resin composite material of the present embodiment having the characteristic (III) contains continuous reinforcing fibers and thermoplastic resin, the above AE count A is 0.16 or less, the full width at half maximum of the (010) plane of the crystalline phase in the inner layer is 1.00 or more, and the intensity of the above (010) plane is 40000 or less. In present specification, the full width at half maximum of the (010) plane of the crystalline phase in the inner layer being 1.00 or more and the intensity of the above (010) plane being 40000 or less are sometimes referred to as "characteristic (III)".

The above full width at half maximum of the (010) plane of the crystalline phase in the inner layer is preferably 1.03 or more, and more preferably 1.05 or more. The above full width at half maximum of the (010) plane of the crystalline phase in the inner layer is preferably 1.20 or less, more preferably 1.17 or less, even more preferably 1.15 or less, still even more preferably 1.14 or less, and particularly preferably 1.13 or less.

The above intensity of the (010) plane of the crystalline phase in the inner layer is preferably 37000 or less. The above intensity of the (010) plane of the crystalline phase in the inner layer is preferably 10000 or more, more preferably 15000 or more, and even more preferably 20000 or more.

When the above full width at half maximum and the intensity of the (010) plane of the crystalline phase in the inner layer are in the above ranges, a good balance is achieved between crystallite size and continuity of the crystal of the thermoplastic resin in the continuous fiber reinforced resin composite material, resulting in good warping characteristic and shape conformability.

The method of adjusting the above full width at half maximum and the intensity of the (010) plane of the crystalline phase in the inner layer to the above ranges includes, for example, adjusting the maximum temperature during molding of the continuous fiber reinforced resin composite material during production of the continuous fiber reinforced resin composite material including a heating step and a cooling step and the temperature difference at the start of the cooling step of the continuous fiber reinforced resin composite material and a dissimilar material in contact with the continuous fiber reinforced resin composite material, to adjust the contact angles between the continuous fiber and the thermoplastic resin at a high temperature and at room temperature. By increasing the maximum temperature during molding of the continuous fiber reinforced resin composite material and increasing the temperature difference at the start of the cooling step of the continuous fiber reinforced resin composite material and the dissimilar material in contact with the continuous fiber reinforced resin composite material, the contact angle between the continuous fiber and the thermoplastic resin at a high temperature is decreased, and the mobility of the molecular chains of the thermoplastic resin during crystallization of the thermoplastic resin contained in the continuous reinforcing fibers is decreased. As a result, the full width at half maximum of the (010) plane of the crystalline phase in the inner layer tends to be increased and the intensity of the (010) plane of the crystalline phase in the inner layer tends to decrease.

The temperature of the continuous fiber reinforced resin composite material during molding can be measured, for example, by a method by sandwiching a thermocouple with the inner layer of the continuous fiber reinforced resin composite material. The dissimilar material is a material that is subjected to heating, cooling, and shaping in the production step and may be a material made of a metal, a ceramic, a resin material, water, oil, and the like, and a metal mold, a mold, and a belt are exemplified. The temperature of the dissimilar material can be measured by, for example, a method of measuring the points where the dissimilar material and the continuous fiber reinforced resin composite material come into contact by a thermocouple, a non-contact thermometer, or a contact thermometer.

Note that the full width at half maximum and the intensity of the (010) plane of the crystalline phase in the inner layer of the continuous fiber reinforced resin composite material can be measured by an XRD measurement of the continuous fiber reinforced resin composite material by the concentration method, and specifically can be measured by the method described in Examples.

The full width at half maximum of the (010) plane of the crystalline phase in the surface layer of the above continuous fiber reinforced resin composite material is preferably 1.25 or less, and more preferably 1.24 or less. The full width at half maximum of the (010) plane of the crystalline phase in the surface layer of the above continuous fiber reinforced resin composite material is preferably 0.90 or more, and more preferably 1.00 or more.

When the full width at half maximum of the (010) plane of the crystalline phase in the surface layer of the above continuous fiber reinforced resin composite material is in the above range, good warping characteristic and shape conformability tend to be achieved.

Note that the full width at half maximum of the (010) plane of the crystalline phase in the surface layer of the continuous fiber reinforced resin composite material can be measured by an XRD measurement of the continuous fiber reinforced resin composite material by the oblique incidence method, and specifically can be measured by the method described in Examples.

The full width at half maximum of the (100) plane of the crystalline phase in the inner layer of the above continuous fiber reinforced resin composite material is preferably 0.85 or more, more preferably from 0.85 to 1.1, and even more preferably from 0.87 to 1.0.

When the full width at half maximum of the (100) plane of the crystalline phase in the inner layer of the above continuous fiber reinforced resin composite material is in the above range, good warping characteristic and shape conformability tend to be achieved.

Note that the full width at half maximum of the (100) plane of the crystalline phase in the inner layer of the continuous fiber reinforced resin composite material can be measured by an XRD measurement of the continuous fiber reinforced resin composite material by the concentration method, and specifically can be measured by the method described in Examples.

The lattice spacing of the (010) plane of the crystalline phase in the inner layer of the above continuous fiber reinforced resin composite material is preferably 0.30 to 1.2, and more preferably 0.6 to 1.1.

When the lattice spacing of the (010) plane of the crystalline phase in the inner layer of the above continuous fiber reinforced resin composite material is in the above range, good warping characteristic and shape conformability tend to be achieved.

Note that the lattice spacing of the (010) plane of the crystalline phase in the inner layer of the continuous fiber reinforced resin composite material can be measured by an XRD measurement of the continuous fiber reinforced resin composite material by the concentration method, and specifically can be measured by the method described in Examples.

The full width at half maximum of the (100) plane of the crystalline phase in the surface layer of the above continuous fiber reinforced resin composite material is preferably 0.85 or more, and more preferably 0.86 or more.

When the full width at half maximum of the (100) plane of the crystalline phase in the surface layer of the above continuous fiber reinforced resin composite material is in the above range, good warping characteristic and shape conformability tend to be achieved.

Note that the full width at half maximum of the (100) plane of the crystalline phase in the surface layer of the continuous fiber reinforced resin composite material can be measured by an XRD measurement of the continuous fiber reinforced resin composite material by the oblique incidence method, and specifically can be measured by the method described in Examples.

The 2θ of the peak of the (100) plane of the crystalline phase in the surface layer of the above continuous fiber reinforced resin composite material is preferably 20.34° or more, more preferably 20.34° to 20.45°, even more preferably 20.35° to 20.40°, and particularly preferably 20.36° to 20.39°.

When 2θ of the peak of the (100) plane of the crystalline phase in the surface layer of the above continuous fiber reinforced resin composite material is in the above range, good warping characteristic and shape conformability tend to be achieved.

Note that the 2θ of the peak of the (100) plane of the crystalline phase in the surface layer of the continuous fiber reinforced resin composite material can be measured by an XRD measurement of the continuous fiber reinforced resin composite material by the oblique incidence method, and specifically can be measured by the method described in Examples.

[Method of Producing Continuous Fiber Reinforced Resin composite Material]

The method of producing continuous fiber reinforced resin composite material having the characteristic (III) is not particularly limited and examples include the method described above and the following methods.

The following methods can be used to produce the continuous fiber reinforced resin composite material having the characteristic (III), for example.

After the base materials (e.g., raw material laminate) are set in a mold, the mold is closed and is compressed. The temperature of the mold is adjusted to a temperature equal to or higher than the melting point of the thermoplastic resin composing the continuous fiber reinforced resin composite material to cause the thermoplastic resin to melt and be shaped. The mold clamping pressure is, but not limited to, preferably 1 MPa or more, and more preferably 3 MPa or more. Furthermore, after the mold is clamped and compression molding is carried out, the mold clamping pressure may be released for degassing or the like. It is preferable that compression molding is carried out for as long time as possible to the extent where the thermoplastic resin which is used does not undergo thermal aging from the viewpoint of imparting a strength. Nevertheless, from the viewpoint of the productivity, the compression molding time is preferably within 2 minutes, more preferably within 1 minute.

Other methods include a method in which the base materials to compose the continuous fiber reinforced resin composite material are continuously fed by a double belt press machine or a continuous compression molding machine, heated to the melting point of the thermoplastic resin or higher, compression molded under an arbitrary pressure, and cooled to the crystallization temperature or the glass transition temperature of the thermoplastic resin or lower for production.

In the method of producing the above continuous fiber reinforced resin composite material, it is preferable to use a method in which the maximum temperature during production of the continuous fiber reinforced resin composite material (e.g., the maximum temperature during molding) is set to a temperature of the melting point of the thermoplastic resin having the highest melting point among the thermoplastic resins included in the continuous fiber reinforced resin composite material+10° C. to +75° C. (preferably, the melting point+12° C. to 60° C.), and the temperature difference between the continuous fiber reinforced resin composite material and the dissimilar material in contact with the continuous fiber reinforced resin composite material at the time point when the cooling step is started after the above maximum temperature is reached is set to 60° C. or higher, preferably 80° C. or higher, more preferably 100° C. or higher, and even more preferably 120° C. or higher. The temperature of the continuous fiber reinforced resin composite material is measured, for example, by a method by sandwiching a thermocouple with the inner layer of the continuous fiber reinforced resin composite material. The dissimilar material is the material used in the cooling step described above (preferably material that cools the composite material by coming in contact with the composite material in the cooling step after heating and molding), such as a metal, a ceramic, a resin material, water, or oil. The temperature of the dissimilar material can be measured by, for example, a method of measuring the points where the dissimilar material and the continuous fiber reinforced resin composite material come into contact by a thermocouple, a non-contact thermometer, or a contact thermometer. The start of the cooling step refers to the time point at which the cooling step during production is started (e.g., the point at which the above dissimilar material for the cooling step comes into contact with the composite material after heat molding).

When the temperature difference between the maximum temperature and the temperature between the continuous fiber reinforced resin composite material and the dissimilar material in contact with the continuous fiber reinforced resin composite material at the start of the cooling step are within the above ranges, the full width at half maximum of the (010) plane of the crystalline phase in the inner layer of the continuous fiber reinforced resin composite material tends to increase and the intensity of the (010) plane of the crystalline phase in the inner layer tends to decrease.

It is preferable that the method of producing the above continuous fiber reinforced resin composite material includes molding the raw material laminate containing the continuous reinforcing fibers and the thermoplastic resin under heating, and that the relationship between the full width at half maximum of the (010) plane of the crystalline phase in the inner layer of the continuous fiber reinforced resin composite material and the maximum temperature during molding satisfy the relationship of the following formula:

(full width at half maximum of the (010) plane of the crystalline phase in the inner layer of the continuous fiber reinforced resin composite material)<0.0037×(maximum temperature during molding)+0.15.

When the maximum temperature during molding and the full width at half maximum of the (010) plane of the crystalline phase in the inner layer of the continuous fiber reinforced resin composite material satisfy the above relationship, the productivity of the continuous fiber reinforced resin composite material tends to be increased.

In the method of producing the above continuous fiber reinforced resin composite material, it is preferable that the ratio of the full width at half maximum and the intensity of the (010) plane of the crystalline phase in the inner layer of the continuous fiber reinforced resin composite material and the full width at half maximum of the (010) plane of the crystalline phase in the surface layer and the maximum temperature during forming satisfy the relationship of the following formula:

$$\text{(full width at half maximum of the (010) plane of the crystalline phase in the surface layer of the continuous fiber reinforced resin composite material)/(full width at half maximum and the intensity of the (010) plane of the crystalline phase in the inner layer of the continuous fiber reinforced resin composite material)} \geq -0.0034\times\text{(maximum temperature during molding)}+2.02.$$

When the ratio of the full width at half maximum of the (010) plane of the crystalline phase in the inner layer and the full width at half maximum of the (010) plane of the crystalline phase in the surface layer of the continuous fiber reinforced resin composite material and the maximum temperature during molding satisfy the above relationship, the warping characteristic tends to be improved.

It is preferable that the method of producing the above continuous fiber reinforced resin composite material includes cooling after placing the raw material laminate in a molding die or the like and molding it under heating, and the ratio of the full width at half maximum of the (100) plane of the crystalline phase in the inner layer of the continuous fiber reinforced resin composite material and the full width at half maximum of the (100) plane of the crystalline phase in the surface layer and the cooling rate during molding satisfy the relationship of the following formula:

$$\text{(full width at half maximum of the (100) plane of the crystalline phase in the surface layer of the continuous fiber reinforced resin composite material)/(full width at half maximum of the (100) plane of the crystalline phase in the inner layer of the continuous fiber reinforced resin composite material)} \geq 0.0125\times\text{(cooling rate during molding)}+0.318.$$

When the ratio of the full width at half maximum of the (100) plane of the crystalline phase in the inner layer and the full width at half maximum of the (100) plane of the crystalline phase in the surface layer of the continuous fiber reinforced resin composite material and the cooling rate during molding satisfy the above relationship, the warping characteristic tends to be improved.

Note that the cooling rate (° C./sec) during molding can be determined from the temperature difference between the maximum temperature of the continuous fiber reinforced resin composite material and the melting point of the thermoplastic resin contained in the above continuous fiber reinforced resin composite material–65° C., and the time required for the continuous fiber reinforced resin composite material to be cooled from the above maximum temperature to the melting point of the thermoplastic resin contained in the above continuous fiber reinforced resin composite material–65° C. The cooling conditions for measuring the cooling rate shall be the same as the conditions of the cooling step for producing the above continuous fiber reinforced resin composite material.

In the above method of producing continuous fiber reinforced resin composite material, the contact angle between the continuous reinforcing fiber and the thermoplastic resin at 280° C. is preferably 1.3 to 7.0 times, more preferably 1.4 to 6.0 times, and even more preferably 1.5 to 5.5 times the contact angle at 23° C.

The contact angle between continuous reinforcing fibers and thermoplastic resin can be measured by sandwiching a single yarn of continuous reinforcing fibers and a film of the thermoplastic resin between glass covers, raising the temperature to the melting point of the thermoplastic resin or higher, and observing the contact angle between the continuous reinforcing fiber and the thermoplastic resin under an optical microscope at the high temperature and at room temperature after cooling by observing the contact angle between the continuous reinforcing fiber and the thermoplastic resin under the optical microscope immediately before cooling is started. Specifically, it can be measured by the method in the Examples.

When the contact angles between the continuous reinforcing fiber and thermoplastic resin at the high temperature and room temperature satisfy the above relationship, excellent warping characteristic and shape conformability tend to be achieved.

(Characteristic (IV)

The continuous fiber reinforced resin composite material of the present embodiment preferably further has the characteristic (IV) described below.

[Continuous Fiber Reinforced Resin Composite Material]

It is preferable that the continuous fiber reinforced resin composite material of the present embodiment having the characteristic (IV) includes continuous reinforcing fibers and a thermoplastic resin, the above AE count A is 0.16 or less, and the interfacial polishing value P/Vf, which is the value determined by dividing the maximum polishing pressure P (g/cm$^2$) at which no voids are observed between the continuous reinforcing fibers and the thermoplastic resin when a cross section orthogonal to the length direction of the continuous reinforcing fibers of the continuous fiber reinforced resin composite material is polished and the polished cross section is observed under a field emission scanning electron microscope (FESEM), by the volume ratio Vf (%) of the continuous reinforcing fibers in the continuous fiber reinforced resin composite material, is 10 g/cm$^2$·% or more. In this specification, the interfacial polishing value P/Vf, which is the value determined by dividing the maximum polishing pressure P (g/cm$^2$) at which no voids are observed between the continuous reinforcing fibers and the thermoplastic resin when a cross section orthogonal to a length direction of the continuous reinforcing fibers of the continuous fiber reinforced resin composite material is polished and the polished cross section is observed under a field emission scanning electron microscope (FESEM), by the volume ratio Vf (%) of the continuous reinforcing fibers in the continuous fiber reinforced resin composite material being 10 g/cm$^2$·% or more is sometimes referred to as "characteristic (IV)".

The above interfacial polishing value is preferably 12 g/cm$^2$·% or more, more preferably 17 g/cm$^2$·% or more, even more preferably 21 g/cm$^2$·% or more, still even more preferably 25 g/cm$^2$·% or more, particularly preferably 32 g/cm$^2$·% or more, and most preferably 42 g/cm$^2$·% or more. When the interfacial polishing value is within this range, a good adhesion is achieved between the continuous reinforcing fibers and thermoplastic resin in the continuous fiber reinforced resin composite material and the two are less likely to fracture, and excellent strength, elastic modulus, impact characteristic, high-temperature characteristics, water absorption characteristics, and interfacial recoverability can be exhibited.

In the present disclosure, "void" refers to a region in which no thermoplastic resin is present in a width of one-twentieth or more of the diameter of the continuous reinforcing fiber from the periphery of the continuous reinforcing fiber in the radial direction.

In addition, "no voids being observed between the continuous reinforcing fibers and the thermoplastic resin" means a state in which the circumference length of the portion where void(s) is present is 10% or less of the total circumference length of a single yarn of the continuous reinforcing fibers taken as 100% when the polished cross section is observed under the FESEM.

The method of adjusting the interfacial polishing value to the above-mentioned range is, for example, a method in which surface treatment agent-containing continuous reinforcing fibers are prepared by treating the continuous reinforcing fibers with the surface treatment agent, and the later-described interfacial shear strength of the obtained surface treatment agent-containing continuous reinforcing fibers and the thermoplastic resin is adjusted to be 0.8 to 1.2 times the interfacial shear strength between coupling agent-treated continuous reinforcing fibers treated only with a coupling agent instead of the surface treatment agent and the thermoplastic resin, and the later-described p droplet contact angle between the surface treatment agent-containing continuous reinforcing fibers and the thermoplastic resin is adjusted to be 0.4 to 0.7 times the μ droplet contact angle between surface treatment agent-free continuous reinforcing fibers free of the surface treatment agent and the thermoplastic resin. Furthermore, adjustment can be made by using a method in which the interfacial shear strength between the surface treatment agent-containing continuous reinforcing fibers and the thermoplastic resin is adjusted to be 1.8 to 10 times the interfacial shear strength between the above surface treatment agent-free continuous reinforcing fibers and the thermoplastic resin, a method in which the μ droplet contact angle between the surface treatment agent-containing continuous reinforcing fibers and the thermoplastic resin is adjusted to be 0.8 to 1.6 times the μ droplet contact angle between the above coupling agent-treated continuous reinforcing fibers and the thermoplastic resin, or the like.

In the present disclosure, the interfacial polishing value P/Vf of the continuous fiber reinforced resin composite material can be determined by dividing the maximum polishing pressure P (g/cm$^2$) at which no voids are observed with any single yarns when the continuous fiber reinforced resin material is cut by a band saw so that a cross section perpendicular to the length direction of the continuous reinforcing fibers (polished surface) is obtained, the polished surface is polished by a polishing machine by varying the polishing pressure applied to the polished surface, and the polished surface is observed under an FESEM, and arbitrary 10 single yarns of the continuous reinforcing fibers are observed, by the volume ratio Vf (%) of the continuous reinforcing fibers in the continuous fiber reinforced resin composite material. Specifically, it can be determined by the method described in the Examples below.

[Method of Producing Continuous Fiber Reinforced Resin Composite Material]

The method of producing continuous fiber reinforced resin composite material having the characteristic (IV) is not particularly limited and includes the method described in detail and the following methods.

As a method of producing the continuous fiber reinforced resin composite material having the above characteristic (II), a method can be used in which the base materials to compose the continuous fiber reinforced resin composite material are continuously fed by a double belt press machine or a continuous compression molding machine, heated to the melting point of the thermoplastic resin or higher, compression molded under an arbitrary pressure, and cooled to the crystallization temperature or the glass transition temperature of the thermoplastic resin or lower for production.

In the above method of producing the continuous fiber reinforced resin composite material, it is preferable that surface treatment agent-containing continuous reinforcing fibers are produced by treating continuous reinforcing fibers with the surface treatment agent, the interfacial shear strength between the surface treatment agent-containing continuous reinforcing fibers and the thermoplastic resin determined by the μ droplet method using the following formula (1) is set to 0.8 to 1.2 times the interfacial shear strength between coupling agent-treated continuous reinforcing fibers which are treated only with a coupling agent instead of the surface treatment agent and the thermoplastic resin, and the μ droplet contact angle between the surface treatment agent-containing continuous reinforcing fibers and the thermoplastic resin determined by the μ droplet method is set to 0.4 to 0.7 times the μ droplet contact angle between surface treatment-free continuous fibers free of a surface treatment agent and the thermoplastic resin:

$$\tau = F/\pi dL \tag{1}$$

(in the formula, τ is the interfacial shear strength (MPa), d is the diameter of the continuous reinforcing fibers (μm), L is the length (μm) of a resin ball (μ drop) of the thermoplastic resin made to be attached to a single yarn of the continuous reinforcing fibers in the axial direction of the continuous reinforcing fibers, and F is the shear load (N) when the resin ball is pulled off from the continuous reinforcing fiber).

The interfacial shear strength between the above surface treatment agent-containing continuous reinforcing fibers and the thermoplastic resin is more preferably 0.85 to 1.17 times, more preferably 0.90 to 1.15 times, and even more preferably 1.0 to 1.1 times the interfacial shear strength between the coupling agent-treated continuous reinforcing fiber and the thermoplastic resin. When the interfacial shear strength is in the above range, the interfacial polishing value of the continuous fiber reinforced resin composite material tends to increase.

The above shear load F can be measured on a resin ball (μ drop) of the thermoplastic resin made to be attached to a single yarn of continuous reinforcing fibers using a composite material interface characteristic evaluation apparatus, and specifically can be determined by the method described in Examples to be described below.

FIG. 1 is a schematic diagram of a single yarn 1 of continuous reinforcing fiber and a resin ball (μ drop) 2 of the thermoplastic resin made to be attached to the single yarn 1, where d is the diameter of the single yarn 1 and L is the length of the resin ball 2 in the fiber axial direction of the single yarn 1.

The above interfacial shear strength can be adjusted by changing the types of the continuous reinforcing fibers, the surface treatment agent, or the thermoplastic resin used.

Examples of methods of producing coupling agent-treated continuous reinforcing fibers include a method in which treatment only with a coupling agent is carried out during production of continuous reinforcing fibers, or a method in which a surface treatment agent in surface treatment agent-containing continuous reinforcing fibers is removed by treatment in an electric furnace or the like and the resultant is then treated only with a coupling agent.

The μ droplet contact angle between the above surface treatment agent-containing continuous reinforcing fibers and the thermoplastic resin is more preferably 0.45 to 0.65 times and even more preferably 0.50 to 0.60 times the μ droplet contact angle between the surface treatment agent-free continuous reinforcing fibers and the thermoplastic resin. When the μ droplet contact angle is in the above range, the interfacial polishing value of the continuous fiber reinforced resin composite material tends to increase.

Note that the μ droplet contact angle can be measured on a resin ball (μ drop) of the thermoplastic resin made to be attached to a single yarn of continuous reinforcing fibers using a composite material interface characteristic evaluation apparatus, and specifically can be determined by the method described in Examples to be described below.

FIG. 1 is a schematic diagram of a single yarn 1 of continuous reinforcing fiber and a resin ball (μ drop) 2 of the thermoplastic resin made to be attached to the single yarn, where a is the μ droplet contact angle.

The above μ droplet contact angle can be adjusted by changing the types of the continuous reinforcing fibers, the surface treatment agent, or the thermoplastic resin used.

With regard to surface treatment agent-free continuous reinforcing fibers free of a surface treatment agent, "surface treatment agent-free" means that the content of a surface treatment agent is 0.45 mass % or less when the total amount of the surface treatment agent-free continuous reinforcing fibers is taken as 100 mass %, and that the isoelectric point is less than pH=3 and negative at pH 3 to 8 in a zeta potential measurement.

The zeta potential can be determined, for example, by adjusting the pH with hydrochloric acid or potassium hydroxide using a zeta potential meter dedicated to solids.

Examples of the methods to obtain surface treatment agent-free continuous reinforcing fibers include the method in which treatment with a surface treatment agent is omitted during production of the continuous reinforcing fibers, and a method in which a surface treatment agent in surface treatment agent-containing continuous reinforcing fibers is removed using an electric furnace or the like.

In addition, in the above method of producing continuous fiber reinforced resin composite material, the interfacial shear strength between the surface treatment agent-containing continuous reinforcing fibers and the thermoplastic resin is set to preferably 1.8 to 10 times, more preferably 2.0 to 8.0 times, even more preferably 3.0 to 6.0 times, and still even more preferably 3.5 to 5.0 times the interfacial shear strength between the surface treatment agent-free continuous reinforcing fibers and the thermoplastic resin. When the interfacial shear strength is in the above range, the interfacial polishing value of the continuous fiber reinforced resin composite material tends to increase.

The above interfacial shear strength can be adjusted by changing the types of the continuous reinforcing fibers, the surface treatment agent, or the thermoplastic resin used.

Furthermore, in the above method of producing continuous fiber reinforced resin composite material, the μ droplet contact angle between the surface treatment agent-containing continuous reinforcing fibers and the thermoplastic resin is set to preferably 0.8 to 1.6 times, more preferably 0.85 to 1.4 times, and even more preferably 0.90 to 1.2 times the μ droplet contact angle between the coupling agent-treated continuous reinforcing fiber and the thermoplastic resin. When the p droplet contact angle is in the above range, the interfacial polishing value of the continuous fiber reinforced resin composite material tends to increase.

The above μ droplet contact angle can be adjusted by changing the types of the continuous reinforcing fibers, the surface treatment agent, or the thermoplastic resin used.

(Characteristic (V)

The continuous fiber reinforced resin composite material of the present embodiment preferably further has the characteristic (V) described below.

[Continuous Fiber Reinforced Resin Composite Material]

It is preferable that the continuous fiber reinforced resin composite material of the present embodiment having the characteristic (V) contains continuous reinforcing fibers and thermoplastic resin, and the above AE count A is 0.16 or less, and the interfacial coverage ratio change index before and after a fracture test as described below is 0.8 to 1.2. In present specification, the interfacial coverage ratio change index being 0.8 to 1.2, as described below, before and after a fracture test is sometimes referred to as "characteristic (V)".

(Interfacial coverage ratio change index) = (interfacial coverage ratio index of the continuous fiber reinforced resin of the composite before a fracture test)/(interfacial coverage ratio of the composite material after the fracture test)

The above interfacial coverage ratio change index is preferably between 0.9 and 1.2, and between 0.95 and 1.15.

The interfacial coverage ratio (%) of the above continuous fiber reinforced resin composite material can be determined from the ratio of the relative elemental concentration of a component element derived from the thermoplastic resin remaining on the surface of the continuous reinforcing fibers, to the sum of the relative elemental concentration of the component element derived from the thermoplastic resin remaining on the surface of the continuous reinforcing fibers and the relative elemental concentration of the component element derived from the continuous reinforcing fiber, when the continuous reinforcing fibers are measured by an X-ray photoelectron spectroscopy (XPS) after the thermoplastic resin is dissolved out of the continuous fiber reinforced resin composite material in a solvent.

The interfacial coverage ratio of the above continuous fiber reinforced resin composite material (interfacial coverage ratio of the composite material before a fracture test) is preferably from 3 to 44%, more preferably from 10 to 40%, and more preferably from 20 to 37%.

The coverage ratio of the thermoplastic resin remaining on the surface of the continuous reinforcing fiber of the above continuous fiber reinforced resin composite material after dissolution of the thermoplastic resin in the solvent (interfacial coverage ratio of the continuous reinforcing fiber resin composite material) can be measured, for example, by the following method.

The continuous fiber reinforced resin composite material is immersed in a solvent to cause the thermoplastic resin in the composite material to be dissolved in the solvent. After the above solvent is removed, the remaining composite material is washed again with fresh above solvent to remove the thermoplastic resin on the surface of the continuous reinforcing fibers. In this step, the thermoplastic resin that is tightly bonded to a bundling agent (preferably a coupling agent) on the surface of the continuous reinforcing fibers remains on the surface of the continuous reinforcing fibers, and only the thermoplastic resin that is not bonded to the bundling agent is removed by the solvent. The interfacial coverage ratio (%) of the continuous fiber reinforced resin composite material can be determined from the ratio of the relative elemental concentration of a component element derived from the thermoplastic resin remaining on the surface of the continuous reinforcing fibers, to the sum of the relative elemental concentration of the component element derived from the thermoplastic resin remaining on the surface of the continuous reinforcing fibers and the relative elemental concentration of the component element derived from the continuous reinforcing fiber, when the composite material is measured by an X-ray photoelectron spectroscopy (XPS) after drying.

For example, in the case where the thermoplastic resin is polyamide and the continuous reinforcing fibers are glass fibers, the following treatment method is used.

(a) The above continuous fiber reinforced resin composite material is cut into thin slices.

(b) 100 mg of the thin slices of the above continuous fiber reinforced resin composite material and 20 mL of hexafluoroisopropanol (HFIP) as a solvent are placed in a mixing rotor and stirred at 23° C. for 5 hours.

(c) The solvent is removed by suction filtration, and the composite material is washed by sprinkling 40 mL of fresh HFIP on the filter, and then air dried.

(d) The composite material obtained in (c) and 20 mL of fresh HFIP are placed in a mixing rotor and stirred at 23° C. for 2 hours.

(e) The solvent is removed by suction filtration, and the composite material is washed by sprinkling 40 mL of fresh HFIP on the filter, and then dried by nitrogen blow at 23° C.

(f) The continuous reinforcing fiber obtained in (e) and 20 mL of fresh HFIP are placed in a mixing rotor and stirred at 23° C. for 2 hours.

(g) The solvent is removed by suction filtration, and the composite material is washed by sprinkling 40 mL of fresh HFIP on the filter, and then air dried.

(h) The resultant is dried overnight in a vacuum dryer set at 23° C.

The interfacial coverage ratio is determined by:

$$\text{(Interfacial coverage ratio) (\%)} = [N]/([N]+[\mathrm{Si}])\times 100,$$

where [N] is the relative elemental concentration of nitrogen and [Si] is the relative elemental concentration of silicon determined by an XPS measurement.

For example, in the case where the thermoplastic resin is polyamide and the continuous reinforcing fibers are carbon fibers, a sample is prepared using HFIP as the solvent in the manner similar to the case where the thermoplastic resin is polyamide and the continuous reinforcing fibers are glass fibers, and the interfacial coverage ratio is determined by:

$$\text{(Interfacial coverage ratio) (\%)}\ [N]/([N]+[O])\times 100,$$

where [O] is the relative elemental concentration of oxygen determined by an XPS measurement.

For example, in the case where the thermoplastic resin is polypropylene and the continuous reinforcing fibers are glass fibers, a sample is prepared using xylene as the solvent. In this case, the sample is prepared in the manner similar to the case where the thermoplastic resin is polyamide and the continuous reinforcing fibers are glass fibers, except that the temperature for stirring the composite material and the solvent is set to 90° C., the temperature for drying and nitrogen blowing is set to 120° C., and the temperature for vacuum drying is set to 120° C. The interfacial coverage ratio is determined by:

$$\text{(Interfacial coverage ratio) (\%)}=([C]-[C0])/([C]-[C0]+[\mathrm{Si}])\times 100$$

[C] is the relative elemental concentration of carbon determined by an XPS measurement. [C0] is the relative elemental concentration of carbon determined by an XPS measurement of the composite material and a sample prepared in the same manner using untreated continuous reinforcing fibers from which a surface treatment agent such as a sizing agent has been removed from the continuous reinforcing fibers by incineration, etc. Note that the interfacial coverage ratio in the case of the combination of polypropylene and glass fibers is calculated using the relative elemental concentration of carbon after treatment of surface treatment agent-free continuous reinforcing fibers, because carbon element is detected even when a sample is considered to be free of carbon due to the nature of XPS measurements.

In the case where the thermoplastic resin is polyphenylene ether, regardless of the type of continuous reinforcing fibers, the interfacial coverage ratio can be determined by preparing a sample using chloroform as a solvent in the manner similar to the case where the thermoplastic resin is polyamide and the continuous reinforcing fibers are glass fibers. In addition, the formula for calculating the interfacial coverage ratio when the continuous reinforcing fibers are glass fibers is as follows:

$$\text{(Interfacial coverage ratio) (\%)} = ([C]-[C0])/[C]-[C0]+[\mathrm{Si}])\times 100$$

In the case where the thermoplastic resin is polyvinyl alcohol, preparation can be made using water as the solvent regardless of the type of continuous reinforcing fibers. In this case, a sample can be prepared and the interfacial coverage ratio can be determined in the manner similar to the case where the thermoplastic resin is polyamide and the continuous reinforcing fibers are glass fibers, except that the temperature for stirring the composite material and the solvent is set to 95° C., the temperature for drying and nitrogen blowing is set to 120° C., and the temperature for vacuum drying is set to 120° C. In addition, the formula for calculating the interfacial coverage ratio when the continuous reinforcing fibers are glass fibers is as follows:

$$\text{(Interfacial coverage ratio) (\%)} = ([C]-[C0])/[C]-[C0]+[\mathrm{Si}])\times 100$$

In the case where the thermoplastic resin is polyvinyl acetate, regardless of the type of continuous reinforcing fibers, the interfacial coverage ratio can be determined by preparing a sample using acetone as the solvent in the manner similar to the case where the thermoplastic resin is polyamide and the continuous reinforcing fibers are glass fibers. In addition, the formula for calculating the interfacial coverage ratio when the continuous reinforcing fibers are glass fibers is as follows:

$$(\text{Interfacial coverage ratio})\ (\%) = ([C]-[C0])/[C]-[C0]+[\text{Si}])\times 100$$

In the case where the thermoplastic resin is polylactic acid, regardless of the type of continuous reinforcing fibers, the interfacial coverage ratio can be determined by preparing a sample using chloroform as a solvent in the manner similar to the case where the thermoplastic resin is polyamide and the continuous reinforcing fibers are glass fibers. In addition, the formula for calculating the interfacial coverage ratio when the continuous reinforcing fibers are glass fibers is as follows:

$$(\text{Interfacial coverage ratio})\ (\%) = ([C]-[C0])/[C]-[C0]+[\text{Si}])\times 100$$

In the case where the thermoplastic resin is polyvinyl chloride, regardless of the type of continuous reinforcing fibers, the interfacial coverage ratio can be determined by preparing a sample using acetone as the solvent in the manner similar to the case where the thermoplastic resin is polyamide and the continuous reinforcing fibers are glass fibers. In addition, the formula for calculating the interfacial coverage ratio when the continuous reinforcing fibers are glass fibers is as follows:

$$(\text{Interfacial coverage ratio})\ (\%) = ([C]-[C0])/[C]-[C0]+\text{Si})\times 100$$

The interfacial coverage ratio change index can be obtained by dividing the interfacial coverage ratio of the interfacial resin of the continuous fiber reinforced resin composite material (the interfacial coverage ratio of the continuous fiber reinforced resin composite material that has not been subjected to a fracture test), by the interfacial coverage ratio of the continuous fiber reinforced resin composite material after a fracture test (for example, after conducting a cantilever bending fatigue test to be described in the Examples below).

When the interfacial coverage ratio change index is in the above range, high interfacial recoverability is exhibited and the deviation in physical properties (e.g., strength) can be reduced.

The method to adjust the above interfacial coverage ratio change index within the above range is exemplified, for example, by a method in which the rate at which the continuous reinforcing fibers are impregnated with the thermoplastic resin is set to 0.8 to 1.2 times, preferably 0.85 to 1.15 times, more preferably 0.9 to 1.1 times the rate at which the coupling continuous reinforcing fibers treated only with the coupling agent are impregnated with thermoplastic resin, a method in which a combination of continuous reinforcing fibers and a thermoplastic resin is used so that the bending strength of the coupling continuous fiber reinforced resin composite material made of the coupling continuous reinforcing fibers treated only with the above coupling agent and the above thermoplastic resin is 0.6 times or more, preferably 0.6 to 1.2 times the bending strength of the above continuous fiber reinforced resin composite material, and a method in which a combination of a glass fibers to which a surface treatment agent is added according to the method described in the Example and PA66 produced according to the method described in the Example is used.

Examples of the combination of continuous reinforcing fibers and the thermoplastic resins where the bending strength is in the above range include combinations of a polyamide resin (preferably, polyamide 66, polyamide 6I, polyamide 6, polyamide 610, or polyamide 410) and glass fibers or carbon fibers, and combinations of a polyolefin resin (preferably, polypropylene, modified polypropylene, polyethylene, or modified polyethylene) and glass fibers or carbon fibers.

When the impregnation speed and/or the bending strength are in the above range, the compatibility between the thermoplastic resin and the bundling agent (e.g., coupling agent in the bundling agent) on the surface of the continuous reinforcing fibers is improved.

Here, The impregnation speed can be determined as follows, for example. A continuous reinforcing fiber base material and a thermoplastic resin base material are laminated, and heat press molding is performed so that the maximum temperature of the continuous fiber reinforced resin composite material is the melting temperature of the thermoplastic resin+15° C. and the molding pressure is 5 MPa, and then the cooling press is performed with water cooling (with a water temperature of 20° C.) under a pressure of 5 MPa. Then, the resulting continuous reinforcing fiber composite material is cut using a band saw, etc., the cross section is polished, and an image is obtained by an SEM observation, etc. From the image, the occupied area of each of the continuous reinforcing fiber bundle, the thermoplastic resin, and voids is determined. The ratio of the area of voids to the area of the continuous reinforcing fiber bundle (total) is determined. The impregnation speed can be determined by dividing the impregnation ratio (%) determined by the following formula:

$$\text{Impregnation ratio}\ (\%) = \{1-(\text{area of voids/area of continuous reinforcing fiber bundle})\}\times 100$$

by the time (minutes) during which the temperature of the thermoplastic resin during heat press molding and cooling press is the melting point or higher in the case of a thermoplastic resin having a melting point, or the glass transition temperature or higher in the case of a resin not having a melting point.

The bending strength of the continuous fiber reinforced resin composite material can be determined, for example, by cutting out a test specimen in a short strip shape from the continuous fiber reinforced resin composite material and performing a three-point bending test under an environment of 23° C. and 50% RH.

In the above composite material, when the compatibility between the thermoplastic resin and the bundling agent (e.g., coupling agent) on the surface of the continuous reinforcing fiber is good, the bundling agent on the surface of the continuous reinforcing fiber and the thermoplastic resin around the bundling agent can bond or adhere to each other. Here, in a sample where the thermoplastic resin is removed with a solvent by the method described above, only the thermoplastic resin bonded or adhered to the bundling agent remains around the continuous reinforcing fibers, and the thermoplastic resin that is not bonded to the bundling agent is removed. In other words, this sample can be used to measure the percentage of the thermoplastic resin bonded or adhered to the bundling agent that is present on the surface of continuous reinforcing fibers.

When a fracture test is performed, the impact causes the thermoplastic resin that is not bonded or adhered to the bundling agent and the thermoplastic resin that is weakly bonded or adhered to the bundling agent, present on the surface of the continuous reinforcing fibers to be removed. When a large amount of the thermoplastic resin tightly bonded or adhered to the bundling agent is present on the surface of the continuous reinforcing fibers, the thermoplastic resin is less likely to be removed in a fracture test, and the coverage ratio of the thermoplastic resin on the continuous reinforcing fibers after the fracture test is less likely to decrease. Hence, a large amount of the thermoplastic resin remains on the surface of the continuous reinforcing fibers after the fracture test, and the change in the interfacial coverage ratio of the continuous fiber reinforced resin composite material before and after the fracture test is reduced.

The above example is described with reference to the example where a bundling agent is present on the surface of the continuous reinforcing fibers. However, an evaluation can be performed in the same manner even when the thermoplastic resin is directly bonded or adhered to the continuous reinforcing fibers without using a bundling agent.

The reinforcing fiber exposure change index of the above continuous fiber reinforced resin composite material expressed by the following formula is preferably 0.8 to 1.2.

$$\text{(Reinforcing fiber exposure change index)} = \text{(reinforcing fiber exposure ratio of the continuous fiber reinforced resin composite material before the fracture test)/(reinforcing fiber exposure ratio of the composite material the fracture test)}$$

The above reinforcing fiber exposure change index is more preferably between 0.85 and 1.15, and even more preferably between 0.90 and 1.10. When the reinforcing fiber exposure change index is in the above range, even higher interfacial recoverability can be achieved and the deviation in physical properties can be reduced.

The reinforcing fiber exposure change index can be determined by dividing the exposure ratio of the continuous reinforcing fibers of the continuous fiber reinforced resin composite material after dissolution of the thermoplastic resin, by the exposure ratio of the continuous reinforcing fibers of the continuous fiber reinforced resin composite material after dissolution of the thermoplastic resin after a fracture test (e.g., after conducting a cantilever bending fatigue test described in the Examples below).

For example, the exposure ratio of the continuous reinforcing fibers after dissolution of the thermoplastic resin is determined as follows. The thermoplastic resin contained in the continuous fiber reinforced resin composite material is caused to be dissolved in a solvent by the method described above, the solvent is removed. The remaining continuous reinforcing fibers are then washed with fresh above solvent, the thermoplastic resin excluding thermoplastic resin bonded to the continuous reinforcing fibers is removed, and then a measurement is carried out by an X-ray photoelectron spectroscopy (XPS) after drying. The exposure ratio of continuous reinforcing fibers after dissolution of the thermoplastic resin is determined by dividing the relative elemental concentration of an element derived from the obtained continuous reinforcing fibers, by the relative elemental concentration of the element derived from the continuous reinforcing fiber raw material that has not been treated with the bundling agent.

In the case where the continuous reinforcing fibers are glass fibers, the reinforcing fiber exposure ratio of the composite material, for example, can be determined by following:

$$\text{(Reinforcing fiber exposure ratio of composite material)} = [Al]/[Al0]$$

where [Al] is the relative elemental concentration of aluminum determined by an XPS measurement. [Al0] is the relative elemental concentration of aluminum determined by treating continuous reinforcing fibers free of a bundling agent such as a sizing agent in the same manner and making an XPS measurement.

In the case where the continuous reinforcement fibers are carbon fibers, it can be determined, for example:

$$\text{(Reinforcing fiber exposure ratio of composite material)} = [O]/[O0]$$

where [O] is the relative elemental concentration of oxygen determined by an XPS measurement. [O0] is the relative elemental concentration of oxygen determined by treating continuous reinforcing fibers free of a surface treatment agent such as a sizing agent in the same manner and making an XPS measurement.

The reinforcing fiber exposure ratio is the percentage of exposed continuous reinforcing fibers on the surface of the continuous reinforcing fibers as a raw material exposed after the above treatment. When the change in the reinforcing fiber exposure ratio before and after a fracture test is small, a composite material with stable strength even when being subjected to vibration, impact, etc. can be provided The relative elemental change index of interfacial nitrogen of the above continuous fiber reinforced resin composite materials is preferably 0.8 to 1.2, and more preferably 0.9 to 1.1.

The relative elemental change index of interfacial carbon of the above continuous fiber reinforced resin composite materials is preferably 0.8 to 1.2, and more preferably 0.9 to 1.1.

The relative elemental change index of interfacial aluminum in the above continuous fiber reinforced resin composite materials is preferably 0.8 to 1.2, and more preferably 0.9 to 1.1.

The relative elemental change index of interfacial silicon of the above continuous fiber reinforced resin composite materials is preferably 0.8 to 1.2, and more preferably 0.9 to 1.1.

The relative elemental change index of interfacial calcium in the above continuous fiber reinforced resin composite material is preferably 0.8 to 1.2, and more preferably 0.9 to 1.1.

The relative elemental change index of interfacial oxygen of the above continuous fiber reinforced resin composite materials is preferably 0.8 to 1.2, and more preferably 0.9 to 1.1.

When the relative elemental change index is in the above range, high interfacial recoverability can be exhibited and the deviation in physical properties can be reduced.

The relative elemental change index can be obtained by dividing a relative elemental concentration of the continuous fiber reinforced resin composite material after dissolution of the thermoplastic resin, by the relative elemental concentration of the continuous fiber reinforced resin composite material after dissolution of the resin after a fracture test (e.g., the cantilever bending fatigue test described in the Examples below). Dissolution of the thermoplastic resin of the continuous fiber reinforced resin composite material can be performed as described above.

The method to adjust the relative elemental change index to the above range is exemplified by, for example, the method in which the rate at which the continuous reinforcing fibers are impregnated with the thermoplastic resin is set to 0.8 to 1.2 times, preferably 0.85 to 1.15 times, more preferably 0.9 to 1.1 times the rate at which the coupling continuous reinforcing fibers treated only with a coupling agent are impregnated with thermoplastic resin, and the method in which a combination of a thermoplastic resin and continuous reinforcing fibers is used so that the bending strength of a coupling continuous fiber reinforced resin composite material made of coupling continuous reinforcing fibers treated only with the above coupling agent and the above thermoplastic resin is 0.6 to 1.2 times the bending strength of the above continuous fiber reinforced resin composite material.

[Method of Producing Continuous Fiber Reinforced Resin Composite Material]

In the method of producing the continuous fiber reinforced resin composite material having the characteristic (V), the rate at which the continuous reinforcing fibers are impregnated with the thermoplastic resin is preferably 0.8 to 1.2 times the rate at which the coupling continuous reinforcing fibers are impregnated with thermoplastic resin treated only with a coupling agent. Here, the coupling continuous reinforcing fibers refer to continuous reinforcing fibers produced by the same method as continuous reinforcing fiber, except that the bundling agent is changed to a coupling agent alone. It is preferable that a bundling agent that includes a coupling agent and a lubricant and/or a binding agent is used for continuous reinforcing fibers and that that coupling agent is used for the coupling continuous reinforcing fibers.

In the method of producing the composite material described above, the bending strength of the coupling continuous fiber reinforced resin composite material made of the above coupling continuous reinforcing fibers and the above thermoplastic resin is preferably at least 0.6 times the bending strength of the above continuous fiber reinforced resin composite material. Here, the coupling continuous fiber reinforced resin composite material refers to a composite material produced by the same method as the method of producing the continuous fiber reinforced resin composite material, except that the coupling continuous reinforcing fibers are used as continuous reinforcing fibers. It is preferable that a bundling agent that includes a coupling agent and a lubricant and/or a binding agent is used for the continuous reinforcing fibers and that coupling agent is used for the coupling continuous reinforcing fibers.

[Form of Continuous Fiber Reinforced Resin Composite Material]

The form of the continuous fiber reinforced resin composite material having at least one selected from the group consisting of the characteristics (II), (III), (IV), and (V) above is exemplified by those mentioned above, and ones similar to those described above are preferred.

(Continuous Reinforcing Fibers)

The continuous reinforcing fibers for use in the continuous fiber reinforced resin composite material having at least one selected from the group consisting of the characteristics (II), (III), (IV), and (V) above is exemplified by those mentioned above, and ones similar to those described above are preferred.

(Shape of Continuous Reinforcing Fibers)

The shape of the continuous reinforcing fibers used for the continuous fiber reinforced resin composite material having at least one selected from the group consisting of the characteristics (II), (III), (IV), and (V) above is exemplified by those mentioned above, and the shapes similar to those described above are preferred.

(Thermoplastic Resin)

The thermoplastic resin for use in the continuous fiber reinforced resin composite material having at least one selected from the group consisting of the characteristics (II), (III), (IV), and (V) above is exemplified by those mentioned above, and ones similar to those described above are preferred.

[Additives]

The continuous fiber reinforced resin composite material having at least one selected from the group consisting of the characteristics (II), (III), (IV), and (V) above may also contain additives as needed. The above additives are exemplified by those described above, and ones similar to those described above are preferred.

[Application of Continuous Fiber Reinforced Resin Composite Material]

The application of the continuous fiber reinforced resin composite material having at least one selected from the group consisting of the characteristics (II), (III), (IV), and (V) above is exemplified by those mentioned above, and ones similar to those described above are preferred.

[Molding of Composite Material]

The continuous fiber reinforced resin composite material having at least one selected from the group consisting of the characteristics (II), (III), (IV), and (V) above can be further molded. Examples include the methods mentioned above.

Examples

Hereinafter, the present disclosure will be specifically described with reference to examples and comparative examples. The present disclosure, however, is not limited to these examples, and it is needless to say that the present disclosure can be practices in a wide variety of modifications without departing from the scope of the gist of the present disclosure.

[Interfacial Amount]

The interfacial amount ($m^{-1}$) of a continuous fiber reinforced resin composite material was determined by the following formula.

$$(\text{Interfacial amount } (m^{-1})) = (\text{volume of reinforcing fibers in the continous fiber reinforced resin composite material } (m^3)) \times (\text{density of the reinforcing fibers } (g/m^3)) \times (\text{number of single yarns of the reinforcing fibers}) \times (\text{diameter of the reinforcing fibers } (m)) \times \pi / (\text{fiber fineness of the reinforcing fibers } (g/m)) / (\text{volume of the continuous fiber reinforced resin composite material } (m^3))$$

[Tensile Strength and Tensile Strength Retention Ratio]

Strip-shaped test specimens in a length of 70 mm, a width of 10 mm, and a thickness of 2 mm were cut from a continuous fiber reinforced resin composite material and dried in a vacuum dryer at 80° C. for 18 hours or longer. A test specimen was then chucked in the longitudinal direction at intervals of 30 mm using Instron universal testing machine, and the tensile strength (MPa) was measured at a speed of 5 mm/min in each of an environment of 23° C. and 50% RH and an environment of 80° C. and 50% RH, and the average value of 5 samples was obtained.

The tensile strength retention ratio (%) at 80° C. was determined by the following formula.

$$\text{Tensile strength retention ration at } 80^\circ\text{ C.} = (\text{tensile strength at } 80^\circ\text{ C. and } 50\%\ RH/\text{tensile strength at } 23^\circ\text{ C. and } 50\%\ RH)\times 100$$

[Bending Strength, Bending Elastic Modulus, Bending Strength Retention Ratio, and Bending Elastic Modulus Retention Ratio]

Strip-shaped test specimens having a length of 100 mm, a width of 10 mm, and a thickness of 2 mm were cut from a continuous fiber reinforced resin composite material and dried in a vacuum dryer at 80° C. for 18 hours or longer. The bending strength (MPa) and the bending elastic modulus (GPa) were then measured using Instron universal testing machine using a three-point bending jig, with a span interval set to the thickness×16 (mm) at a speed of 1 mm/min, in each of an environment of 23° C. and 50% RH and an environment of 80° C. and 50% RH, and the average value of 5 samples were obtained.

The bending strength retention ratio (%) and the bending elastic modulus retention ratio (%) at 80° C. were determined by the following formulae.

$$\text{Bending elastic strength rentention ratio at } 80^\circ\text{ C.} = (\text{bending elastic strength at } 80^\circ\text{ C. and } 50\%\ RH/\text{bending elastic strength at } 23^\circ\text{ C. and } 50\%\ RH)\times 100$$

$$\text{Bending elastic modulus retention ratio at } 80^\circ\text{ C.} = (\text{bending elastic strength at } 80^\circ\text{ C. and } 50\%\ RH/\text{bending elastic strength at } 23^\circ\text{ C. and } 50\%\ RH)\times 100$$

[Water Absorption Characteristics]

Strip-shaped test specimens having a length of 100 mm, a width of 10 mm, and a thickness of 2 mm were cut out from a continuous fiber reinforced resin composite material, immersed in a constant temperature water bath at 80° C. for 18 hours, and then allowed to stand for 150 hours or longer in a constant temperature and constant humidity chamber at 80° C. and 57% RH to adjust the humidity until the mass became a constant value to thereby provide test specimens upon water absorption. The tensile strength (MPa), the bending strength (MPa), and the bending elastic modulus (GPa) of a test specimen in dried state and upon water absorption were measured in an environment of 23° C. and 50% RH by the method described above.

The tensile strength retention ratio (%), the bending strength retention ratio (%), and the bending elastic modulus retention ratio (%) upon water absorption were determined by the following formulae.

$$\text{Tensile strength retention ratio upon water absorption} = (\text{tensile strength upon water absorption/tensile strength in dried state})\times 100$$

$$\text{Bending strength retention ratio upon water absorption} = (\text{bending strength upon water absorption/bending strength in dried state})\times 100$$

$$\text{Bending elastic modulus retention ratio upon water absorption} = (\text{bending elastic modulus upon water absorption/bending elastic modulus in dried state})\times 100$$

[Impact Strength]

Specimens having a length of 60 mm, a width of 60 mm, and a thickness of 2 mm were cut out from a continuous fiber reinforced resin composite material, and tested with a high-speed impact tester (Shimadzu HYDRO SHOT HITS-P10, Shimadzu Corporation) in accordance with JIS K7211-2; 2006 with a striker diameter of 20 mm #, a receptacle diameter of 40 mm #, a test speed of 4.4 m/sec, a test temperature of 23° C., and a sample number n=5. The displacement was plotted against the test force, and the maximum impact strength (kN) determined from the plot was divided by the thickness of the specimen, and the average (kN/mm) of 5 samples was determined.

[Acoustic Emission Measurement]

An acoustic emission measurement system (USB AE NODE AE Measurement System 1 ch, manufactured by PAC Co., Ltd.) was used. An acoustic emission sensor (R6a) was attached and fixed with a vinyl tape at the top center of the three-point bending jig of the above bending strength test, having silicone grease (Shin-Etsu Silicone HIVAC-G, manufactured by Shin-Etsu Chemical Co., Ltd.) interposed therebetween. Acoustic emission signals were acquired simultaneously when a bending test was started under an environment of 23° C. and 50% RH. The test was stopped when 80% of the maximum load was reached after the test specimen was destroyed.

The number of acoustic emission signals having an amplitude of 40 dB or more and a duration of 3500 μseconds or shorter was counted as Count 1, and the number of acoustic emission signals having an amplitude of 25 to 30 dB and a duration of 1000 μseconds or shorter was counted as Count 2. The AE count A and AE Count B were calculated using the following formulae.

$$(AE\text{ count }A) = (\text{number of } AE \text{ signals having an amplitude of 40 dB or more and a duration of 3500 μseconds or shorter})/(\text{total number of the } AE \text{ signals}).$$

$$(AE\text{ count }B) = (\text{number of } AE \text{ signals having an amplitude of 25 dB to 30 dB and a duration of 3500 μseconds or shorter})/(\text{total number of the } AE \text{ signals}).$$

Measurements were carried out with N=5, and the average value was used as each value.

[Vibration Fatigue Test]

ASTM-D1822 tensile impact dumbbell Type S specimens were prepared from a continuous fiber reinforced resin composite material and were tested with EHF-EB50 kN-40L (RV) (Shimadzu Corporation) at a test temperature of 23° C., a frequency of 20 Hz, with a waveform of sine wave, and a chuck interval of 35 mm. The specimen was rated as "○ (good)" when the number of fractures in the vibration fatigue test at 250 MPa was 20,000 times or more, or rated as "x (poor)" when the number of fractures was less than 20,000 times.

[Degree of Crystallinity]

A differential scanning calorimeter (DSC-60 manufactured by Shimadzu Corporation) was used, with a sample volume of approximately 5 mg of the resin contained in the continuous fiber reinforced resin composite material. The degree of crystallinity (%) was obtained from the value determined by dividing the melting calorie measured when the sample was heated from room temperature (25° C.) to a temperature of the expected melting point or higher under the conditions of a flow rate of 30 mL/min of the atmospheric gas and a temperature rise of 10° C./min, by the complete melting calorie. The complete melting calorie used was 188 J/g.

[μ Droplet Contact Angle and Interfacial Shear Strength]

A thermoplastic resin was set in the heating furnace section of a composite material interface characteristic evaluation apparatus (HM410, manufactured by TOUEI-SANGYO Inc.). The furnace temperature was set to the melting point of the thermoplastic resin+15° C., and the resin was applied to a single yarn of continuous reinforced fibers to produce a μ droplet. The produced μ droplet had an ellipsoidal sphere shape centering around the reinforcing fiber and was elongated in the direction of the length of the reinforcing fiber. After being cooled to room temperature, the contact angle between the continuous reinforcing fiber and the μ droplet of the thermoplastic resin (see α in FIG. 1) was measured, and the μ droplet contact angle (°) was determined based on the median contact angle determined from 100μ droplets with a length L of 95 to 105 μm in the fiber axial direction of the continuous reinforcing fiber.

After the diameter d (μm) of the continuous reinforcing fiber and the length L (μm) of the μ droplet in the fiber axial direction of the continuous reinforcing fiber were measured, a shear test of a 95- to 105-μm μ droplet was conducted and the shear load F (N) when the resin ball was scraped off by a blade was measured, and the interfacial shear strength T (MPa) was obtained from the following formula (1). The number of measurements was 100, and the median of those 100 measurements was determined.

$$\tau = F/\pi dL \qquad (1)$$

Measurements were made on continuous reinforcing fibers with a surface treatment agent used in each of Examples, surface treatment agent-free glass fibers which were prepared by treating glass fibers used in each of Examples in an electric furnace at 650° C. for 3 hours, and coupling agent-treated continuous reinforcing fibers which were prepared by treating the surface treatment agent-free glass fibers with a surface treatment agent prepared from γ-aminopropyltriethoxysilane (KBE-903, manufactured by Shin-Etsu Chemical Co., Ltd.) by adjusting to 0.5 mass % with deionized water. The interfacial strength ratio and the contact angle ratio were determined.

$$\text{(Interfacial strength ratio)} = \text{(interfacial strength measured using countinous reinforcing fibers with surface treatment agent)}/\text{(interfacial strength measured using compling agent-treated reinforcing fibers)}$$

$$\text{(Contact angle ratio)} = \text{(contact angle measured using countinous reinforcing fibers with surface treatment agent)}/\text{(contact angle measured using compling agent-free glass fibers)}$$

[Physical Property Stability]

A bending strength test was conducted on 50 test specimens to measure the bending strengths. The variation coefficient was calculated according to the following formula and used as the deviation, where A is the average value of the bending strengths, Ai is the bending strength of the i$^{th}$ measurement (i=1 to 50).

$$\text{variation coefficient} = \frac{\sqrt{\frac{1}{50}\sum_{i=1}^{50}(Ai - A)^2}}{A} \qquad \text{[Math. 2]}$$

[Warping Characteristic]

A dial gauge was fixed to an arm. A plate of the continuous fiber reinforced resin composite material obtained in each of Examples was scanned, and the difference between the maximum value and minimum value was read.

[Shape Conformability]

A test specimen of 150 mm×150 mm was cut from the continuous fiber reinforced resin composite material obtained in each of Examples using a band saw, heated with an infrared heater (INFRASTEIN H7GS-71298NGK, NGK INSULATORS, LTD., a wavelength of 3 to 7 μm) to the melting temperature of the resin used in each of Examples+25° C., placed in a mold heated to 180° C. with a flat section of 100 mm×100 mm, a wall section of 25 mm×100, and R of the wall of 10°, and pressed at a pressure of 10 MPa. The maximum gap between the wall of the resulting box-shaped molded article and the mold was rated as "○" (excellent) when the gap was 0 mm or more and less than 1 mm, "Δ" (good) when the gap was 1 mm or more and less than 3 mm, and "x" (poor) when the gap was 3 mm or more.

[Measurement of SP Value]

A determinations were made using following formula from the structures of the resin and the binding agent component for the continuous reinforcing fiber used in each of Examples. The values obtained by the Fedors method were used as the values of the evaporation energy and the molar volume. When more than one components were contained, a calculation was made by multiplying the values obtained by the mass ratio of each component and the corresponding SP value and summing the products.

$$(SP\text{ value}) = \{(\text{sum of evaporation energies of atoms or atomic groups contained in each component})/(\text{molar volume of atoms or atomic groups contained in each component})\}\hat{}(1/2)$$

The materials used in the examples and comparative examples are as follows.

[Continuous Reinforcing Fibers]

(Glass Fibers)

Glass fibers 1: Glass fibers were produced in which 0.45 mass % of a bundling agent was attached to 100% of glass fibers with a fiber fineness of 1.15 g/m and a single yarn count of 1,500. The winding configuration was DWR and the average single yarn diameter was about 17 μm. The above bundling agent was prepared so as to contain 0.5 mass % of γ-aminopropyltriethoxysilane (KBE-903, manufactured by Shin-Etsu Chemical Co., Ltd.) as a coupling agent, 1 mass % of carnauba wax as a lubricant, 2 mass % of a polyurethane resin (Y65-5, manufactured by ADEKA CORPORATION) as a binding agent, 3 mass % of a copolymerized compound (copolymerized compound which was obtained by copolymerizing 40 of mass % of maleic anhydride, 50% of methyl acrylate, and 10% of methyl methacrylate, and had a weight average molecular weight of 20,000) by adjusting with deionized water. The SP value of the binding agent was 14.0.

Glass fiber 2: Glass fibers were produced in which 0.45 mass % of a bundling agent was attached to 100% of glass fibers with a fiber fineness of 1.15 g/m and a single yarn count of 1,500. The winding configuration was DWR and the average single yarn diameter was about 17 μm. The above bundling agent was prepared so as to contain 0.5 mass % of γ-aminopropyltriethoxysilane (KBE-903, manufactured by Shin-Etsu Chemical Co., Ltd.) as a coupling agent, 0.5 mass % of carnauba wax as a lubricant, 1.8 mass % of a polyurethane resin (Y65-55, ADEKA CORPORATION) as a binding agent, and 5.7 mass % of a copolymerized compound (copolymerized compound which was obtained by copolymerizing 51 mass % of maleic anhydride, 39 mass % of methyl acrylate, and 10 mass % of methyl methacrylate, and had a weight average molecular weight of 20,000), by adjusting with deionized water. The SP value of the binding agent was 15.5.

Glass fiber 3: Glass fibers were produced in which 0.45 mass % of a bundling agent was attached to 100% of glass fibers with a fiber fineness of 1.15 g/m and a single yarn count of 1,500. The winding configuration was DWR and the average single yarn diameter was about 17 μm. The above bundling agent was prepared so as to contain 0.5 mass % of γ-aminopropyltriethoxysilane (KBE-903, manufactured by Shin-Etsu Chemical Co., Ltd.) as a coupling agent, 0.5 mass % of carnauba wax as a lubricant, 4 mass % of a maleic anhydride modified polypropylene resin as a binding agent, and 1.4 mass % of a copolymerized compound (copolymerized compound which was obtained by copolymerizing 71 of mass % of methyl acrylate and 29 of mass % of methyl methacrylate, and had a weight average molecular weight of 20,000) by adjusting with deionized water. The SP value of the binding agent was 11.1.

(Carbon Fibers)

Carbon fibers were produced in which 0.45 mass % of the bundling agent was attached to 100% mass of carbon fibers with a single yarn count of 12,000, a diameter of 9 μm, and a fiber fineness of 2.58 g/m. The above bundling agent was prepared so as to contain 1 mass % of carnauba wax, 2 mass % of a polyurethane resin (Y65-55, manufactured by ADEKA CORPORATION), 3 mass % of a copolymerized compound (copolymerized compound which was obtained by copolymerizing 40 mass % of maleic anhydride, 50 mass % of methyl acrylate, and 10 mass % of methyl methacrylate, and had a weight average molecular weight of 20,000) by adjusting with deionized water. The SP value of the binding agent was 14.0.

[Preparation of Continuous Reinforcing Fiber Base Material]

Glass cloth 1 and glass cloth 2: glass cloths were produced by weaving the above glass fibers 1 as warps and wefts using a repia loom (weave width: 1 m). The produced glass cloths were as follows: glass cloth 1 (plain weave, and had a weave density of 6.5/25 mm, and a basis weight of 640 g/m$^2$) and glass cloth 2 (plain weave, and had a weave density of 6.5/25 mm, and a basis weight of 660 g/m$^2$).

Glass cloth 3: A glass cloth was produced by weaving the above glass fibers 2 as warps and wefts using a repia loom (weave width: 1 m). The produced glass cloth was glass cloth 3 (plain weave, and had a weave density of 6.5/25 mm and a basis weight of 640 g/m$^2$).

Glass cloth 4: A glass cloth was produced by weaving the above glass fibers 3 as warps and wefts. The produced glass cloth was glass cloth 4 (plain weave, and had a weave density of 6.5/25 mm and a basis weight of 640 g/m$^2$).

Carbon fiber cloth: A carbon fiber cloth was produced by weaving the above carbon fibers as warps and wefts using a repia loom (weave width: 1 m). The produced carbon fiber cloth was plain weave, and had a weave density of 6.5/25 mm and a basis weight of 425 g/m$^2$.

[Thermoplastic Resin]

Resin 1: PA66 (carboxyl end group amount: 70 μmol/g, amino end group concentration: 30 μmol/g, peak temperature of tan δ: 50° C., SP value: 12.4, and melting point: 265° C.)

Resin 2: Dry blend of Resin 1 and PA6I (PA66:PA6I=2:1) (carboxyl end group concentration: 120 μmol/g, amino end group concentration: 40 μmol/g, peak temperature of tan δ: 110° C., SP value: 12.6, and melting point: 260° C.)

Resin 3: Polypropylene (end group concentration 0 μmol/g, peak temperature of tan δ: 0° C., SP value: 8.4, and melting point: 180° C.)

Resin 4: Maleic acid modified polypropylene (end group concentration: 21 μmol/g, peak temperature of tan δ: 0° C., SP value: 10.1, and melting point: 180° C.)

Resin 5: PA6 (carboxyl end group concentration: 60 μmol/g, amino end group concentration: 30 μmol/g, peak temperature of tan δ: 50° C., SP value: 12.3, and melting point: 225° C.)

Resin 6: PA6I (carboxyl end group concentration: 200 μmol/g, amino end group concentration: 60 μmol/g, peak temperature of tan δ: 130° C., SP value: 12.9, and glass transition temperature: 135° C.)

Resin 7: PPS (Toray Industries, Inc.) (peak temperature of tan δ: 90° C., SP value: 11.7, and melting point: 280° C.)

Resin 8: PA610 (carboxyl end group amount: 70 μmol/g, amino end group concentration: 30 μmol/g, peak temperature of tan δ: 50° C., SP value: 11.5, and melting point: 222° C.)

Resin 9: Dry blend of Resin 3 and Resin 4 (Resin 3:Resin 4=90:10) (end group concentration: 2 μmol/g, peak temperature of tan δ: 0° C., SP value: 8.6, and melting point: 180° C.)

Resin 10: PA12 (carboxyl end group amount: 60 μmol/g, amino end group concentration: 60 μmol/g, peak temperature of tan δ: 50° C., SP value: 10.5, and melting point: 179° C.)

(End Group Concentration of Thermoplastic Resin)

The end group concentration of each thermoplastic resin was determined using $^1$H-NMR under the following conditions.

Measurement Conditions of H-NMR

Apparatus: JEOL-ECA500 (JEOL Corporation)
Observation nucleus: $^1$H
Observation frequency: 500 MHz
Measurement method: Single-Plus
Pulse width: 300
Waiting time: 10 sec
Accumulation count: 256 times
Solvent: $D_2SO_4$
Concentration of sample: 1.25 mass %

[Production of Thermoplastic Resin Film]

Thermoplastic resin films were produced by performing molding using a T-die extrusion molding machine (manufactured by SOUKEN CO. LTD.). The thickness of the thermoplastic resins was 200 μm.

[Preparation of Hybrid Shaped Article]

The continuous fiber reinforced resin composite material obtained in each of Examples was cut into a rectangular piece of 200×300 mm, which was press-injection hybrid molded with the resin used in each of Examples to obtain a box-shaped continuous fiber reinforced resin composite material shaped article with short side length of 192 mm and a long side length of 292 mm, having standing walls with a height of 4 mm made of polypropylene A on each side and a cross-shaped rib in the direction parallel to the long sides so as to connect half positions of the short sides and half positions of the long side.

In the molding of the hybrid shaped article, the resin of each of Examples was heated to the melting point (or the glass transition temperature for resins without a melting point)+35° C. with an infrared heater (INFRASTEIN H7GS-71298NGK, NGK INSULATORS, LTD., a wavelength of 3 to 7 μm), and the continuous fiber reinforced resin composite material preheated for 60 seconds was inserted into a mold maintained at 150° C. and was pressed at a press pressure of 10 MPa, followed by injection molding at an injection pressure of 120 MPa and an injection temperature of the melting point of the resin in each of Examples (or the glass transition temperature for resins without a melting point)+35° C.

Example 1

Thermoplastic resin films 1 were obtained by using Resin 1 by the method described above.

Five glass cloths 1 and six thermoplastic resin films 1 were prepared, and molded by alternately overlapping the glass cloths 1 and the thermoplastic resin films 1 one another so that the thermoplastic resin films 1 were disposed on the surfaces, thereby obtaining a continuous fiber reinforced resin composite material. At this time, the ratio of the charged volume of the thermoplastic resin was 50%.

A double belt press machine was used as a molding machine. The above glass cloths 1 and the above thermoplastic resin films 1 were overlapped one another as described above in the molding machine, and compressed at a heating rate of 280° C./min, a pressure of 3 MPa, and a belt speed of 0.5 m/min, followed by cooling compression at 3 MPa for 3 minutes with a cooling rate of 80° C./min.

A hybrid shaped article was made by the method described above from the obtained continuous fiber reinforced resin composite material, from which a piece of a length of 100 mm and a width of 10 mm was cut out. The rib was removed so as not to damage the continuous fiber reinforced resin composite material part with abrasive paper, and an acoustic emission measurement was conducted by the method described above.

The physical properties of the resultant continuous fiber reinforced resin composite material are summarized in Table 1.

Example 2

A continuous fiber reinforced resin composite material was obtained in the manner similar to Example 1 except that Resin 2 was used as the thermoplastic resin.

The physical properties of the resultant continuous fiber reinforced resin composite material are summarized in Table 1.

Example 3

A continuous fiber reinforced resin composite material was obtained in the manner similar to Example 1 except that Resin 9 was used as the thermoplastic resin and glass cloths 4 were used as the glass cloths.

The physical properties of the resultant continuous fiber reinforced resin composite material are summarized in Table 1.

Example 4

A continuous fiber reinforced resin composite material was obtained in the manner similar to Example 2 except that carbon fiber cloths were used as the continuous reinforcing fiber base material. Note that the ratio of the charged volume of the thermoplastic resin was 50%.

The physical properties of the resultant continuous fiber reinforced resin composite material are summarized in Table 1.

Example 5

A continuous fiber reinforced resin composite material was obtained in the manner similar to Example 1 except that glass cloths 2 were used as the continuous reinforcing fiber base material. Note that the ratio of the charged volume of the thermoplastic resin was 50%.

The physical properties of the resultant continuous fiber reinforced resin composite material are summarized in Table 1.

Example 6

A continuous fiber reinforced resin composite material was obtained in the manner similar to Example 1 except that Resin 4 is used as the thermoplastic resin and glass cloths 4 were used as the glass cloths.

The physical properties of the resultant continuous fiber reinforced resin composite material are summarized in Table 1.

Example 7

A continuous fiber reinforced resin composite material was obtained in the manner similar to Example 1 except that Resin 5 was used as the thermoplastic resin.

The physical properties of the resultant continuous fiber reinforced resin composite material are summarized in Table 1.

Example 8

A continuous fiber reinforced resin composite material was obtained in the manner similar to Example 1 except that Resin 6 was used as the thermoplastic resin.

The physical properties of the resultant continuous fiber reinforced resin composite material are summarized in Table 1.

Example 9

A glass cloth with a plain weave, a weave density of 6.5/25 mm, and a basis weight of 640 g/m$^2$ was produced using glass fibers by attaching a mixture of 0.3 mass % of 3-glycidoxypropyltrimethoxysilane (KBM-402, manufactured by Shin-Etsu Chemical Co., Ltd.), 1.5 mass % of an epoxy resin emulsion, and 0.2 mass % of carnauba wax as a bundling agent to the above glass fibers 1 (100 mass %). Five sheets of the glass cloth were laminated and placed in a mold, into which a mixed resin of 16 g of a bisphenol A type liquid epoxy resin (jER828, Mitsubishi Chemical Corporation) and 1.6 g of bisphenol A (4,4'-(propane-2,2-diyl) diphenol) was charged. Compression molded was carried out for 3 days with the temperature of the molding machine set to 40° C. and a mold clamping force of 5 MPa, and cooling was then carried out for 8 minutes at a cooling rate of 80° C./min and a clamping force of 5 MPa to obtain a continuous fiber reinforced resin composite material. Note that the ratio of the charged volume of the thermoplastic resin was 50%.

The physical properties of the resultant continuous fiber reinforced resin composite material are summarized in Table 1.

Example 10

A continuous fiber reinforced resin composite material was obtained in the manner similar to Example 1 except that Resin 7 was used as the thermoplastic resin.

The physical properties of the resultant continuous fiber reinforced resin composite material are summarized in Table 1.

Example 11

A continuous fiber reinforced resin composite material was obtained in the manner similar to Example 1 except that Resin 2 was used as the thermoplastic resin and glass fibers 1 which were aligned so as to have a basis weight of 640 g/m$^2$ were used as the continuous reinforcing fiber base material. Note that the ratio of the charged volume of the thermoplastic resin was 50%.

The physical properties of the resultant continuous fiber reinforced resin composite material are summarized in Table 1.

Example 12

A continuous fiber reinforced resin composite material was obtained in the manner similar to Example 1 except that glass cloths 3 were used as the glass cloths.

The physical properties of the resultant continuous fiber reinforced resin composite material are summarized in Table 1.

Example 13

A continuous fiber reinforced resin composite material was obtained in the manner similar to Example 1 except that Resin 8 was used as the thermoplastic resin.

The physical properties of the resultant continuous fiber reinforced resin composite material are summarized in Table 1.

Example 14

A continuous fiber reinforced resin composite material was obtained in the manner similar to Example 1 except that Resin 10 was used as the thermoplastic resin.

The physical properties of the resultant continuous fiber reinforced resin composite material are summarized in Table 1.

Comparative Example 1

A continuous fiber reinforced resin composite material was obtained in the manner similar to Example 1 except that glass fibers to which a mixture of 0.3 mass % of 3-glycidoxypropyltrimethoxysilane (KBM-402, manufactured by Shin-Etsu Chemical Co., Ltd.), 1.5 mass % of an epoxy resin emulsion, and 0.2 mass % of carnauba wax as a bundling agent was attached to the above glass fibers 1 (100 mass %) were used, and glass cloths with a plain weave, a weave density of 6.5/25 mm, and a basis weight of 600 g/m$^2$ were produced and used. Note that the ratio of the charged volume of the thermoplastic resin was 50%.

The physical properties of the resultant continuous fiber reinforced resin composite material are summarized in Table 1.

Comparative Example 2

Evaluations similar to those in Example 1 was performed using "Tepex dynalite 101" which was manufactured by Bond Laminate and in which glass cloth was impregnated with polyamide 66.

The physical properties of the resultant continuous fiber reinforced resin composite material are summarized in Table 1.

Comparative Example 3

A continuous fiber reinforced resin composite material was obtained in the manner similar to Example 1 except that Resin 3 was used as the thermoplastic resin and glass cloths 3 were used as the glass cloths.

The physical properties of the resultant continuous fiber reinforced resin composite material are summarized in Table 1.

TABLE 1

| | | Example 1 | Example 2 | Example 3 | Example 4 | Example 5 | Example 6 |
|---|---|---|---|---|---|---|---|
| Count 1 | — | 282 | 662 | 6238 | 821 | 263 | 7925 |
| Count 2 | — | 730 | 2265 | 2076 | 1370 | 761 | 1860 |
| Total number of AE signals | — | 2827 | 9471 | 22859 | 4293 | 2923 | 27318 |
| AE count A (count 1/total number of AE signals) | — | 0.100 | 0.070 | 0.273 | 0.191 | 0.090 | 0.290 |
| AE count B (count 2/total number of AE signals) | — | 0.2582 | 0.2392 | 0.0908 | 0.3191 | 0.2603 | 0.0681 |
| Interfacial amount | $m^{-1}$ | 130201 | 130201 | 118364 | 130127 | 130201 | 125466 |
| Tensile strength | MPa | 560 | 603 | 442 | 880 | 569 | 520 |
| Degree of crystallinity | % | 36 | 28 | 40 | 35 | 36 | 20 |
| Bending strength | MPa | 810 | 868 | 639 | 900 | 830 | 749 |
| Bending elastic modulus | GPa | 25 | 28 | 23 | 52 | 26 | 23 |
| Differences in SP values | — | 1.6 | 1.4 | 2.5 | 1.4 | 1.6 | 1.0 |
| Interfacial strength ratio | — | 1.09 | 1.04 | 1.17 | 0.89 | 1.09 | 0.84 |
| Contact angle ratio | — | 0.54 | 0.57 | 0.48 | 0.56 | 0.53 | 0.42 |
| Tensile strength retention at 80° C. | % | 92 | 98 | 70 | 95 | 94 | 78 |
| Bending strength retention ratio at 80° C. | % | 69 | 80 | 53 | 73 | 73 | 61 |
| Bending elastic modulus retention at 80° C. | % | 82 | 94 | 55 | 87 | 85 | 69 |
| Tensile strength retention ratio upon water absorption | % | 78 | 98 | 82 | 90 | 78 | 87 |
| Retention of bending strength upon water absorption | % | 78 | 92 | 82 | 88 | 78 | 87 |
| Bending elastic modulus retention ratio upon water absorp | % | 79 | 92 | 82 | 88 | 79 | 87 |
| Impact strength | kN/mm | 4 | 6 | 9 | 2 | 5 | 10 |
| Vibration fatigue resistance characteristic | — | ○ | ○ | ○ | ○ | ○ | ○ |
| Physical property stability (coefficient of variation) | — | 0.052 | 0.049 | 0.071 | 0.059 | 0.048 | 0.061 |
| Warping characteristic | — | <0.1 | <0.1 | <0.1 | <0.1 | 0.1 | 0.3 |
| Shape conformability | — | ○ | ○ | ○ | ○ | ○ | ○ |
| Count 1 of hybrid shaped article | — | 280 | 658 | 6201 | 815 | 264 | 7894 |
| Count 2 of hybrid shaped article | — | 724 | 2284 | 2043 | 1408 | 764 | 1875 |
| Total AE count of hybrid molded body | — | 2824 | 9470 | 22854 | 4401 | 2857 | 27350 |
| AE Count A of hybrid molded body | — | 0.099 | 0.069 | 0.271 | 0.185 | 0.092 | 0.289 |
| AE count B of hybrid molded body | — | 0.256 | 0.241 | 0.089 | 0.320 | 0.267 | 0.069 |

| | | Example 7 | Example 8 | Example 9 | Example 10 | Example 11 | Example 12 |
|---|---|---|---|---|---|---|---|
| Count 1 | — | 541 | 750 | 4238 | 683 | 181 | 492 |
| Count 2 | — | 469 | 1792 | 497 | 1942 | 765 | 479 |
| Total number of AE signals | — | 2609 | 5269 | 18366 | 8929 | 4334 | 2511 |
| AE count A (count 1/total number of AE signals) | — | 0.207 | 0.142 | 0.231 | 0.076 | 0.042 | 0.196 |
| AE count B (count 2/total number of AE signals) | — | 0.1798 | 0.3401 | 0.0271 | 0.2175 | 0.1765 | 0.1909 |
| Interfacial amount | $m^{-1}$ | 130201 | 130201 | 130201 | 130201 | 130201 | 130201 |
| Tensile strength | MPa | 510 | 620 | 440 | 510 | 1112 | 520 |
| Degree of crystallinity | % | 37 | 0 | 20 | 23 | 28 | 34 |
| Bending strength | MPa | 742 | 874 | 700 | 730 | 1600 | 785 |
| Bending elastic modulus | GPa | 24 | 25 | 24 | 24 | 50 | 25 |
| Differences in SP values | — | 1.7 | 1.1 | 3.7 | 2.3 | 1.4 | 3.1 |
| Interfacial strength ratio | — | 1.11 | 1.02 | 1.15 | 1.15 | 1.09 | 1.17 |
| Contact angle ratio | — | 0.55 | 0.57 | 0.67 | 0.58 | 0.61 | 0.66 |
| Tensile strength retention at 80° C. | % | 93 | 97 | 83 | 90 | 96 | 90 |
| Bending strength retention ratio at 80° C. | % | 71 | 83 | 65 | 79 | 80 | 71 |
| Bending elastic modulus retention at 80° C. | % | 84 | 94 | 81 | 89 | 93 | 80 |
| Tensile strength retention ratio upon water absorption | % | 75 | 95 | 78 | 80 | 98 | 77 |
| Retention of bending strength upon water absorption | % | 64 | 90 | 70 | 85 | 92 | 72 |
| Bending elastic modulus retention ratio upon water absorp | % | 90 | 90 | 80 | 88 | 92 | 79 |
| Impact strength | kN/mm | 5 | 6 | 4 | 5 | 5 | 4 |
| Vibration fatigue resistance characteristic | — | ○ | ○ | ○ | ○ | ○ | ○ |
| Physical property stability (coefficient of variation) | — | 0.052 | 0.047 | 0.053 | 0.059 | 0.051 | 0.063 |
| Warping characteristic | — | <0.1 | <0.1 | 0.4 | 0.2 | <0.1 | 0.2 |
| Shape conformability | — | ○ | ○ | ○ | ○ | ○ | ○ |
| Count 1 of hybrid shaped article | — | 552 | 761 | 4204 | 697 | 184 | 495 |
| Count 2 of hybrid shaped article | — | 468 | 1799 | 494 | 1947 | 751 | 470 |
| Total AE count of hybrid molded body | — | 2618 | 5224 | 18355 | 8946 | 4641 | 2570 |
| AE Count A of hybrid molded body | — | 0.211 | 0.146 | 0.229 | 0.078 | 0.040 | 0.193 |
| AE count B of hybrid molded body | — | 0.179 | 0.344 | 0.027 | 0.218 | 0.162 | 0.183 |

| | | Example 13 | Example 14 | Comp. Example 1 | Comp. Example 2 | Comp. Example 3 |
|---|---|---|---|---|---|---|
| Count 1 | — | 437 | 609 | 781 | 585 | 618 |
| Count 2 | — | 309 | 294 | 178 | 16 | 186 |
| Total number of AE signals | — | 2011 | 2178 | 2166 | 670 | 1824 |
| AE count A (count 1/total number of AE signals) | — | 0.217 | 0.280 | 0.361 | 0.874 | 0.339 |
| AE count B (count 2/total number of AE signals) | — | 0.1537 | 0.1350 | 0.0821 | 0.0241 | 0.1020 |
| Interfacial amount | $m^{-1}$ | 130201 | 130201 | 130201 | 91000 | 130201 |
| Tensile strength | MPa | 53C | 480 | 277 | 472 | 214 |
| Degree of crystallinity | % | 22 | 23 | 5 | 43 | 37 |

TABLE 1-continued

| | Example 1 | Example 2 | Example 3 | Example 4 | Example 5 | Example 6 |
|---|---|---|---|---|---|---|
| Bending strength | MPa | 804 | 649 | 400 | 600 | 395 |
| Bending elastic modulus | GPa | 24 | 21 | 18 | 20 | 14 |
| Differences in SP values | — | 2.5 | 3.5 | 9.2 | — | 7.1 |
| Interfacial strength ratio | — | 1.14 | 1.19 | 0.72 | — | 0.67 |
| Contact angle ratio | — | 0.58 | 0.41 | 0.84 | — | 1.15 |
| Tensile strength retention at 80° C. | % | 91 | 58 | 55 | 70 | 49 |
| Bending strength retention ratio at 80° C. | % | 70 | 58 | 42 | 51 | 7 |
| Bending elastic modulus retention at 80° C. | % | 82 | 52 | 50 | 68 | 44 |
| Tensile strength retention ratio upon water absorption | % | 89 | 92 | 68 | 70 | 69 |
| Retention of bending strength upon water absorption | % | 90 | 92 | 52 | 51 | 58 |
| Bending elastic modulus retention ratio upon water absorp | % | 86 | 88 | 65 | 68 | 60 |
| Impact strength | kN/mm | 4 | 3 | 3 | 3 | 4 |
| Vibration fatigue resistance characteristic | — | ○ | ○ | X | X | X |
| Physical property stability (coefficient of variation) | — | 0.055 | 0.049 | 0.096 | 0.097 | 0.12 |
| Warping characteristic | — | <0.1 | 0.1 | 0.9 | 0.8 | 1.1 |
| Shape conformability | — | ○ | ○ | X | X | X |
| Count 1 of hybrid shaped article | — | 424 | 615 | 795 | 589 | 634 |
| Count 2 of hybrid shaped article | — | 309 | 293 | 171 | 16 | 178 |
| Total AE count of hybrid molded body | — | 2035 | 2184 | 2154 | 678 | 1804 |
| AE Count A of hybrid molded body | — | 0.208 | 0.282 | 0.369 | 0.869 | 0.351 |
| AE count B of hybrid molded body | — | 0.152 | 0.134 | 0.079 | 0.024 | 0.099 |

The following are examples of the continuous fiber reinforced resin composite material having the characteristic (II).

[Coverage Ratio of Interfacial Resin on Continuous Reinforcing Fibers, Exposure Degree of Interface Exposed Reinforcing Fibers, and Relative Elemental Concentration]

In a mixing rotor, 100 mg of thin slices of a continuous fiber reinforced resin composite material and 20 mL of a solvent selected according to the resin used in each of Examples were placed and stirred for 5 hours, then the solvent was removed by suction filtration, and the continuous reinforcing fibers were washed by sprinkling 40 mL of fresh solvent on the filter and air dried. The resulting continuous reinforcing fibers and 20 mL of fresh solvent were placed in a mixing rotor and stirred for 2 hours, then the solvent was removed by suction filtration, and the continuous reinforcing fibers were washed by sprinkling 40 mL of fresh solvent on the filter and dried by nitrogen blow. The resulting continuous reinforcing fibers and 20 mL of fresh solvent were placed in a mixing rotor and stirred for 2 hours, the solvent was removed by suction filtration, and the continuous reinforcing fibers were washed by sprinkling 40 mL of fresh solvent on the filter, air dried, and dried overnight in a vacuum dryer set at room temperature. The resulting continuous reinforcing fibers were pressed into a flat plate, and a small piece of 2 mm was cut out and analyzed using XPS (Versa probe II, ULVAC-Phi Inc.) with excitation source: mono. AlKα 20 kV×5 mA 100 W, analysis size: 100 μm×1.4 mm, photoelectron extraction angle: 45°, acquisition area (Survey scan): 117.4 eV, (Narrow scan): C1s, O1s, N1s, Si2p, Ca2p, and Al2p, Pass Energy (Survey scan): 117.4 eV, (Narrow scan): 46.95 eV to determine the relative elemental concentrations of carbon, oxygen, nitrogen, silicon, aluminum, and calcium.

The coverage ratio of the interfacial resin on the continuous reinforcing fibers was determined by the following equation (1) in the cases where polyamide was used as the resin and glass fibers were used as the continuous reinforcing fibers, by the following equation (2) in the cases where polyamide was used as the resin and carbon fibers were used as the continuous reinforcing fibers, and by equation (3) in the cases where polypropylene was used as the resin and glass fibers were used as the continuous reinforcing fibers. The details of the parameters in the formula are as described above.

$$(\text{Coverage ratio}) = [N]/([N]+[Si]) \quad (1)$$

$$(\text{Coverage ratio}) = [N]/([N]+[O]) \quad (2)$$

$$(\text{Coverage ratio}) = ([C]-[C0])/([C]-[C0]+[Si])$$

The exposure degree of interface exposed reinforcing fibers was determined by the following equation (4) in the cases were glass fibers were used as continuous reinforcing fibers and by the following equation (5) in the cases where carbon fibers were used as continuous reinforcing fibers. The details of the parameters in the formula are as described above.

$$(\text{Exposure degree of interface exposed reinforcing fiber}) = [A1]/[A10] \quad (4)$$

$$(\text{Exposure degree of interface exposed reinforcing fiber}) = [O]/[O0] \quad (5)$$

[Static Wettability]

A thermoplastic resin film and a single yarn of reinforcing fiber were sandwiched between cover glasses, heated to 280° C. on a hot plate at 100° C./min, and allowed to stand for 5 minutes. The angle (contact angle) (°) between the reinforcing fiber surface and the thermoplastic resin was measured at four points by observation under an optical microscope, and the average value was obtained. A smaller value of this angle was evaluated to be a better static wettability.

[Impregnation Speed]

As a molding machine, a hydraulic molding machine (SHOJI Co., Ltd.) with a maximum mold clamping force of 50 tons was used. Five continuous reinforcing fiber fabrics and thermoplastic resin films were laminated, the laminate was placed inside a mold equipped with a temperature sensor, placed in a heat press molding machine with a mold temperature set at the melting temperature of the thermoplastic resin+65° C., and then heated and pressed at a pressure of 5 MPa while the temperature was monitored. The laminate was removed from the heating press molding machine 30 seconds after the temperature inside the mold reached the melting point of the thermoplastic resin, and transferred to a cooling press machine for cooling pressing with water cooling at a pressure of 5 MPa. The obtained continuous reinforcing fiber composite material was cut with a band saw and polished. The impregnation speed (%/min) was obtained by dividing the impregnation ratio (%) (described below) determined on the cross section by the time (minutes) during which the thermoplastic resin was maintained to be equal to or higher than the melting point during the heat press molding. In the above operation, the time during which the thermoplastic resin is maintained to be equal to or higher than the melting point was 60 seconds.

The impregnation ratio (%) was calculated by the following method. The resulting continuous fiber reinforced resin composite material was cut at an arbitrary position and was polished carefully so as not to damage the continuous reinforcing fibers. The cross section was observed under an SEM, and the obtained images were analyzed by image analysis software (product name: ImageJ) to calculate the area of the region surrounded by the outer contour line of the continuous reinforcing fibers, which was a bundle of single yarns (filaments), and the area of the voids included in the area enclosed by the outer contour line of the above continuous reinforcing fibers.

Then, a calculation was made according to the following formula.

$$\text{Impregnation ratio}\,(\%) = \left[1 - \{\text{area of voids}/(\text{area of the region enclosed by the outer countour line of continuous reinforcing fibers})\} \times 100\right.$$

In an image of a cross section obtained, the respective impregnation ratios of 10 continuous reinforcing fibers were calculated, and the average of the impregnation ratios were used as the impregnation ratio.

[Bending Fatigue Test]

ASTM-D 671 Type A test specimens were prepared from a continuous fiber reinforced resin composite material, and a vibration fatigue test was conducted using a repetitive vibration fatigue testing machine (B-70, Toyo Seiki Seisaku-sho, Ltd.) at a test temperature of 23° C. and a frequency of 20 Hz, with a sine waveform. The number of fractures of the continuous fiber reinforced resin composite material in the vibration fatigue test under a stress equivalent to 35% of the bending strength of each of the Examples was determined.

[Bending Strength at 23° C. and Bending Strength at 120° C.]

Strip-like specimens having a length of 100 mm, a width of 10 mm, and a thickness of 2 mm were cut out from each continuous fiber reinforced resin composite material. The bending strength (MPa) was measured by Instron universal testing machine using a three-point bending jig with a span distance of 32 mm at a speed of 1 mm/min in each of environments of 23° C. and an 50% RH and 120° C. and an 50% RH.

The materials used in examples of the continuous fiber reinforced resin composite material having the characteristic (II) were as follows.

[Continuous Reinforcing Fibers]

(Glass Fibers)

Glass fiber 1 (GF1): Glass fibers were produced in which 0.10 mass % of a bundling agent was attached to 100 mass % of glass fibers with a fiber fineness of 1.15 g/m and a single yarn count of 2,000. The winding configuration was DWR and the average single yarn diameter was about 18 μm. The above bundling agent was prepared so as to contain a 1.5 mass % of γ-aminopropyltriethoxysilane (KBE-903, manufactured by Shin-Etsu Chemical Co., Ltd.), 1 mass % of caranauba wax, and 3 mass % of a copolymerized compound which was obtained by copolymerizing 50 mass % of maleic anhydride and 50 mass % of methyl methacrylate and had an average molecular weight of 10,000, by adjusting with deionized water.

Glass fibers 2 (GF2): Glass fibers were produced by immersing glass fibers obtained by treating GF1 in an electric furnace at 650° C. for 3 hours in a 1.5 mass % water solution of γ-aminopropyltriethoxysilane (KBE-903, manufactured by Shin-Etsu Chemical Co., Ltd.) for 30 minutes and drying at 110° C. for 3 hours.

Glass fibers 3 (GF3): Glass fibers were produced by treating GF1 in an electric furnace at 650° C. for 3 hours to obtain GF free of a bundling agent (sizing agent).

Glass fibers 4 (GF4): Glass fibers were produced in which 0.10 mass % of a bundling agent was attached to 100 mass % of glass fibers with a fiber fineness of 1.15 g/m and a single yarn count of 2,000. The winding configuration was DWR and the average single yarn diameter was about 18 μm. The above bundling agent was prepared so as to contain 1.5 mass % of γ-aminopropyltriethoxysilane (KBE-903, manufactured by Shin-Etsu Chemical Co., Ltd.), 1 mass % of caranauba wax, and 3 mass % of a copolymerization compound which was obtained by copolymerizing 50 mass % of maleic anhydride and 50 mass % of stylene, and had a weight average molecular weight of 13,000, by adjusting with deionized water.

Glass fibers 5 (GF5): Glass fibers were produced in which a mixture of 0.3 mass % of 3-glycidoxypropyltrimethoxysilane (KBM-402, manufactured by Shin-Etsu Chemical Co., Ltd.), 1.5 mass % of an epoxy resin emulsion, and 0.2 mass % of carnauba wax as a bundling agent was attached to 100 mass % of glass fibers with a fiber fineness of 1.15 g/m and a single yarn count of 2,000.

(Carbon Fibers)

Carbon fiber 1: Carbon fibers were produced in which 0.1 mass % of a bundling agent was attached to PAN-based carbon fibers with a single yarn count of 12,000. The above bundling agent was prepared so as to contain 1.5 mass % of 1,6-hexadiamine, 1.5 mass % of azide diphenylphosphate, 1 mass % of caranauba wax, and 3 mass % a copolymerization compound which was prepared by copolymerizing 50 mass % of maleic anhydride and 50 mass % of methyl methacrylate, and had a weight average molecular weight of 10,000, by adjusting with deionized water.

Carbon fibers 2: Carbon fibers were produced by immersing PAN-based carbon fibers with a single yarn count of 12,000 in a water solution containing 1.5 mass % of 1,6-hexadiamine and 1.5 mass % of diphenylphosphoryl azide at 60° C. for 12 hours and dried at 110° C. for 6 hours.

Carbon fibers 3: PAN-based carbon fibers with a single yarn count of 12,000 (free of a bundling agent (sizing agent))

[Preparation of Continuous Reinforcing Fiber Base Material]

Glass cloth: A glass cloth was produced by weaving the above glass fibers 1 as warps and wefts using a repia loom (weave width: 1 m). The produced glass cloth was plain weave, and had a weave density of 6.5/25 mm and a basis weight of 640 g/m$^2$.

Carbon fiber cloth: A carbon fiber cloth was produced by weaving the above carbon fibers 1 as warps and wefts using a repia loom (weave width: 1 m). The produced carbon fiber cloth was plain weave, and had a weave density of 6.5/25 mm and a basis weight of 425 g/m$^2$.

[Thermoplastic Resin]

Resin 1: Polyamide 66

A polymerization reaction of polyamide was carried out by the "thermal melting polymerization" method as follows.

A 52 mass % homogeneous water solution of raw monomers was prepared by dissolving 1500 g of a salt containing adipic acid (Wako Pure Chemical Industries) and hexamethylenediamine (Tokyo Chemical Industry) at a molar ratio of 55:45 and 150 g of adipic acid in 1500 g of distilled water. The water solution was charged in an autoclave with a content of 6.2 L, which was replaced with nitrogen. The solution was concentrated by gradually venting water vapor until the concentration of the solution reached 69 mass % while stirring at a temperature of 110° C. or higher and 140° C. or lower. The internal temperature was then raised to 225° C. At this time, the pressure of the autoclave was increased to 1.9 MPa. A reaction was caused to take place for 50 minutes while the pressure was maintained to 1.9 MPa until the internal temperature reached 245° C. by gradually venting water vapor for 2 hours. The pressure was then lowered over 1.5 hours. The interior of the autoclave was then maintained to a reduced pressure of 650 torr for 11 minutes using a vacuum apparatus. At this time, the final internal temperature of the polymerization was 265° C. Resin 1 (polyamide 66) was then extruded by pressurization with nitrogen through a lower spinneret (nozzle) into strands, which were water-cooled, cut, and discharged in the form of pellets, and dried at 100° C. under a nitrogen atmosphere for 12 hours. Mw was 31,000, Mw/Mn was 1.95, the melting point (Tm) was 265° C., and the glass transition temperature (Tg) was 50° C.

Resin 2: Resin 2 was obtained by dry-blending 0.05 mass % of copper iodide and 0.2 mass % of potassium iodide to 100 mass % of Resin 1, which was kneaded in a twin screw kneader (TEM26SS, Toshiba Machine Co., Ltd.) set at 280° C., water-cooled, cut, and discharged in the form of pellets, then dried at 100° C. for 12 hours under nitrogen atmosphere.

Resin 3: Polyamide 6I

A polymerization reaction of polyamide was carried out by the "thermal melting polymerization" method as follows.

A homogeneous water solution was prepared by dissolving 1500 g of a salt containing isophthalic acid (Wako Pure Chemical Industries) and an equimolar salt of hexamethylenediamine at a molar ratio of 55:45 and 100 g of isophthalic acid in 1500 g of distilled water. The solution was concentrated by gradually venting water vapor until the concentration of the solution reached 68 mass % while stirring at a temperature of 110° C. or higher and 140° C. or lower. The internal temperature was then raised to 235° C. A reaction was caused to take place for 50 minutes while the pressure was maintained to be constant until the internal temperature reached 245° C. by gradually venting water vapor for 50 minutes. The pressure was then lowered over 60 minutes. The interior of the autoclave was then maintained to a reduced pressure of 650 torr for 10 minutes using a vacuum apparatus. At this time, the final internal temperature of the polymerization was 265° C. The resultant was then extruded by pressurization with nitrogen through a lower spinneret (nozzle) into strands, which were water-cooled, cut, and discharged in the form of pellets. The pellets were dried at 100° C. for 12 hours under a nitrogen atmosphere to obtain Resin 3 (polyamide 6I). The obtained Resin 3 (polyamide 6I) had Mw of 22,000 and Mw/Mn of 1.9.

Resin 4: Resin 1 and Resin 3 were dry blended at a mass ratio of 7:3.

Resin 5: Maleated PP (Mw=42,000, acid value: 40 eq/g)

[Production of Thermoplastic Resin Film]

Thermoplastic resin films were produced by performing molding using a T-die extrusion molding machine (manufactured by SOUKEN CO. LTD.). The thickness of the thermoplastic resin films was 180 μm.

Reference Example 2-1

Thermoplastic resin films 1 were obtained by using Resin 1 by the method described above.

Five glass cloths 1 and six thermoplastic resin films 1 were prepared, and molded by alternately overlapping the glass cloths 1 and the thermoplastic resin films 1 one another so that the thermoplastic resin films 1 were disposed on the surfaces, thereby obtaining a continuous fiber reinforced resin composite material. A continuous compression molding machine was used as the molding machine. The glass cloths and the thermoplastic resin films 1 overlapped one another as described above were placed in the molding machine. The temperature inside the heating zone of the molding machine was adjusted to 350° C. and the temperature of the cooling zone was controlled by oil cooling, and compression-molding was performed at a pressure of 5 MPa and a belt speed of 0.5 m/min.

The physical properties of the resultant continuous fiber reinforced resin composite material, the results of static wettability tests with GF2, GF3 and Resin 1, and the result of an impregnation speed test are summarized in Table 2.

Reference Example 2-2

A continuous fiber reinforced resin composite material was obtained in the manner similar to Reference Example 2-1 except that Resin 2 was used as the thermoplastic resin.

The physical properties of the resultant continuous fiber reinforced resin composite material, the results of static wettability tests with GF2, GF3 and Resin 2, and the result of an impregnation speed test are summarized in Table 2.

Reference Example 2-3

A continuous fiber reinforced resin composite material was obtained in the manner similar to Reference Example 2-1 except that Resin 3 was used as the thermoplastic resin.

The physical properties of the resultant continuous fiber reinforced resin composite material, the results of static wettability tests with GF2, GF3 and Resin 3, and the result of an impregnation speed test are summarized in Table 2.

Reference Example 2-4

A continuous fiber reinforced resin composite material was obtained in the manner similar to Reference Example 2-1 except that Resin 4 was used as the thermoplastic resin.

The physical properties of the resultant continuous fiber reinforced resin composite material, the results of static wettability tests with GF2, GF3 and Resin 4, and the result of an impregnation speed test are summarized in Table 2.

Reference Example 2-5

A continuous fiber reinforced resin composite material was obtained in the manner similar to Reference Example 2-1 except that carbon fiber cloth was used as the continuous reinforcing fiber base material. Note that films having a thickness of 118 μm were used as the thermoplastic resin films.

The physical properties of the resultant continuous fiber reinforced resin composite material, the results of static wettability tests with CF2, CF3 and Resin 1, and the result of an impregnation speed test are summarized in Table 2.

Reference Example 2-6

A continuous fiber reinforced resin composite material was obtained in the manner similar to Reference Example 2-1 except that Resin 5 was used as the thermoplastic resin and GF4 was used as the continuous reinforcing fiber.

Comparative Reference Example 2

A continuous fiber reinforced resin composite material was obtained in the manner similar to Reference Example 2-1 except that GF3 was used.

The physical properties of the resultant continuous fiber reinforced resin composite material, the results of static wettability tests with GF2, GF3 and Resin 1, and the result of an impregnation speed test are summarized in Table 2.

Comparative Reference Example 3

Evaluations similar to those in Reference Example 2-1 were performed using "Tepex dynalite 101" which was manufactured by Bond Laminate and in which glass cloth was impregnated with polyamide 66.

The physical properties of the resultant continuous fiber reinforced resin composite material are summarized in Table 2.

TABLE 2

| | | Reference Example 2-1 | Reference Example 2-2 | Reference Example 2-3 | Reference Example 2-4 | Reference Example 2-5 | Reference Example 2-6 | Comp. Ref. Example 2-1 | Comp. Ref. Example 2-2 | Comp. Ref. Example 2-3 |
|---|---|---|---|---|---|---|---|---|---|---|
| Coverage ratio of interfacial resin | % | 36% | 41% | 34% | 33% | 38% | 42% | 19% | 3% | 45% |
| Degree of exposure of interface exposed reinforcing fibers | % | 71% | 61% | 68% | 75% | 70% | 59% | 96% | 100% | 55% |
| Relative elemental concentration of interfacial nitrogen | atom % | 5.04 | 5.77 | 4.69 | 5.27 | 5.32 | 0.11 | 2.89 | 0.62 | 6.78 |
| Carbon element concentration | atom % | 41.75 | 46.62 | 42.9 | 42.31 | 62.5 | 72.8 | 29.85 | 15.17 | 46.7 |
| Relative elemental concentration of interfacial aluminum | atom % | 2.28 | 1.96 | 2.18 | 2.08 | 0 | 1.83 | 3.07 | 3.34 | 1.75 |
| Relative elemental concentration of interfacial silicon | atom % | 9.13 | 8.28 | 9.26 | 8.93 | 0 | 8.19 | 12.38 | 17.4 | 8.29 |
| Relative elemental concentration of interfacial calcium | atom % | 3.03 | 2.72 | 3.05 | 2.98 | 0 | 3.01 | 3.43 | 4.61 | 2.52 |
| Oxygen element concentration | atom % | 38.03 | 34.09 | 37.13 | 37.64 | 32.08 | 14.06 | 47.29 | 57.79 | 33.04 |
| Contact angle between continuous reinforcing fiber and resin used | ° | 50 | 89 | 37 | 26 | 54 | 22 | 32 | 33 | — |
| Contact angle between continuous reinforcing fiber as material treated only with coupling agent and resin | ° | 47 | 64 | 31 | 27 | 46 | 25 | 47 | 47 | — |
| Contact angle between continuous reinforcing fiber free of bundling agent and resin | ° | 33 | 40 | 29 | 20 | 44 | 19 | 33 | 33 | — |
| Impregnation speed | %/min | 99 | 95.4 | 99.5 | 100 | 97.2 | 48.0 | 22.0 | 18.0 | — |
| Bending vibration fatigue test | times | 65608 | 58764 | 73820 | 69024 | 61371 | 42851 | 15430 | 8034 | 20442 |
| Bending strength (23° C.) | MPa | 800 | 750 | 840 | 821 | 920 | 670 | 450 | 300 | 600 |
| Bending strength (120° C.) | MPa | 670 | 563 | 739 | 697 | 640 | 390 | 197 | 80 | 304 |

The physical properties of the resultant continuous fiber reinforced resin composite material, the results of static wettability tests with GF2, GF3 and Resin 5, and the result of an impregnation speed test are summarized in Table 2.

Comparative Reference Example 2-1

A continuous fiber reinforced resin composite material was obtained in the manner similar to Reference Example 2-1 except that GF5 was used to produce glass cloth with a plain weave, a weave density of 6.5/25 mm, and a basis weight of 600 $g/m^2$.

The physical properties of the resultant continuous fiber reinforced resin composite material, the results of static wettability tests with GF2, GF3 and Resin 1, and the result of an impregnation speed test are summarized in Table 2.

The following are examples of the continuous fiber reinforced resin composite material having the characteristic (III).

[Measurements of Crystalline Phases of Inner Layer and Outer Layer of Continuous Fiber Reinforced Resin Composite Material]

A continuous fiber reinforced resin composite material was cut into a 1-cm square piece using a band saw, and measurements were performed using an X-ray diffraction (XRD) system (SmartLab 9 kW) under the following conditions using the concentration optics system concentration method for the inner layer and the parallel optic system oblique incidence method for the surface layer, and the full width at half maximum, the intensity, the lattice plane spacing of the (010) plane, the full width at half maximum of the (100) plane, and the 2θ that generated the peak of each crystalline plane were determined. The identification of each crystal plane was achieved by simulation. Output: 9 kW (45 kV/200 mA), 2θ=5 to 40°, ω=0.3° (parallel optic system), measurement interval: 0.1 deg/min, detector: semiconductor detector, divergence slit: ½°, divergence longitudinal limit slit: 5 mm, scattering slit: 0.5°, light receiving slit: 2 mm, Kβ filter Measurements were carried out five times and the average value was used for determination. In order to keep the statistical variation to 1% or lower, the intensity within the measurement range was measured so as not to be less than 10000.

[Measurement of Contact Angle between Continuous Reinforcing Fiber and Thermoplastic Resin]

A film of a thermoplastic resin and a single yarn of reinforcing fibers were sandwiched between cover glass, and the temperature was raised to 280° C. at 100° C./min on a hot plate. The sample was allowed to stand for 5 minutes, and the temperature was then lowered to room temperature at 100° C./min. Images were taken immediately before the start of cooling and at room temperature, and the angle (contact angle) (°) between the reinforcing fiber surface and the thermoplastic resin was determined by ImageJ. The average value of values of 50 locations was determined as the contact angle. The contact angle immediately before the start of cooling was taken as the contact angle at high temperature, the contact angle at room temperature was taken as the contact angle at room temperature, and (contact angle at high temperature)/(contact angle at room temperature) was determined.

[Warping Characteristic]

A dial gauge was fixed to an arm. A plate of the continuous fiber reinforced resin composite material obtained in each of Examples was scanned, and the difference between the maximum value and minimum value was read.

[Shape Conformability]

A test specimen of 150 mm×150 mm was cut from the continuous fiber reinforced resin composite material obtained in each of Examples using a band saw, heated with an infrared heater (INFRASTEIN H7GS-71298NGK, NGK INSULATORS, LTD., a wavelength of 3 to 7 μm) to the melting temperature of the resin used in each of Examples+25° C., placed in a mold heated to 180° C. with a flat section of 100 mm×100 mm, a wall section of 25 mm×100, and R of the wall of 10°, and pressed at a pressure of 10 MPa. The rating was made according to the maximum gap between the wall of the resulting box-shaped molded article and the mold, and was rated as "○" (excellent) when the gap was 0 mm or more and less than 1 mm, "Δ" (good) when the gap was 1 mm or more and less than 3 mm, and "x" (poor) when the gap was 3 mm or more.

The materials used in examples of the continuous fiber reinforced resin composite material having the characteristic (III) were as follows.

[Continuous Reinforcing Fibers]

(Glass Fibers)

Glass fiber 1 (GF1): Glass fibers were produced in which 0.45 mass % of a bundling agent attached to glass fibers with a fiber fineness of 11,500 dtex and a single yarn count of 2,000. The winding configuration was DWR and the average single yarn diameter was 17 μm.

For the adhesion of the bundling agent for the glass fibers, a water solution of a bundling agent was used which contained 0.5 mass % of γ-aminopropyltriethoxysilane (hereinafter referred to as aminosilane) KBE-903 (manufactured by Shin-Etsu Chemical Co., Ltd.), 1 mass % of carnauba wax, 2 mass % of polyurethane resin Y65-55 (manufactured by ADEKA CORPORATION), 3 mass % of a copolymerized compound which was prepared by copolymerizing 40 mass % of maleic anhydride, 50 mass % of methyl acrylate, and 10 mass % of methyl methacrylate and had a weight average molecular weight of 20000, and the water solution of the copolymerized compound was adjusted with deionized water to be 3 mass %.

The amounts of the components attached to the glass fibers were 0.034 mass % of γ-aminopropyltriethoxysilane, 0.14 mass % of the polyurethane resin, 0.069 mass % of carnauba wax, and 0.21 mass % of the copolymerization compound with respect to 100% of the glass fibers.

[Preparation of Continuous Reinforcing Fiber Base Material]

Glass cloth: A continuous reinforcing fiber base material was produced by weaving the above glass fibers as warps and wefts using a repia loom (weave width: 1 m). The produced glass cloth was plain weave, and had a weave density of 6.5/25 mm and a basis weight of 640 g/m$^2$.

[Thermoplastic Resin]

Resin 1: Polyamide 66 (Leona 1300S, Asahi Kasei Corporation), melting point: 265° C.

Resin 2: Polyamide 6 (1011FB, Ube Industries Ltd.), melting point 225° C.

[Production of Thermoplastic Resin Film]

Thermoplastic resin films were produced by performing molding using a T-die extrusion molding machine (manufactured by SOUKEN CO. LTD.). The thickness of the thermoplastic resin films was 180 μm.

Reference Example 3-1

Thermoplastic resin films 1 were obtained by using Resin 1 by the method described above.

Five glass cloths 1 and six thermoplastic resin films 1 were prepared, and molding was carried out by using a raw material laminate obtained by alternately overlapping the glass cloths 1 and the thermoplastic resin films 1 one another so that the thermoplastic resin films 1 were disposed on the surfaces, thereby obtaining a continuous fiber reinforced resin composite material. At this time, the ratio of the charged volume of the thermoplastic resin was 50%.

A continuous compression molding machine was used as the molding machine. The glass cloths and the thermoplastic resin films 1 overlapped one another as described above were placed in the molding machine. The temperature inside the heating zone of the molding machine was adjusted to 330° C. and the temperature of the cooling zone was controlled by oil to 180° C., and compression-molding was performed at a pressure of 3 MPa and a belt speed of 0.5 m/min. In this case, the maximum temperature of the continuous fiber reinforced resin composite material was 313° C., the cooling rate was 15° C./second, and a carbon steel mold was used. In Reference Example 3-1, the temperature of the cooling zone in the molding machine was controlled to 180° C. Therefore, the temperature difference between the temperature of the dissimilar material (carbon steel mold) at the start of the cooling step which was 180° C. and the temperature of the continuous fiber reinforced resin composite material which was 313° C., was 133° C.

Reference Example 3-2

A continuous fiber reinforced resin composite material was obtained and evaluated in the manner similar to Reference Example 3-1 except that the temperatures of the heating zone and the cooling zone in the molding machine were set to 345° C. and 130° C., respectively. In this case, the maximum temperature of the continuous fiber reinforced resin composite material was 320° C. and the cooling rate was 24° C./sec.

Reference Example 3-3

A continuous fiber reinforced resin composite material was obtained and evaluated in the manner similar to Reference Example 3-1 except that a double belt press was used as the molding machine and the temperature in the cooling zone was set to 50° C. In this case, the maximum temperature of the continuous fiber reinforced resin composite material was 306° C., the cooling rate was 60° C./second, and the belt was made of carbon steel metal.

Reference Example 3-4

A continuous fiber reinforced resin composite material was obtained and evaluated in the manner similar to Reference Example 3-1 except that the temperatures of the heating zone and the cooling zone in the molding machine were set to 300° C. and 180° C., respectively. In this case, the maximum temperature of the continuous fiber reinforced resin composite material was 279° C. and the cooling rate was 7° C./sec.

Reference Example 3-5

A continuous fiber reinforced resin composite material was obtained and evaluated in the manner similar to Reference Example 3-1 except that the temperatures of the heating zone and the cooling zone in the molding machine were set to 315° C. and 180° C., respectively. In this case, the maximum temperature of the continuous fiber reinforced resin composite material was 290° C. and the cooling rate was 11° C./sec.

Reference Example 3-6

A continuous fiber reinforced resin composite materials was obtained and evaluated in the manner similar to Reference Example 3-1 except that Resin 2 was used as the thermoplastic resin and the temperature in the cooling zone was set to 140° C. In this case, the maximum temperature of the continuous fiber reinforced resin composite material was 313° C. and the cooling rate was 18° C./sec.

Comparative Reference Example 3-1

A continuous fiber reinforced resin composite material was obtained and evaluated in the manner similar to Example 1 except as follows. A hydraulic molding machine with a maximum clamping force of 50 tons was used as the molding machine, and a carbon steel mold was used as the mold. The temperature in the molding machine was heated to 330° C., the mold was then clamped with a clamping force of 5 MPa, and compression molding was carried out for 5 minutes. Then, the mold was transferred to a cooling press and water cooled, the mold was opened, and the molded article was removed. In this case, the maximum temperature of the continuous fiber reinforced resin composite material was 266° C. and the cooling rate was 42° C./sec.

Comparative Reference Example 3-2

A similar evaluation was performed using “Tepex dynalite 101” which was manufactured by Bond Laminate and in which glass cloth was impregnated with polyamide 66.

Comparative Reference Example 3-3

A continuous fiber reinforced resin composite material was obtained and evaluated in the manner similar to Reference Example 3-1 except that GF free of a bundling agent (sizing agent) obtained by treating GF1 in an electric furnace at 650° C. for 3 hours was used as continuous reinforcing fibers instead of GF1. In this case, the maximum temperature of the continuous fiber reinforced resin composite material was 313° C., the cooling rate was 15° C./second, and a carbon steel mold was used during cooling.

TABLE 3

| | | Reference Example 3-1 | Reference Example 3-2 | Reference Example 3-3 | Reference Example 3-4 | Reference Example 3-5 | Reference Example 3-6 | Comp. Ref. Example | Comp. Ref. Example | Comp. Ref. Example |
|---|---|---|---|---|---|---|---|---|---|---|
| Maximum molding temperature | ° C. | 313 | 320 | 306 | 279 | 290 | 313 | 266 | — | 313 |
| Temperature difference from dissimilar material at start of cooling step | ° C. | 133 | 190 | 256 | 99 | 110 | 173 | 0 | — | 133 |
| Cooling rate | ° C./s | 15 | 24 | 60 | 7 | 11 | 18 | 42 | — | 15 |
| (Contact angle at high temperature)/ (contact angle at room temperature) | — | 2.5 | 2.5 | 2.5 | 2.5 | 2.5 | 1.4 | 2.5 | — | 1.1 |
| Full width at half maximum of (010) plane of crystalline phase in inner layer | — | 1.10 | 1.11 | 1.11 | 1.03 | 1.06 | 1.24 | 1.13 | 1.09 | 1.42 |
| Intensity of (010) plane of crystalline phase in inner layer | — | 20636 | 30536 | 20641 | 12740 | 16040 | 13885 | 62217 | 48104 | 75378 |
| Full width at half maximum of (010) plane of crystal phase in surface layer | — | 1.20 | 1.20 | 1.20 | 0.83 | 0.92 | 1.28 | 1.25 | 1.17 | 1.34 |
| Full width at half maximum of (100) plane of crystalline phase in inner layer | — | 0.97 | 0.88 | 0.91 | 0.85 | 0.86 | 1.17 | 0.88 | 0.80 | 0.84 |
| Lattice spacing of (010) plane of crystalline phase in inner layer | — | 0.74 | 0.74 | 0.74 | 1.3 | 1.1 | 1.2 | 0.75 | 0.74 | 1.5 |
| Full width at half maximum of (100) plane of crystal phase in surface layer | — | 1.01 | 0.91 | 0.91 | 0.88 | 0.90 | 1.14 | 0.70 | 0.79 | 0.71 |
| 20 of peak of (100) plane of crystal phase in surface layer | — | 20.36 | 20.35 | 20.35 | 20.34 | 20.34 | 20.40 | 20.35 | 20.33 | 20.33 |
| 0.0037 × (maximum temperature during molding) + 0.15 | — | 1.31 | 1.33 | 1.28 | 1.18 | 1.22 | 1.31 | 1.13 | — | 1.31 |
| (Full width at half maximum of (010) plane of crystal phase in surface layer of continuous fiber reinforced resin composite material)/ (full width at | — | 1.09 | 1.09 | 1.08 | 0.81 | 0.87 | 1.03 | 1.11 | 1.07 | 0.94 |

TABLE 3-continued

| | | Reference Example 3-1 | Reference Example 3-2 | Reference Example 3-3 | Reference Example 3-4 | Reference Example 3-5 | Reference Example 3-6 | Comp. Ref. Example | Comp. Ref. Example | Comp. Ref. Example |
|---|---|---|---|---|---|---|---|---|---|---|
| half maximum of (010) plane of crystal phase in inner layer of continuous fiber reinforced resin | | | | | | | | | | |
| −0.0034 × (maximum temperature during molding) + 2.02 | — | 0.956 | 0.932 | 0.980 | 1.07 | 1.03 | 0.96 | 1.12 | — | 0.96 |
| (Full width at half maximum of (100) plane of crystal phase in surface layer of continuous fiber reinforced resin composite material)/(full width at half maximum of (100) plane of crystal phase in inner layer of continuous fiber reinforced resin | — | 1.04 | 1.03 | 1.00 | 1.04 | 1.05 | 0.97 | 0.80 | 1.00 | 0.85 |
| 0.0125 × (cooling rate during molding) + 0.318 | — | 0.506 | 0.618 | 1.068 | 0.406 | 0.456 | 0.543 | 0.843 | — | 0.506 |
| Warping characteristic | mm | <0.1 | <0.1 | 0.1 | 0.3 | 0.2 | 0.2 | 1.1 | 0.8 | 1.3 |
| Shape conformability | — | ○ | ○ | ○ | Δ | Δ | Δ | X | X | X |

In Reference Examples 3-1 to 3-6, because the (010) plane of the crystalline phase in the inner layer of the above continuous fiber reinforced resin composite material had a full width at half maximum of the (010) plane of the crystalline phase in the inner layer of 1.00 or more and an intensity of the (010) plane of the crystalline phase in the inner layer of 40,000 or less, high warping characteristic and shape conformability were achieved.

The following are examples of the continuous fiber reinforced resin composite material having the characteristic (IV).

The measurement and evaluation methods used in the example of the continuous fiber reinforced resin composite material having the characteristic (IV) were as follows.

[Volume Ratio (Vf) of Continuous Reinforcing Fibers Contained in Continuous Fiber Reinforced Resin Composite Material]

Two grams of a continuous fiber reinforced resin composite material was cut out, placed in an electric furnace, and heated at a temperature of 650° C. for 3 hours to burn off the resin. The resultant was then allowed to cool naturally to room temperature, and the mass ratio of the continuous reinforcing fibers to the resin contained in the continuous fiber reinforced resin composite material was determined by measuring the mass of the remaining continuous reinforcing fibers. Then, the volume ratio Vf (%) of the continuous reinforcing fibers in the continuous fiber reinforced resin composite material was determined from the obtained mass ratio and the density.

[Interfacial Polishing Value]

A continuous fiber reinforced resin composite material was cut by a band saw so that a cross section (polished surface) perpendicular to the length direction of the continuous reinforcing fibers was obtained, and the cut specimen was polished by a polishing machine (compact precision sample preparation system IS-POLISHER ISPP-1000, Ikegami Seiki Co.) by increasing the polishing pressure applied to the polishing surface from 200 g/cm$^2$ to with increments of 20 g/cm$^2$. The polished surface was observed under an FESEM (S-4700, Hitachi High-Technologies Corporation) (magnification: 4500×), and the maximum polishing pressure P (g/cm$^2$) at which no voids were observed between any of 10 arbitrary continuous reinforcing fibers and the resin was determined. The interfacial polishing value P/Vf (g/cm$^2$·%) was obtained by dividing the maximum polishing pressure P by Vf (%) determined above.

Polishing was carried out for 10 minutes with a water resistant paper No. #2000, 5 minutes with a silicon carbide film having a particle size of 9 μm, 5 minutes with an alumina film having a particle size of 5 μm, 5 minutes with an alumina film having a particle size of 3 μm, 5 minutes with an alumina film having a particle size of 1 μm, and 5 minutes with colloidal silica (Vicaloxus 0.1CR) with a particle size of 0.1 μm in which buffing paper foamed polyurethane was used. Each polishing was performed while adding water at about 7 mL/min.

[Tensile Strength and Tensile Strength Retention Ratio]

Strip-shaped test specimens in a length of 70 mm, a width of 10 mm, and a thickness of 2 mm were cut from a continuous fiber reinforced resin composite material and dried in a vacuum dryer at 80° C. for 18 hours or longer. A test specimen was then chucked in the longitudinal direction at intervals of 30 mm using Instron universal testing machine, and the tensile strength (MPa) was measured at a speed of 5 mm/min in each of an environment of 23° C. and 50% RH and an environment of 100° C. and 50% RH.

The tensile strength retention ratio (%) at 80° C. was determined by the following formula.

$$\text{Tensile strength retention ration at 100° C.} = (\text{tensile strength at 100° C. and 50\% } RH / \text{tensile strength at 23° C. and 50\% } RH) \times 100$$

[Bending Strength, Bending elastic modulus, Bending Strength Retention Ratio, and Bending elastic modulus Retention Ratio]

Strip-shaped test specimens having a length of 100 mm, a width of 10 mm, and a thickness of 2 mm were cut from a continuous fiber reinforced resin composite material and dried in a vacuum dryer at 80° C. for 18 hours or longer. The bending strength (MPa) and the bending elastic modulus (GPa) were then measured using Instron universal testing machine in each of an environment of 23° C. and 50% RH and an environment of 100° C. and 50% RH, using a three-point bending jig, a span interval set to the thickness×16 (mm) at a speed of 1 mm/min.

The bending strength retention ratio (%) and the bending elastic modulus retention ratio (%) at 100° C. were determined by the following formulae.

$$\text{Bending elastic modulus rentention ratio at } 100^\circ \text{ C.} = (\text{bending modulus at } 100^\circ \text{ C. and } 50\%\ RH/\text{bending elastic modulus at } 23^\circ \text{ C. and } 50\%\ RH)\times 100$$

$$\text{Bending elastic modulus rentention ratio at } 80^\circ \text{ C.} = (\text{bending elastic modulus at } 80^\circ \text{ C. and } 50\%\ RH/\text{bending elastic modulus at } 23^\circ \text{ C. and } 50\%\ RH)\times 100$$

[Water Absorption Characteristics]

Strip-shaped test specimens having a length of 100 mm, a width of 10 mm, and a thickness of 2 mm were cut from a continuous fiber reinforced resin composite material and immersed in a thermostatic water bath at 80° C. for 18 hours to be used as test specimens upon water absorption. The tensile strength (MPa), the bending strength (MPa), and the bending elastic modulus (GPa) of specimens in dried state and upon water absorption were measured in an environment of 23° C. and 50% RH by the method described above.

The tensile strength retention ratio (%), the bending strength retention ratio (%), and the bending elastic modulus retention ratio (%) upon water absorption were determined by the following formulae.

$$\text{Tensile strength retention ratio upon water absorption} = (\text{tensile strength upon water absorption/tensile strength in dried state})\times 100$$

$$\text{Bending strength retention ratio upon water absorption} = (\text{bending strength upon water absorption/bending strength in dried state})\times 100$$

$$\text{Bending elastic modulus retention ratio upon water absorption} = (\text{bending elastic modulus upon water absorption/bending elastic modulus upon water adsorption/bending elastic modulus in dried state})\times 100$$

[Impact Strength]

A specimen having a length of 60 mm, a width of 60 mm, and a thickness of 2 mm was cut out from a continuous fiber reinforced resin composite material, and tested with a high-speed impact tester (Shimadzu HYDRO SHOT HITS-P10, Shimadzu Corporation) in accordance with JIS K7211-2; 2006 with a striker diameter of 20 mm ϕ, a receptacle diameter of 40 mm ϕ, a test speed of 4.4 m/sec, a test temperature of 23° C., and a sample number n=5. The displacement was plotted against the test force, and the maximum impact strength (kN) determined from the plot was divided by the thickness of the specimen, and the average (kN/mm) of 5 samples was determined.

[Vibration Fatigue Test]

ASTM-D1822 tensile impact dumbbell Type S specimens were prepared from a continuous fiber reinforced resin composite material, and a vibration fatigue test was performed by EHF-EB50 kN-40L (RV) (Shimadzu Corporation) at a test temperature of 23° C., a frequency of 20 Hz, with a waveform of sine wave, and a chuck interval set to 35 mm. The specimen was rated as "○ (good)" when the number of fractures in the vibration fatigue test at 250 MPa was 20,000 or more, or "x (poor)" when the number of fractures was less than 20,000.

[Interfacial Recoverability]

The continuous fiber reinforced resin composite material after the above bending test was pressed at a temperature of the glass transition temperature of the thermoplastic resin contained in the continuous fiber reinforced resin composite material+100° C. for 15 minutes by applying 5 MPa. Then, the bending test section was cut out by a band saw so that a cross section perpendicular to the length direction of the continuous reinforcing fiber (polished surface) was obtained, and the cut out bending test section was polished by a polishing machine (compact precision sample preparation system IS-POLISHER ISPP-1000, Ikegami Seiki Co.) so that the polishing pressure applied to the polished surface was 125 g/cm$^2$. Arbitrary 50 continuous reinforcing fibers in the polished surface was observed under an FESEM (S-4700, Hitachi High-Technologies Corporation) (magnification: 4500×). The percentage of continuous reinforcing fibers with no voids between the fibers and the resin was calculated. When the percentage of continuous reinforcing fibers with no voids between the fibers and the resin was 0% or more and less than 20% of the percentage of continuous reinforcing fibers with no voids between the fibers and the resin before the bending test in the similar manner, the specimen was rated as "1"; when the percentage was 20% or more and less than 40%, the specimen was rated as "2"; when the percentage was 40% or more and less than 60%, the specimen was rated as "3"; when the percentage was 60% or more and less than 80%, the specimen was rated as "4"; and when the percentage was 80% or more and 100% or less, the specimen was rated as "5".

Polishing was performed in the following order: for 10 minutes with water resistant paper No. #2000, 5 minutes with a silicon carbide film having a particle size of 9 μm, 5 minutes with an alumina film having a particle size of 5 μm, 5 minutes with an alumina film having a particle size of 3 μm, and 5 minutes with an alumina film having a particle size of 1 μm. Each polishing was performed while adding water at about 7 mL/min.

[μ Droplet Contact Angle and Interfacial Shear Strength]

A thermoplastic resin was set in the heating furnace section of a composite material interface characteristic evaluation apparatus (HM410, TOUEISANGYO Inc.), and the resin was made to be adhered to a single yarn of continuous reinforced fibers with the furnace temperature set to the melting point of the thermoplastic resin+15° C., to produce a μ droplet. The produced μ droplet had an ellipsoidal sphere shape centering around the reinforcing fiber and was elongated in the direction of the length of the reinforcing fiber. After cooling to room temperature, the contact angle between the continuous reinforcing fiber and the μ droplet of the thermoplastic resin (see α in FIG. 1) was measured, and the μ droplet contact angle (°) was obtained based on the median of the contact angles of 100μ droplets with a length L in the fiber axial direction of 95 to 105 μm.

After the diameter d (μm) of the continuous reinforcing fiber and the length L (μm) of the μ droplet in the axial direction of the continuous reinforcing fiber were measured, a shear test of a 95- to 105-μm μ droplet was conducted and the shear load F (N) when the resin ball was scraped off by a blade was measured, and the interfacial shear strength τ (MPa) was obtained from the following formula (1). The number of measurement points was 100, and the median of those 100 points was calculated.

$$\tau = F/\pi dL \quad (1)$$

The materials used in examples of the continuous fiber reinforced resin composite material having the characteristic (IV) were as follows.

Continuous Reinforcing Fibers (Glass Fibers)

Glass fibers 1 (GF1): Glass fibers were produced in which 0.45 mass % of a bundling agent was attached to 100 mass % of glass fibers with a fiber fineness of 1.15 g/m and a single yarn count of 2,000. The winding configuration was DWR and the average single yarn diameter was about 17 μm. The above bundling agent was prepared so as to contain 0.5 mass % of γ-aminopropyltriethoxysilane (KBE-903, manufactured by Shin-Etsu Chemical Co., Ltd.), 1 mass % of carnauba wax, 2 mass % of a polyurethane resin (Y65-55, ADEKA CORPORATION), 3 mass % of a copolymerized compound (copolymerized compound which was obtained by copolymerizing 40 mass % of maleic anhydride, 50 mass % of methyl acrylate, and 10 mass % of methyl methacrylate, and had a weight average molecular weight of 20,000) by adjusting with deionized water.

Glass fibers 2 (GF2): GF2 free of a surface treatment agent was obtained by treating GF1 in an electric furnace at 650° C. for 3 hours. (It was confirmed for GF2 that the content of the surface treatment agent in GF2 was 0.45 mass % or less, and the isoelectric point was less than pH=3 and negative at pH=3 to 8 in the zeta potential measurement.)

Glass fibers 3 (GF3): Glass fiber 2 was immersed in a 0.5 mass % water solution of γ-aminopropyltriethoxysilane (KBE-903, manufactured by Shin-Etsu Chemical Co., Ltd.) for 30 minutes and dried at 110° C. for 3 hours.

[Preparation of Continuous Reinforcing Fiber Base Material]

Glass cloth: A glass cloth was produced by weaving the above glass fibers as warps and wefts using a repia loom (weave width: 1 m). The produced glass cloth was plain weave, and had a weave density of 6.5/25 mm and a basis weight of 640 g/m$^2$.

[Thermoplastic Resin]

Resin 1: Polyamide 66

A polymerization reaction of polyamide was carried out by the "thermal melting polymerization" method as follows.

A 50 mass % homogeneous equimolar water solution of raw monomers was prepared by dissolving 1500 g of an equimolar salt of adipic acid (Wako Pure Chemical Industries) and hexamethylenediamine (Tokyo Chemical Industry Co., Ltd.) in 1500 g of distilled water. The water solution was charged in an autoclave with a content of 5.4 L, which was replaced with nitrogen. The solution was concentrated by gradually venting water vapor until the concentration of the solution reached 70 mass % while stirring at a temperature of 110° C. or higher and 150° C. or lower. The internal temperature was then raised to 220° C. At this time, the pressure of the autoclave was increased to 1.8 MPa. A reaction was caused to take place for 1 hour while the pressure was maintained to 1.8 MPa until the internal temperature reached 245° C. by gradually venting water vapor for 1 hour. The pressure was then lowered over 1 hour. The interior of the autoclave was then maintained to a reduced pressure of 650 torr for 10 minutes using a vacuum apparatus. At this time, the final internal temperature of the polymerization was 265° C. The resultant was then extruded by pressurization with nitrogen through a lower spinneret (nozzle) into strands, which were water-cooled, cut, and discharged in the form of pellets The pellets were dried at 100° C. for 12 hours under a nitrogen atmosphere to obtain Resin 1 (polyamide 66). The obtained Resin 1 (polyamide 66) had a weight average molecular weight Mw of 35,000 and a molecular weight distribution Mw/Mn of 2.0 (Mn is the number average molecular weight).

Resin 2: Polyamide 6I

A polymerization reaction of polyamide was carried out by the "thermal melting polymerization" method as follows.

A 50 mass % homogeneous water solution of raw monomers was prepared by dissolving, in 1500 g of distilled water, 1500 g of an equimolar salt of isophthalic acid (Wako Pure Chemical Industries) and hexamethylenediamine, and 4.0 mol % of acetic acid with respect to the total equimolar salt component. The solution was concentrated by gradually venting water vapor until the concentration of the solution reached 70 mass % while stirring at a temperature of 110° C. or higher and 150° C. or lower. The internal temperature was then raised to 220° C. At this time, the pressure of the autoclave was increased to 1.8 MPa. A reaction was caused to take place for 1 hour while the pressure was maintained to 1.8 MPa until the internal temperature reached 245° C. by gradually venting water vapor for 1 hour. The pressure was then lowered over 30 minutes. The interior of the autoclave was then maintained to a reduced pressure of 650 torr for 10 minutes using a vacuum apparatus. At this time, the final internal temperature of the polymerization was 265° C. The resultant was then extruded by pressurization with nitrogen through a lower spinneret (nozzle) into strands, which were water-cooled, cut, and discharged in the form of pellets. The pellets were dried at 100° C. for 12 hours under a nitrogen atmosphere to obtain Resin 2 (polyamide 6I). The obtained Resin 2 (polyamide 6I) had Mw of 20000 and Mw/Mn of 2.0.

Resin 3: Dry blend of Resin 1 and Resin 2 (mass ratio was Resin 1 (PA66):Resin 2 (PA6I)=2:1)

Resin 4: Polyamide 12 (3014U, Ube Industries, Ltd.)

Resin 5: Polyamide 1010 (VESTAMID DS16, Daicel-Evonik Ltd.)

Resin 6: Polyamide 612 (VESTAMID D16, Daicel-Evonik Ltd.)

Resin 7: Polyamide 6 (1010X1, Ube Industries, Ltd.)

Resin 8: Polyamide 9T (Genestar N1000A, Kuraray Co., Ltd.)

Resin 9: Polypropylene (Prime Polypro J707EG, Prime Polymer Co., Ltd.)

Resin 10: Polyethylene (Suntec J240, Asahi Kasei Corporation)

[Production of Thermoplastic Resin Film]

Thermoplastic resin films were produced by performing molding using a T-die extrusion molding machine (manufactured by SOUKEN CO. LTD.). The thickness of the films was 200 μm.

Reference Example 4-1

Thermoplastic resin films 1 were obtained by using Resin 1 by the method described above.

Five glass cloths 1 produced using GF1 and six thermoplastic resin films 1 were prepared, and molded by alternately overlapping the glass cloths 1 and the thermoplastic resin films 1 one another so that the thermoplastic resin films 1 were disposed on the surfaces, thereby obtaining a continuous fiber reinforced resin composite material. At this time, the ratio of the charged volume of the thermoplastic resin was 50%.

A continuous compression molding machine was used as the molding machine. The glass cloths and the thermoplastic resin films 1 overlapped one another as described above were placed in the molding machine. The temperature inside the heating zone of the molding machine was adjusted to 330° C. and the temperature of the cooling zone was controlled by water cooling, and compression-molding was performed at a pressure of 3 MPa and a belt speed of 0.5 m/min.

The physical properties of the obtained continuous fiber reinforced resin composite materials, as well as the interfacial shear strength and the μ droplet contact angles of GF1, GF2, GF3 and Resin 1 are summarized in Table 4.

Reference Examples 4-2 to 4-6

A continuous fiber reinforced resin composite material was obtained in the manner similar to Reference Example 4-1 except that the resin summarized in Table 4 was used as the thermoplastic resin.

The physical properties of the obtained continuous fiber reinforced resin composite materials, as well as the interfacial shear strength and the μ droplet contact angles of GF1, GF2, GF3 and the resin used in each example are summarized in Table 4.

Reference Example 4-7

A continuous fiber reinforced resin composite material was obtained in the manner similar to Reference Example 4-1 except that a double belt press machine was used as the molding machine.

The physical properties of the obtained continuous fiber reinforced resin composite materials, as well as the interfacial shear strength and the μ droplet contact angles of GF1, GF2, GF3 and Resin 1 are summarized in Table 4.

Comparative Reference Examples 4-1, 4-2, 4-5, and 4-6

A continuous fiber reinforced resin composite material was obtained in the manner similar to Reference Example 4-1 except that the resin summarized in Table 4 was used as the thermoplastic resin.

The physical properties of the obtained continuous fiber reinforced resin composite materials, as well as the interfacial shear strength and the μ droplet contact angles of GF1, GF2, GF3 and the resin used in each example are summarized in Table 4.

Comparative Reference Example 4-3

Evaluations similar to those in Reference Example 4-1 were performed on "Tepex dynalite 101" which was manufactured by Bond Laminate and in which glass cloth was impregnated with polyamide 66.

The physical properties are listed in Table 4.

Comparative Reference Example 4-4

A continuous fiber reinforced resin composite material was obtained in the manner similar to Reference Example 4-1 except that glass fibers 4 (GF4) to which a mixture of 0.3 mass % of 3-glycidoxypropyltrimethoxysilane (KBM-402, manufactured by Shin-Etsu Chemical Co., Ltd.), 1.5 mass % of an epoxy resin emulsion, and 0.2 mass % of carnauba wax as a bundling agent was attached to GF2 (100 mass %) above was used to produce and use a glass cloth (glass cloth 4) with a plain weave, a weave density of 6.5 fibers/25 mm, and a basis weight of 600 g/m$^2$. Note that the ratio of the charged volume of the thermoplastic resin was 50%.

The physical properties of the obtained continuous fiber reinforced resin composite materials, as well as the interfacial shear strength and the μ droplet contact angles of GF4, GF2, GF3 and Resin 1 are summarized in Table 4.

TABLE 4

| | | Reference Example 4-1 | Reference Example 4-2 | Reference Example 4-3 | Reference Example 4-4 | Reference Example 4-5 | Reference Example 4-6 | Reference Example 4-7 |
|---|---|---|---|---|---|---|---|---|
| Resin | — | Resin 1 | Resin 2 | Resin 3 | Resin 6 | Resin 7 | Resin 8 | Resin 1 |
| μ droplet shear strength (A) between GF and resin | MPa | 22.8 | 27.4 | 27.2 | 19.7 | 19.6 | 20.9 | 22.8 |
| μ droplet shear strength (B) between GF2 and resin | MPa | 7.3 | 6.2 | 6.8 | 14.5 | 20.3 | 9.4 | 7.3 |
| μ droplet shear strength (C) between GF3 and resin | MPa | 23.7 | 26.7 | 26.8 | 24.3 | 24.1 | 23.8 | 23.7 |
| μ droplet contact angle (D) between GF used and resin | ° | 17.2 | 15.1 | 15.7 | 29.2 | 43.1 | 23.6 | 17.2 |
| μ droplet contact angle (E) between GF2 and resin | ° | 29.0 | 27.5 | 30.8 | 69.5 | 62.5 | 38.1 | 29 |
| μ droplet contact angle (F) between GF3 and resin | ° | 15.7 | 13.7 | 15.0 | 35.6 | 53.2 | 26.8 | 15.7 |
| (A)/(C) | — | 0.96 | 1.03 | 1.01 | 0.81 | 0.81 | 0.88 | 0.96 |
| (A)/(B) | — | 3.12 | 4.42 | 4.00 | 1.36 | 0.97 | 2.22 | 3.12 |
| (D)/(F) | — | 1.10 | 1.10 | 1.05 | 0.82 | 0.81 | 0.88 | 1.10 |
| (D)/(E) | | 0.59 | 0.55 | 0.51 | 0.42 | 0.69 | 0.62 | 0.59 |
| Interfacial polishing value | g/cm$^2$ · % | 28 | 67 | 65 | 19 | 12 | 22 | 26 |
| Tensile strength | MPa | 591 | 610 | 621 | 510 | 540 | 563 | 588 |
| Bending strength | MPa | 835 | 884 | 864 | 688 | 754 | 704 | 828 |
| Bending elastic modulus | GPa | 27.3 | 29.1 | 28.4 | 25.1 | 25.9 | 26.1 | 27.2 |
| Bending strength retention ratio | % | 82 | 77 | 87 | 64 | 70 | 79 | 82 |
| Tensile strength retention ratio | % | 65 | 57 | 62 | 54 | 56 | 60 | 65 |
| Bending elastic modulus retention ratio | % | 78 | 74 | 80 | 67 | 65 | 71 | 77 |
| Tensile strength retention ratio upon water absorption | % | 82 | 87 | 87 | 69 | 72 | 75 | 81 |
| Bending strength retention ratio at water absorption | % | 75 | 81 | 84 | 71 | 70 | 72 | 75 |

TABLE 4-continued

| | | Reference Example 4-1 | Reference Example 4-2 | Reference Example 4-3 | Reference Example 4-4 | Reference Example 4-5 | Reference Example 4-6 | Reference Example 4-7 |
|---|---|---|---|---|---|---|---|---|
| Bending elastic modulus retention ratio upon water ab | % | 77 | 79 | 82 | 71 | 68 | 70 | 77 |
| Impact strength | kN/mm | 5.5 | 6.2 | 6.1 | 4.7 | 4.9 | 5. | 5.5 |
| Vibration fatigue resistance characteristic | — | ○ | ○ | ○ | ○ | ○ | ○ | ○ |
| Interface recovery characteristics | — | 5 | 5 | 5 | 3 | 4 | 4 | 5 |

| | | Comp. Ref. Example 4-1 | Comp. Ref. Example 4-2 | Comp. Ref. Example 4-3 | Comp. Ref. Example 4-4 | Comp. Ref. Example 4-5 | Comp. Ref. Example 4-6 |
|---|---|---|---|---|---|---|---|
| Resin | — | Resin 9 | Resin 10 | — | Resin 1 | Resin 4 | Resin 5 |
| μ droplet shear strength (A) between GF and resin | MPa | 3.4 | 4.2 | N/A | 9.4 | 14.6 | 16.5 |
| μ droplet shear strength (B) between GF2 and resin | MPa | 3.2 | 4.1 | N/A | 7.3 | 14.3 | 15.6 |
| μ droplet shear strength (C) between GF3 and resin | MPa | 3.5 | 4.9 | N/A | 23.7 | 19.9 | 27.1 |
| μ droplet contact angle (D) between GF used and resin | ° | 34.2 | 21.7 | N/A | 47.2 | 26.0 | 31.2 |
| μ droplet contact angle (E) between GF2 and resin | ° | 24.7 | 67.2 | N/A | 29.0 | 29.8 | 46.7 |
| μ droplet contact angle (F) between GF3 and resin | ° | 21.5 | 48.7 | N/A | 15.7 | 25.0 | 14.8 |
| (A)/(C) | — | 0.97 | 0.86 | N/A | 0.40 | 0.73 | 0.61 |
| (A)/(B) | — | 1.06 | 1.02 | N/A | 1.29 | 1.02 | 1.06 |
| (D)/(F) | — | 1.59 | 0.45 | N/A | 3.01 | 1.04 | 2.11 |
| (D)/(E) | | 1.38 | 0.32 | N/A | 1.63 | 0.87 | 0.67 |
| Interfacial polishing value | $g/cm^2 \cdot \%$ | 7 | 5 | 8 | 9 | 8 | 9 |
| Tensile strength | MPa | 204 | 220 | 407 | 420 | 431 | 395 |
| Bending strength | MPa | 308 | 334 | 602 | 610 | 543 | 457 |
| Bending elastic modulus | GPa | 11.4 | 9.8 | 21.0 | 21.4 | 18.2 | 16.5 |
| Bending strength retention ratio | % | 51 | 44 | 60 | 61 | 58 | 54 |
| Tensile strength retention ratio | % | 32 | 38 | 41 | 43 | 33 | 36 |
| Bending elastic modulus retention ratio | % | 46 | 44 | 58 | 57 | 51 | 55 |
| Tensile strength retention ratio upon water absorption | % | 57 | 53 | 53 | 59 | 50 | 55 |
| Bending strength retention ratio at water absorption | % | 61 | 57 | 59 | 60 | 58 | 59 |
| Bending elastic modulus retention ratio upon water ab | % | 57 | 60 | 57 | 59 | 54 | 58 |
| Impact strength | kN/mm | 3.2 | 2.1 | 2.9 | 3.4 | 2.7 | 2.6 |
| Vibration fatigue resistance characteristic | — | X | X | X | X | X | X |
| Interface recovery characteristics | — | 1 | 1 | 1 | 1 | 1 | 1 |

The following are examples of the continuous fiber reinforced resin composite material having the characteristic (V).

[Interfacial Coverage Ratio Change Index, Reinforcing Fiber Exposure Change Index, and Relative Concentration Change Index of Elements of Continuous Fiber Reinforced Resin Composite Material]

In a mixing rotor, 100 mg of thin slices of a continuous fiber reinforced resin composite material and 20 mL of HFIP in the cases where Resins 1 to 4 was used or 20 mL of xylene in the case where Resin 5 was used were placed and stirred for 5 hours at a temperature of 23° C. in the cases where HFIP was used or 90° C. in the cases where xylene was used. Subsequently, the solvent was removed by suction filtration and the continuous reinforcing fibers were washed by sprinkling 40 mL of fresh solvent on the filter. The fibers were air-dried in the cases where HFIP was used, or hot air-dried at 120° C. in the cases where xylene was used. The obtained continuous reinforcing fibers and 20 mL of fresh solvent were placed in a mixing rotor and stirred for 2 hours at a temperature of 23° C. in the cases where HFIP was used or 90° C. in the cases where xylene was used. Then, the solvent was removed by suction filtration, the continuous reinforcing fibers were washed by sprinkling 40 mL of fresh solvent on the filter, and then dried by nitrogen blow in an environment at a temperature of 23° C. in the cases where HFIP was used or 120° C. in the cases where xylene was used. The obtained continuous reinforcing fibers and 20 mL of fresh solvent were placed in a mixing rotor and stirred for 2 hours at a temperature of 23° C. in the cases where HFIP was used or at 90° C. in the cases where xylene was used, the solvent was removed by suction filtration, and the continuous reinforcing fibers were washed by sprinkling 40 mL of fresh solvent on the filter. Then, the fibers were air-dried in the cases where HFIP was used or hot air dried in an environment of 120° C. in the cases where xylene was used, and were dried overnight in a vacuum dryer set at 23° C. in the cases where HFIP was used or 120° C. in the cases where xylene was used. The resulting continuous reinforcing fibers were pressed into a flat plate, and a small piece of 2 mm was cut out and analyzed using XPS (Versa probe II, ULVAC-Phi Inc.) with excitation source: mono. AlKα 20 kV×5 mA 100 W, analysis size: 100 μm×1.4 mm, photoelectron extraction angle: 45°, acquisition area (Survey scan): 117.4 eV, (Narrow scan): C1s, O1s, N1s, Si2p, Ca2p, and Al2p, Pass Energy (Survey scan): 117.4 eV, (Narrow scan): 46.95 eV to determine the relative elemental concentrations of carbon, oxygen, nitrogen, silicon, aluminum, and calcium.

The interfacial coverage ratio of the continuous fiber reinforced resin composite material was calculated by the Formula 1 below for Reference Examples 5-1 to 5-4 and 5-6 and Comparative Reference Examples 5-1 to 5-3, the Formula 2 below for Reference Example 5-5, or the Formula 3 below for Reference Example 5-7.

$$\text{(Interfacial coverage ratio)} = [N]/([N]+[Si])\times 100 \quad (1)$$

$$\text{(Interfacial coverage ratio)} = [N]/([N]+[O])\times 100 \quad (2)$$

$$\text{(Interfacial coverage ratio)} = ([C]-[C0])/([C]-[C0]+[Si])\times 100 \quad (3)$$

The reinforcing fiber exposure ratio of the composite material was determined by Formula 4 below for Reference Examples 5-1 to 5-4, 5-6, and 5-7 and Comparative Reference Examples 5-1 to 5-3, or Formula 5 for Reference Example 5-5.

$$\text{(Reinforcing fiber exposure ratio of the continuous fiber reinforced resin composite material)} = [A1]/[A0] \quad (4)$$

$$\text{(Reinforcing fiber exposure ratio of the continuous fiber reinforced resin composite material)} = [O]/[O0] \quad (5)$$

where [Al0] is the relative elemental concentration of aluminum when GF0 was used, and [C0] is the relative elemental concentration of aluminum when CFO was used.

The interfacial coverage ratio change index, the reinforcing fiber exposure change index, and the relative elemental change index for each element were calculated using the following formulae.

(Interfacial coverage ratio change index) = (interfacial coverage ratio of the continuous fiber reinforced resin composite material before a fracture test)/(interfacial coverage ratio of the composite material after the fracture test)

(Reinforcing fiber exposure change index) = (reinforcing fiber exposure ratio of the continuous fiber reinforced resin composite material before a fracture test)/(reinforcing fiber exposure exposure ratio of the composite material after the fracture test)

(Relative elemental change index of interfacial nitrogen) = (relative elemental index of interfacial nitrogen of the continuous fiber reinforced resin composite material before a fracture test) /(relative elemental index of interfacial nitrogen of the composite material after the fracture test)

(Relative elemental change index of interfacial oxygen) = (relative elemental index of interfacial oxygen of the continuous fiber reinforced resin composite material before a fracture test) /(relative elemental index of interfacial oxygen of the composite material after the fracture test)

(Relative elemental change index of interfacial carbon) = (relative elemental index of interfacial carbon of the continuous fiber reinforced resin composite material before a fracture test) /(relative elemental index of interfacial carbon of the composite material after the fracture test)

-continued (Relative elemental change index of interfacial silicon) = (relative elemental index of interfacial silicon of the continuous fiber reinforced resin composite material before a fracture test) /(relative elemental index of interfacial silicon of the composite material after the fracture test)

(Relative elemental change index of interfacial aluminum) = (relative elemental index of interfacial aluminum of the continuous fiber reinforced resin composite material before a fracture test) /(relative elemental index of interfacial aluminum of the composite material after the fracture test)

(Relative elemental change index of interfacial calcium) = (relative elemental index of interfacial calcium of the continuous fiber reinforced resin composite material before a fracture test) /(relative elemental index of interfacial calcium of the composite material after the fracture test)

The fracture test described above is a test of a cantilever bending vibration fatigue which will be described below.

[Impregnation Speed]

As a molding machine, a hydraulic molding machine (SHOJI Co., Ltd.) with a maximum mold clamping force of 50 tons was used. Five sheets of the continuous reinforcing fiber base material and six sheets of thermoplastic resin film were alternately stacked and laminated, placed in a die having a temperature sensor attached thereto, placed in a heating press molding machine set at the melting temperature of the thermoplastic resin+65° C., and pressed at a pressure of 5 MPa while the temperature was monitored. The laminate was removed from the heating press molding machine 30 seconds after the temperature reached the melting point of the thermoplastic resin, and transferred to a cooling press machine for cooling pressing with water cooling at a pressure of 5 MPa. In this case, the maximum temperature of the continuous fiber reinforced resin composite material was the melting point of the thermoplastic resin+15° C. The time during which the temperature was the melting temperature of the thermoplastic resin or higher was 1 minute. The obtained continuous reinforcing fiber composite material was cut by a band saw, the cross section was polished so as not to damage to the continuous reinforcing fibers. An image was obtained by an FE-SEM observation with a magnification of 50×, and the occupied area of each of the continuous reinforcing fiber bundle, the thermoplastic resin, and voids were determined from the obtained image by ImageJ. The ratio of the area of voids to the area of the continuous reinforcing fiber bundle (total) was determined. The impregnation speed (%/min) was determined by dividing the impregnation ratio (%) determined by the following formula:

$$\text{Impregnation ratio (\%)} = \{1-(\text{area of voids/area of continuous reinforcing fiber bundle})\}\times 100.$$

by the time (minutes) during which the temperature of the thermoplastic resin was the melting temperature or higher during the heat press molding and the cooling press. Here, the continuous reinforcing fiber bundle is the area of densely gathered fibers (bundle of single yarns) in the cross section of the injection molded article, and it can be, for example, the area where the outer circumferences of the densely gathered fibers are connected.

Here, the above melting temperature is defined as the melting point in the case where the thermoplastic resin has a melting point, or as the glass transition temperature in the case where it does not have a melting point.

[Bending Strength]

Strip-like specimens having a length of 100 mm, a width of 10 mm, and a thickness of 2 mm were cut out from each continuous fiber reinforced resin composite material. The bending strength (MPa) was measured by Instron universal testing machine using a three-point bending jig with a span distance of 32 mm at a speed of 1 mm/min in an environment of 23° C. and an RH of 50%. Fifty points were measured, and the median value was used as the bending strength.

[Bending Vibration Fatigue Recoverability]

ASTM-D671 Type A test specimens were prepared from the continuous fiber reinforced resin composite material, and a cantilever bending vibration fatigue test was conducted using a repetitive vibration fatigue testing machine (B-70, Toyo Seiki Seisaku-sho, Ltd.) at a test temperature of 23° C. and a frequency of 20 Hz, with a sine waveform. The number of fractures (A) in the vibration fatigue test at a stress equivalent to 35% of the bending strength of the continuous fiber reinforced resin composite material in each of Examples was determined. Similarly, a vibration fatigue test was conducted at a stress equivalent to 35% of the bending strength, and the test was stopped when the number of cycles reached half the number (A) to obtain a post-fracture specimen. The specimen after the fracture test was placed in a mold with an spigot joint-type structure. A hydraulic molding machine with a maximum clamping force of 50 tons (SHOJI Co., Ltd.), and the internal temperature of the molding machine was heated to 200° C., heat-pressing was performed while clamping at a clamping force of 5 MPa for 15 minutes to obtain a post-recovery specimen. The post-recovery specimen was subjected to a bending vibration fatigue test under similar conditions to determine the number of fractures (B).

The bending vibration fatigue recoverability was determined by the following formula.

$$(\text{Bending vibration fatigue recoverability}) = (B)/(A)$$

[Measurement of Deviation]

A bending strength test was conducted on 50 test specimens to measure the bending strengths. The variation coefficient was calculated according to the following formula and determined as the deviation, where A is the average value of the bending strengths, Ai is the bending strength at the $i^{th}$ measurement (i=1 to 50).

[Math. 3]

$$\text{variation coefficient} = \frac{\sqrt{\frac{1}{50}\sum_{i=1}^{50}(Ai - A)^2}}{A}$$

The materials used in examples of the continuous fiber reinforced resin composite material having the characteristic (V) were as follows.

[Continuous Reinforcing Fibers]

(Glass Fibers)

Glass Fiber 1 (GF1):

Glass fibers were produced in which 0.8 mass % of a bundling agent was attached to 100% of glass fibers with a fiber fineness of 1.15 g/m and a single yarn count of 2,000. The winding configuration was DWR and the average single yarn diameter was about 16 μm. Upon the adhesion of the above bundling agent, a water solution of the bundling agent was prepared so as to contain 0.8 mass % of γ-aminopropyltrimethoxysilane (KBM-903, manufactured by Shin-Etsu Chemical Co., Ltd.), 1.2 mass % of caranauba wax, and 2 mass % of a copolymer compound which was obtained by copolymerizing 10 mass % of maleic anhydride and 90 mass % of methyl methacrylate, and had a weight average molecular weight of 15,000, by adjusting with deionized water, and was used. The amounts of the components attached to the glass fibers were 0.16 mass % of γ-aminopropyltrimethoxysilane, 0.40 mass % of caranauba wax, and 0.24 mass % of the copolymerization compound with respect to 100 mass % glass fibers.

Glass Fiber 2 (GF2):

Glass fibers obtained by treating GF1 in an electric furnace at 650° C. for 3 hours were immersed in a 0.2 mass % water solution of γ-aminopropyltrimethoxysilane (KBM-903, manufactured by Shin-Etsu Chemical Co., Ltd.) as a coupling agent, for 30 minutes, and dried at 110° C. for 3 hours. The amount of γ-aminopropyltrimethoxysilane attached to the glass fiber was 0.16 mass % with respect to 100 mass % of the glass fibers.

Glass Fiber 0 (GF0):

GF1 was treated in an electric furnace at 650° C. for 3 hours to obtain GF0 free of a bundling agent.

(Carbon Fibers)

Carbon Fibers 1 (CF1)

Carbon fibers were produced in which 1.0 mass % of a bundling agent was attached to 100 mass % of PAN-based carbon fibers with a single yarn count of 12,000. Upon the adhesion of the above bundling agent, a water solution of the bundling agent was prepared so as to contain 0.8 mass % of γ-aminopropyltrimethoxysilane (KBM-903, manufactured by Shin-Etsu Chemical Co., Ltd.), 0.3 mass % of caranauba wax, and 1 mass % of a copolymer compound which was obtained by copolymerizing 10 mass % of maleic anhydride and 90 mass % of methyl methacrylate, and had a weight average molecular weight of 20,000, by adjusting with deionized water, and was used. The amounts of the components attached to the carbon fiber were 0.38 mass % of γ-aminopropyltrimethoxysilane, 0.48 mass % of caranauba wax, and 0.14 mass % of the copolymerization compound with respect to 100 mass % carbon fibers.

Carbon Fibers 2 (CF2)

PAN-based carbon fibers with a single yarn count of 12,000 were immersed in a water solution containing 0.38 mass % of γ-aminopropyltrimethoxysilane (KBM-903, manufactured by Shin-Etsu Chemical Co., Ltd.) as a coupling agent, at 60° C. for 12 hours and dried at 110° C. for 6 hours. The amount of γ-aminopropyltrimethoxysilane attached to the carbon fiber was 0.38 mass % with respect to 100 mass % of the carbon fibers.

Carbon fiber 0 (CFO): PAN-based carbon fibers with a single yarn count of 12,000

[Preparation of Continuous Reinforcing Fiber Base Material]

Glass Cloth:

A glass cloth 1 (GC1) was produced by weaving the above glass fibers 1 as warps and wefts using a repia loom (weave width: 1 m). The produced glass cloth was plain weave, and had a weave density of 6.5/25 mm and a basis weight of 640 g/m$^2$.

Similarly, GC2 was obtained using GF2.

Carbon Fiber Cloth:

A carbon fiber cloth (CC1) was produced by weaving the above glass fibers 1 as warps and wefts using a repia loom (weave width: 1 m). The produced carbon fiber cloth was plain weave, and had a weave density of 6.5/25 mm and a basis weight of 425 g/m$^2$.

Similarly, CC2 was obtained using carbon fibers 2.

[Thermoplastic Resin]

Resin 1: Polyamide 66

A polymerization reaction of polyamide was carried out by the "thermal melting polymerization" method as follows.

A 55 mass % homogeneous water solution of the raw monomers was prepared by dissolving 1500 g of a salt containing adipic acid (Wako Pure Chemical Industries) and hexamethylenediamine (Tokyo Chemical Industry Co., Ltd.) at a molar ratio of 45:55 and 300 g of adipic acid in 1500 g of distilled water. The water solution was charged in an autoclave with a content of 7.0 L, which was replaced with nitrogen. The solution was concentrated by gradually venting water vapor until the concentration of the solution reached 70 mass % while stirring at a temperature of 130° C. or higher and 150° C. or lower. The internal temperature was then raised to 225° C. At this time, the pressure of the autoclave was increased to 1.7 MPa. A reaction was caused to take place for 70 minutes hours while the pressure was maintained to 1.7 MPa until the internal temperature reached 255° C. by gradually venting water vapor for 2 hours. The pressure was then lowered over 1.7 hours. The interior of the autoclave was then maintained to a reduced pressure of 650 torr for 15 minutes using a vacuum apparatus. At this time, the final internal temperature of the polymerization was 265° C. The resultant was extruded by pressurization with nitrogen through a lower spinneret (nozzle) into strands, which were water-cooled, cut, and discharged in the form of pellets, and dried at 100° C. under a nitrogen atmosphere for 12 hours. The resulting pellets and a lubricant (PEG 400, Tokyo Chemical Industry Co., Ltd.) were molded in a single screw extruder, water-cooled, cut, and discharged in the form of pellets, and dried at 100° C. for 12 hours under a nitrogen atmosphere to obtain Resin 1 (polyamide 66). Mw was 42,000, Mw/Mn was 2.08, the melting temperature (melting point (Tm)) was 264° C., the glass transition temperature (Tg) was 50° C.

Resin 2

To 100 mass % of Resin 1, 0.03 mass % of copper iodide and 0.2 mass % of potassium iodide were dry-blended, which was kneaded in a twin screw kneader (TEM26SS, Toshiba Machine Co., Ltd.) set at 280° C., water cooled, cut, and discharged in the form of pellets, dried for 12 hours at 100° C. in a nitrogen atmosphere to obtain Resin 2 with a melting temperature of 264° C.

Resin 3: Polyamide 6I

A polymerization reaction of polyamide was carried out by the "thermal melting polymerization" method as follows.

A homogeneous water solution was prepared by dissolving 1500 of a salt containing isophthalic acid (Wako Pure Chemical Industries) and an equimolar salt of hexamethylenediamine at a molar ratio of 45:55 and 300 g of isophthalic acid in 1500 g of distilled water. The solution was concentrated by gradually venting water vapor until the concentration of the solution reached 70 mass % while stirring at a temperature of 110° C. or higher and 140° C. or lower. The internal temperature was then raised to 235° C. A reaction was caused to take place for 2 hours while the pressure was maintained to be constant until the internal temperature reached 245° C. by gradually venting water vapor for 70 minutes. The pressure was then lowered over 90 minutes. The interior of the autoclave was then maintained to a reduced pressure of 650 torr for 10 minutes using a vacuum apparatus. At this time, the final internal temperature of the polymerization was 265° C. The resultant was then extruded by pressurization with nitrogen through a lower spinneret (nozzle) into strands, which were water-cooled, cut, and discharged in the form of pellets. The pellets were dried at 100° C. for 12 hours under a nitrogen atmosphere. The resulting pellets and a lubricant (PEG 400, Tokyo Chemical Industry Co., Ltd.) were molded in a single screw extruder, water cooled, cut, and discharged in the form of pellets, then dried at 100° C. for 12 hours under a nitrogen atmosphere to obtain Resin 3 (polyamide 6I). The obtained Resin 3 (polyamide 6I) had Mw of 18,000, Mw/Mn of 1.94, and a melting temperature (glass transition temperature (Tg)) of 130° C.

For amorphous resins that do not have a crystalline melting point, the glass transition temperature was used as the melting temperature.

Resin 4:

Resin 1 and Resin 3 were dry-blended at mass ratio of 2:1 to obtain Resin 4 with a melting temperature of 259° C.

Resin 5

Maleic acid modified polypropylene (SANYO CHEMICAL INDUSTRIES, LTD., with a melting temperature (melting point) of 160° C.)

[Production of Thermoplastic Resin Film]

Thermoplastic resin films were produced by performing molding using a T-die extrusion molding machine (manufactured by SOUKEN CO. LTD.). The thickness of the films was 180 μm.

Reference Example 5-1

Thermoplastic resin films 1 were obtained by using Resin 1 by the method described above.

Four glass cloths 1 (GC 1) and five thermoplastic resin films 1 were prepared, and molded by alternately overlapping the glass cloths 1 and the thermoplastic resin films 1 one another so that the thermoplastic resin films 1 were disposed on the surfaces, thereby obtaining a continuous fiber reinforced resin composite material. A continuous compression molding machine was used as the molding machine. The glass cloths and the thermoplastic resin films 1 overlapped one another as described above were placed in the molding machine. The temperature inside the heating zone of the molding machine was adjusted to 350° C. and the temperature of the cooling zone was controlled by oil cooling, and compression-molding was performed at a pressure of 5 MPa and a belt speed of 0.6 m/min.

Further, to compare the bending strength, glass cloth 2 (coupling continuous reinforcing fibers), which was treated only with a coupling agent was used to obtain a material for a bending test (coupling continuous fiber reinforced resin composite material) having a thickness of 2 mm in the similar manner.

Each physical properties of the resultant continuous fiber reinforced resin composite material is summarized in Table 5.

Reference Example 5-2

A continuous fiber reinforced resin composite material having a thickness of 2 mm and a material for a bending test (coupling continuous fiber reinforced resin composite material) were obtained in the manner similar to Reference Example 5-1 except that Resin 2 was used as the thermoplastic resin.

Each physical properties of the resultant continuous fiber reinforced resin composite material is summarized in Table 5.

Reference Example 5-3

A continuous fiber reinforced resin composite material having a thickness of 2 mm and a material for a bending test (coupling continuous fiber reinforced resin composite material) were obtained in the manner similar to Reference Example 5-1 except that Resin 3 was used as the thermoplastic resin.

Each physical properties of the resultant continuous fiber reinforced resin composite material is summarized in Table 5.

Reference Example 5-4

A continuous fiber reinforced resin composite material having a thickness of 2 mm and a material for a bending test (coupling continuous fiber reinforced resin composite material) were obtained in the manner similar to Reference Example 5-1 except that Resin 4 was used as the thermoplastic resin.

Each physical properties of the resultant continuous fiber reinforced resin composite material is summarized in Table 5.

Reference Example 5-5

A continuous fiber reinforced resin composite material having a thickness of 2 mm was obtained in the manner similar to Reference Example 5-1 except that a composite material made of carbon fiber cloth 1 and a resin film 1 by using the carbon fiber cloth 1 as the continuous reinforcing fiber base material. A film produced in the manner similar to the above thermoplastic resin film was used as the thermoplastic resin film except that the thickness was 118 μm.

Further, to compare the bending strength, a material for a bending test (coupling continuous fiber reinforced resin composite material) having a thickness of 2 mm was obtained in the similar manner using carbon fiber cloth 2 which was treated only with a coupling agent was used to obtain.

Each physical properties of the resultant continuous fiber reinforced resin composite material is summarized in Table 5.

Reference Example 5-6

A continuous fiber reinforced resin composite material having a thickness of 2 mm was obtained in the manner similar to Reference Example 5-1 except that glass cloth GC3 was prepared instead of GF1 from glass fibers which was produced by treating GF1 with 20 wt % of a sodium aluminate solution as an additive to adjust the aluminum concentration for 1 hour and dried at 110° C. for 2 hours. A material for a bending test (coupling continuous fiber reinforced resin composite material) was prepared in the manner similar to Reference Example 5-1.

Each physical properties of the resultant continuous fiber reinforced resin composite material is summarized in Table 5.

Reference Example 5-7

A continuous fiber reinforced resin composite material having a thickness of 2 mm and a material for a bending test were obtained in the manner similar to Reference Example 5-1 except that Resin 5 was used as the thermoplastic resin.

Each physical properties of the resultant continuous fiber reinforced resin composite material is summarized in Table 5.

Comparative Reference Example 5-1

A continuous fiber reinforced resin composite material was obtained in the manner similar to Reference Example 5-1 except that glass cloth (GC4) with a plain weave, a weave density of 6.5/25 mm, and a basis weight of 600 g/m$^2$, in which a mixture of 0.16 mass % of 3-glycidoxypropyltrimethoxysilane (KBM-402, manufactured by Shin-Etsu Chemical Co., Ltd.), 0.40 mass % of an epoxy resin emulsion, and 0.24 mass % of carnauba wax was attached as a bundling agent to 100 mass % of glass fibers used in the preparation of GF1, was used instead of glass cloth 1.

Further, to compare the bending strength, a material for a bending test (coupling continuous fiber reinforced resin composite material) having a thickness of 2 mm was obtained in the similar manner by using glass cloth 5 (GF5) produced from glass fibers (coupling continuous reinforcing fibers, GF5) with a plain weave, a weave density of 6.5 fibers/25 mm, and a basis weight of 600 g/m$^2$, in which 0.16 mass % of 3-glycidoxypropyltrimethoxysilane (KBM-402, manufactured by Shin-Etsu Chemical Co., Ltd.) was attached as a coupling agent to 100 mass % of the glass fiber used in the preparation of GF1.

Each physical properties of the resultant continuous fiber reinforced resin composite material is summarized in Table 5.

Comparative Reference Example 5-2

A continuous fiber reinforced resin composite material and a material for a bending test were obtained in the manner similar to Reference Example 5-1 except that glass cloth 6 (GC6) with a plain weave, a weave density of 6.5 fibers/25 mm, and a basis weight of 640 g/m$^2$ which was produced using glass fibers (GF6) with a fiber fineness of 1.15 g/m and a single yarn count of 2,000 without being treated with a bundling agent was used instead of glass cloth 1.

Each physical properties of the resultant continuous fiber reinforced resin composite material is summarized in Table 5.

Comparative Reference Example 3

Evaluations similar to those in Reference Example 5-1 were performed using “Tepex dynalite 101” which was manufactured by Bond Laminate and in which glass cloth was impregnated with polyamide 66.

Each physical properties of the resultant continuous fiber reinforced resin composite material is summarized in Table 5.

The impregnation speed and the bending strength when glass cloth 2 or carbon fiber cloth 2 is used are summarized in Table 5.

TABLE 5

| | | Reference Example 5-1 | Reference Example 5-2 | Reference Example 5-3 | Reference Example 5-4 | Reference Example 5-5 | Reference Example 5-6 | Reference Example 5-7 | Comp. Ref. Example 5-1 | Comp. Ref. Example 5-2 | Comp. Ref. Example 5-3 |
|---|---|---|---|---|---|---|---|---|---|---|---|
| Interfacial coverage ratio change index | | 1.14 | 1.17 | 1.05 | 1.07 | 0.91 | 0.89 | 1.19 | 0.26 | 0.13 | 0.45 |
| Reinforcing fiber exposure change index | — | 0.94 | 0.88 | 0.92 | 0.95 | 0.91 | 1.58 | 0.82 | 1.45 | 0.72 | 1.48 |
| Relative elemental change index of interfacial nitrogen | — | 1.13 | 1.15 | 1.08 | 1.04 | 1.12 | 0.92 | N | 0.31 | 0.11 | 0.39 |
| Relative elemental change index of interface carbon | — | 1.06 | 1.01 | 0.96 | 0.99 | 0.94 | 0.83 | 1.17 | 0.73 | 0.46 | 0.66 |
| Relative elemental change index of interfacial aluminum | — | 0.94 | 0.88 | 0.92 | 0.95 | N | 1.58 | 0.82 | 1.45 | 0.72 | 1.55 |
| Relative elemental change index of interfacial silicon | — | 0.93 | 0.86 | 0.91 | 0.96 | N | 0.82 | 0.80 | 1.42 | 0.71 | 1.51 |
| Relative elemental change index of interfacial calcium | — | 0.99 | 0.91 | 0.99 | 1.02 | N | 0.83 | 0.71 | 1.50 | 0.64 | 1.49 |
| Relative elemental change index of interfacial oxygen | — | 0.94 | 0.88 | 0.91 | 0.89 | 0.91 | 0.80 | 0.90 | 1.46 | 0.51 | 1.48 |
| Impregnation speed of GC1 or CC1 | %/min | 98.2 | 94.1 | 99.8 | 99.2 | 96.4 | — | 41.60 | — | — | — |
| Impregnation speed of GC2 or CC2 | %/min | 97.4 | 79.1 | 95.2 | 98.1 | 83.9 | 97.4 | 40.2 | — | 97.4 | — |
| Impregnation speed of GC3 | %/min | — | — | — | — | — | 91.20 | — | — | — | — |
| Impregnation speed of GC4 | %/min | — | — | — | — | — | — | — | 22 | — | — |
| Impregnation speed of GC5 | %/min | — | — | — | — | — | — | — | 54 | — | — |
| Bending strength of continuous fiber reinforced resin composite material | MPa | 714 | 673 | 766 | 739 | 820 | 640 | 587 | 349 | 186 | 600 |
| Bending strength when material for bending test specimen was used | MPa | 507 | 433 | 578 | 545 | 500 | 507 | 354 | 195 | — | — |
| Bending vibration fatigue recoverability | — | 0.88 | 0.83 | 0.91 | 0.92 | 0.80 | 0.76 | 0.71 | 0.31 | 0.19 | 0.44 |
| Deviation | — | 0.054 | 0.064 | 0.050 | 0.053 | 0.066 | 0.072 | 0.074 | 0.096 | 0.11 | 0.097 |

N: not detected

INDUSTRIAL APPLICABILITY

The continuous fiber reinforced resin composite material of the present embodiment is industrially applicable as reinforcing members for materials for which mechanical properties are required at higher levels, such as structural components of a wide variety of machines and automobiles, and as materials for composite shaped articles with thermoplastic resin compositions.

Further, the continuous fiber reinforced resin composite material of the present embodiment having the above characteristic (II) is industrially applicable as reinforcing members for materials for which mechanical properties are required at higher levels, such as structural components of a wide variety of machines and automobiles, and as materials for composite shaped articles with thermoplastic resin compositions.

Further, the continuous fiber reinforced resin composite material of the present embodiment having the above characteristic (III) is industrially applicable as recoverable reinforcing materials for materials subjected to fracture due to fatigue or impact, such as structural components of a wide variety of machines and automobiles, and as composite materials of thermoplastic resin compositions.

Further, the continuous fiber reinforced resin composite material of the present embodiment having the above characteristic (IV) is industrially applicable as reinforcing members for materials for which mechanical properties are required at higher levels, such as structural components of a wide variety of machines and automobiles, and as materials for composite shaped articles with thermoplastic resin compositions.

The continuous fiber reinforced resin composite material of the present embodiment having the above characteristic (V) is industrially applicable as reinforcing members for materials for which mechanical properties are required at higher levels, such as structural components of a wide variety of machines and automobiles, and as materials for composite shaped articles with thermoplastic resin compositions.

REFERENCE SIGNS LIST

1: Single yarn of continuous reinforcing fiber
2: Resin balls of thermoplastic resin (drop)
$\alpha$: $\mu$ droplet contact angle
d: Diameter of single yarn of continuous reinforcing fiber
L: Length of resin ball ($\mu$ drop) in fiber axial direction of continuous reinforcing fiber

The invention claimed is:

1. A method of producing a continuous fiber reinforced resin composite material, comprising:

treating continuous reinforcing fibers with a surface treatment agent to obtain surface treatment agent-containing continuous reinforcing fibers;

after the treating, heating a thermoplastic resin and the surface treatment agent-containing continuous reinforcing fibers at a heating rate of from 200 to 330° C./min;

after the heating, impregnating the thermoplastic resin into the surface treatment agent-containing continuous reinforcing fibers under the condition that the impregnation speed is 32%/min or more; and after the impregnating, cooling at a cooling rate of from 10 to 120° C./min, wherein the thermoplastic resin is a polyamide-based resin, wherein the continuous reinforcing fibers contain glass fibers, wherein an interfacial amount of the continuous fiber reinforced resin composite material is 100,000 $m^{-1}$ or more and 1,000,000 $m^{-1}$ or less, wherein an interfacial shear strength between the surface treatment agent-containing continuous reinforcing fibers and the thermoplastic resin, as determined by the μ droplet method using the following formula (1), is 0.8 to 1.2 times an interfacial shear strength between coupling agent-treated continuous reinforcing fibers which are treated only with a coupling agent instead of the surface treatment agent and the thermoplastic resin, $$\tau = F/\pi dL \tag{1}$$

where τ is the interfacial shear strength (MPa), d is a diameter of the continuous reinforcing fibers (μm), L is a length (μm) of a resin ball (μ drop) of the thermoplastic resin made to be attached to a single yarn of the continuous reinforcing fibers in an axial direction of the continuous reinforcing fibers, and F is a shear load (N) when the resin ball is pulled off from the continuous reinforcing fiber; and wherein a μ droplet contact angle between the surface treatment agent-containing continuous reinforcing fibers and the thermoplastic resin, as measured by the μ droplet method, is 0.4 to 0.7 times a μ droplet contact angle between surface treatment-free continuous reinforcing fibers free of the surface treatment agent and the thermoplastic resin.

2. The method of producing the continuous fiber reinforced resin composite material according to claim 1, wherein a contact angle between the continuous reinforcing fiber and the thermoplastic resin after dissolution of the resin according to a static wettability test is 70 to 130% of a contact angle between continuous reinforcing fibers which is a material treated only with a coupling agent and the thermoplastic resin according to a static wettability test.

3. The method of producing the continuous fiber reinforced resin composite material according to claim 1, comprising:

wherein the full width at half maximum of the (010) plane of the crystalline phase in the inner layer of the continuous fiber reinforced resin composite material satisfies the following relational formula:

(the full width at half maximum of the (010) plane of the crystalline phase in the inner layer of the continuous fiber reinforced resin composite material)<0.0037×(a maximum temperature during molding)+0.15.

4. The method of producing the continuous fiber reinforced resin composite material according to claim 3, wherein a ratio of the full width at half maximum of the (010) plane of the crystalline phase in the inner layer and the full width at half maximum of the (010) plane of the crystalline phase in the surface layer of the continuous fiber reinforced resin composite material satisfies the relationship of the following formula:

(the full width at half maximum of the (010) plane of the crystalline phase in the surface layer of the continuous fiber reinforced resin composite material)/(the full width at half maximum of the (010) plane of the crystalline phase in the inner layer of the continuous fiber reinforced resin composite material)≥−0.0034×(the maximum temperature during molding)+2.02.

5. The method of producing the continuous fiber reinforced resin composite material according to claim 3, wherein a ratio of the full width at half maximum of the (100) plane of the crystalline phase in the inner layer and the full width at half maximum of the (100) plane of the crystalline phase in the surface layer of the continuous fiber reinforced resin composite material satisfies the relationship of the following formula:

(the full width at half maximum of the (100) plane of the crystalline phase in the surface layer of the continuous fiber reinforced resin compsite material)/(the full width at half maximum of the (100) plane of the crystalline phase in the inner layer of the continuous fiber reinforced resin composite material) ≥ 0.0125 × (a cooling rate during molding) + 0.318.

6. The method of producing the continuous fiber reinforced resin composite material according to claim 1, wherein the interfacial shear strength between the surface treatment agent-containing continuous reinforcing fibers and the thermoplastic resin is 1.8 to 10 times the interfacial shear strength between the surface treatment agent-free continuous reinforcing fibers and the thermoplastic resin.

7. The method of producing the continuous fiber reinforced resin composite material according to claim 1, wherein a speed at which the continuous reinforcing fibers are impregnated with the thermoplastic resin is 0.8 to 1.2 times a speed at which coupling continuous reinforcing fibers treated only with the coupling agent are impregnated with the thermoplastic resin, and a bending strength of a coupling continuous fiber reinforced resin composite material comprising the coupling continuous reinforcing fibers and the thermoplastic resin is 0.6 times or more of a bending strength of the continuous fiber reinforced resin composite material.

8. The method of producing the continuous fiber reinforced resin composite material according to claim 1, wherein a coverage ratio of an interfacial resin in the continuous reinforcing fibers after dissolution of the thermoplastic resin is 44% or less.

* * * * *